US012793515B2

(12) United States Patent
Mohseni et al.

(10) Patent No.: US 12,793,515 B2
(45) Date of Patent: Nov. 10, 2026

(54) SYSTEMS AND METHODS FOR GENERATING LANGUAGE MODEL CONTEXT ACCORDING TO LOCATION-BASE NETWORK MESSAGES

(71) Applicant: DK Crown Holdings Inc., Boston, MA (US)

(72) Inventors: Robin Mohseni, Billericay (GB); Gengyuan Zhang, Boston, MA (US); Nolan Shulman, Toronto (CA); Gregory Von Pless, Melrose, MA (US)

(73) Assignee: DK Crown Holdings Inc., Boston, MA (US)

(*) Notice: Subject to any disclaimer, the term of this patent is extended or adjusted under 35 U.S.C. 154(b) by 0 days.

(21) Appl. No.: 19/358,959

(22) Filed: Oct. 15, 2025

(65) Prior Publication Data

US 2026/0111685 A1 Apr. 23, 2026

Related U.S. Application Data

(60) Provisional application No. 63/741,671, filed on Jan. 3, 2025, provisional application No. 63/741,297, filed (Continued)

(51) Int. Cl.

*G06Q 50/34* (2012.01)
*G06F 8/38* (2018.01)

(Continued)

(52) U.S. Cl.

CPC ............... *G06Q 50/34* (2013.01); *G06F 8/38* (2013.01); *G06F 16/22* (2019.01);

(Continued)

(58) Field of Classification Search

CPC .......... G06F 40/40; G06F 40/35; G06Q 50/34
See application file for complete search history.

(56) References Cited

U.S. PATENT DOCUMENTS

| | | | |
|---|---|---|---|
| 9,558,620 | B2 | 1/2017 | Froy et al. |
| 10,311,670 | B2 | 6/2019 | Brahmandam et al. |

(Continued)

FOREIGN PATENT DOCUMENTS

| | | | |
|---|---|---|---|
| CN | 116310582 | A | 6/2023 |
| WO | WO-2023/064563 | A1 | 4/2023 |

(Continued)

OTHER PUBLICATIONS

Cureton, et al., "Federated learning for intent classification." In 2023 IEEE 19th International Conference on Intelligent Computer Communication and Processing (ICCP), pp. 315-322. IEEE, 2023. (Year: 2023).

(Continued)

*Primary Examiner* — Brian L Albertalli
(74) *Attorney, Agent, or Firm* — Foley & Lardner LLP

(57) ABSTRACT

Systems and methods for generating language model context according to location-based network messages are disclosed. A system can receive, from a client device during a communication session, a prompt identifying a request for a data structure. The system can determine that the prompt is to be augmented with additional information to satisfy the request. Based on the prompt, the system can retrieve, from at least one data source, a set of additional contextual data to meet the request for the data structure. The system can generate an input context using the prompt and the set of additional contextual data. Using a language model and the input context, the system can generate an output message identifying the data structure.

16 Claims, 18 Drawing Sheets

400

Related U.S. Application Data on Jan. 2, 2025, provisional application No. 63/719,406, filed on Nov. 12, 2024, provisional application No. 63/711,415, filed on Oct. 24, 2024, provisional application No. 63/708,542, filed on Oct. 17, 2024, provisional application No. 63/708,554, filed on Oct. 17, 2024, provisional application No. 63/708,504, filed on Oct. 17, 2024, provisional application No. 63/708,509, filed on Oct. 17, 2024, provisional application No. 63/708,492, filed on Oct. 17, 2024, provisional application No. 63/708,528, filed on Oct. 17, 2024.

(51) Int. Cl.

| | |
|---|---|
| ***G06F 16/22*** | (2019.01) |
| ***G06F 16/23*** | (2019.01) |
| ***G06F 16/3329*** | (2025.01) |
| ***G06F 16/338*** | (2019.01) |
| ***G06F 16/35*** | (2025.01) |
| ***G06F 16/9535*** | (2019.01) |
| ***G06F 18/214*** | (2023.01) |
| ***G06F 40/279*** | (2020.01) |
| ***G06F 40/289*** | (2020.01) |
| ***G06F 40/295*** | (2020.01) |
| ***G06F 40/30*** | (2020.01) |
| ***G06F 40/40*** | (2020.01) |
| ***G06N 3/0895*** | (2023.01) |
| ***G06N 20/00*** | (2019.01) |
| ***G07F 17/32*** | (2006.01) |
| ***H04L 51/02*** | (2022.01) |
| ***H04L 67/141*** | (2022.01) |
| ***H04L 67/306*** | (2022.01) |
| *G06F 40/284* | (2020.01) |
| *G06F 40/35* | (2020.01) |

(52) U.S. Cl.

CPC ...... *G06F 16/2237* (2019.01); *G06F 16/2379* (2019.01); *G06F 16/3329* (2019.01); *G06F 16/33295* (2025.01); *G06F 16/338* (2019.01); *G06F 16/35* (2019.01); *G06F 16/9535* (2019.01); *G06F 18/214* (2023.01); *G06F 40/279* (2020.01); *G06F 40/289* (2020.01); *G06F 40/295* (2020.01); *G06F 40/30* (2020.01); *G06N 3/0895* (2023.01); *G06N 20/00* (2019.01); *G07F 17/323* (2013.01); *G07F 17/3237* (2013.01); *G07F 17/3244* (2013.01); *G07F 17/3288* (2013.01); *H04L 51/02* (2013.01); *H04L 67/141* (2013.01); *H04L 67/306* (2013.01); *G06F 40/284* (2020.01); *G06F 40/35* (2020.01); *G06F 40/40* (2020.01)

(56) References Cited

U.S. PATENT DOCUMENTS

| | | | | |
|---|---|---|---|---|
| 10,825,303 | B2 | 11/2020 | Mcdonald et al. | |
| 10,950,086 | B2 | 3/2021 | Brahmandam et al. | |
| 11,094,171 | B2 | 8/2021 | Huke et al. | |
| 11,704,000 | B1 | 7/2023 | Mcivor et al. | |
| 11,735,006 | B2 | 8/2023 | Nelson et al. | |
| 11,756,379 | B2 | 9/2023 | Huke et al. | |
| 11,763,637 | B2 | 9/2023 | Huke et al. | |
| 11,776,362 | B2 | 10/2023 | Nelson et al. | |
| 11,785,280 | B1 | 10/2023 | Dakss et al. | |
| 12,008,862 | B2 | 6/2024 | Inamdar et al. | |
| 12,067,039 | B1 | 8/2024 | Campos et al. | |
| 12,067,849 | B2 | 8/2024 | Storm et al. | |
| 12,079,449 | B2 | 9/2024 | Mcivor et al. | |
| 12,118,320 | B2 | 10/2024 | Gelfenbeyn et al. | |
| 12,128,288 | B1 | 10/2024 | Redman et al. | |
| 12,190,683 | B2 | 1/2025 | Huke et al. | |
| 12,307,861 | B1 * | 5/2025 | Todisco | G06F 40/58 |
| 12,322,246 | B2 | 6/2025 | Turner | |
| 12,361,796 | B2 | 7/2025 | Joao | |
| 12,444,266 | B2 | 10/2025 | Joao | |
| 12,457,239 | B1 | 10/2025 | Mantin et al. | |
| 12,477,036 | B1 | 11/2025 | Tenbuuren et al. | |
| 2002/0068633 | A1 | 6/2002 | Schlaifer | |
| 2008/0311981 | A1 | 12/2008 | Schugar et al. | |
| 2010/0121808 | A1 | 5/2010 | Kuhn | |
| 2010/0328066 | A1 | 12/2010 | Walker et al. | |
| 2012/0034974 | A1 | 2/2012 | Amaitis et al. | |
| 2012/0310926 | A1 | 12/2012 | Gannu et al. | |
| 2013/0274007 | A1 | 10/2013 | Hilbert et al. | |
| 2014/0024435 | A1 | 1/2014 | Scott | |
| 2014/0289236 | A1 | 9/2014 | Agarwal et al. | |
| 2015/0038236 | A1 | 2/2015 | Robbins et al. | |
| 2015/0339884 | A1 | 11/2015 | Chun | |
| 2016/0086441 | A1 | 3/2016 | Cohen et al. | |
| 2016/0155350 | A1 | 6/2016 | Dragicevic et al. | |
| 2016/0189483 | A1 | 6/2016 | Ballman | |
| 2016/0196723 | A1 | 7/2016 | Ballman | |
| 2018/0068661 | A1 | 3/2018 | Printz | |
| 2018/0204417 | A1 | 7/2018 | Triplett | |
| 2018/0225911 | A1 | 8/2018 | Washington et al. | |
| 2019/0012876 | A1 | 1/2019 | Brahmandam et al. | |
| 2019/0122482 | A1 | 4/2019 | Amaitis et al. | |
| 2019/0318582 | A1 | 10/2019 | Barak | |
| 2019/0325028 | A1 * | 10/2019 | Palanichamy | G07F 17/3209 |
| 2019/0361966 | A1 | 11/2019 | Munro et al. | |
| 2019/0362601 | A1 | 11/2019 | Kline et al. | |
| 2019/0392684 | A1 * | 12/2019 | McDonald | G06N 3/044 |
| 2020/0027314 | A1 | 1/2020 | Pilnock et al. | |
| 2020/0118040 | A1 | 4/2020 | Dey et al. | |
| 2020/0234543 | A1 | 7/2020 | Schwartz et al. | |
| 2021/0049490 | A1 | 2/2021 | Hood | |
| 2021/0118264 | A1 | 4/2021 | Nelson et al. | |
| 2021/0217277 | A1 | 7/2021 | Huke et al. | |
| 2021/0217278 | A1 | 7/2021 | Huke et al. | |
| 2021/0233344 | A1 | 7/2021 | Amaitis et al. | |
| 2021/0248707 | A1 | 8/2021 | Huke et al. | |
| 2021/0248875 | A1 | 8/2021 | Huke et al. | |
| 2021/0256650 | A1 | 8/2021 | Huke et al. | |
| 2021/0272415 | A1 | 9/2021 | Huke et al. | |
| 2021/0280006 | A1 | 9/2021 | Pace | |
| 2021/0299882 | A1 | 9/2021 | Cupersmith et al. | |
| 2021/0319666 | A1 | 10/2021 | Salivar et al. | |
| 2021/0319668 | A1 | 10/2021 | Huke et al. | |
| 2021/0342550 | A1 | 11/2021 | Palanichamy et al. | |
| 2021/0343122 | A1 | 11/2021 | Warren | |
| 2021/0375090 | A1 | 12/2021 | Huke et al. | |
| 2021/0383645 | A1 | 12/2021 | Gupta et al. | |
| 2022/0019950 | A1 | 1/2022 | Sabri | |
| 2022/0122601 | A1 * | 4/2022 | Cronin | G06V 40/172 |
| 2022/0139160 | A1 | 5/2022 | Huke et al. | |
| 2022/0148364 | A1 | 5/2022 | Huke et al. | |
| 2022/0148365 | A1 | 5/2022 | Huke et al. | |
| 2022/0157114 | A1 | 5/2022 | Huke et al. | |
| 2022/0165118 | A1 | 5/2022 | Huke et al. | |
| 2022/0165120 | A1 | 5/2022 | Huke et al. | |
| 2022/0172560 | A1 | 6/2022 | Huke et al. | |
| 2022/0188366 | A1 | 6/2022 | Song et al. | |
| 2022/0188672 | A1 | 6/2022 | Basch et al. | |
| 2022/0189238 | A1 | 6/2022 | Huke et al. | |
| 2022/0351568 | A1 | 11/2022 | Smith | |
| 2022/0358808 | A1 | 11/2022 | Huke et al. | |
| 2022/0417603 | A1 | 12/2022 | Pleiman | |
| 2023/0011114 | A1 | 1/2023 | Guy et al. | |
| 2023/0027077 | A1 | 1/2023 | Cockerill et al. | |
| 2023/0082553 | A1 | 3/2023 | Mendell | |
| 2023/0124722 | A1 | 4/2023 | Polson et al. | |
| 2023/0162563 | A1 | 5/2023 | Turner | |
| 2023/0185579 | A1 | 6/2023 | Eranpurwala et al. | |
| 2023/0196871 | A1 | 6/2023 | Inamdar et al. | |
| 2023/0252848 | A1 | 8/2023 | Isgar | |
| 2023/0259714 | A1 | 8/2023 | Lange | |
| 2023/0267805 | A1 | 8/2023 | Edsall | |

(56) References Cited

U.S. PATENT DOCUMENTS

| | | | |
|---|---|---|---|
| 2023/0350928 | A1 | 11/2023 | Hill et al. |
| 2023/0351845 | A1 | 11/2023 | Mendell et al. |
| 2023/0360488 | A1 | 11/2023 | Alyekhin |
| 2023/0360489 | A1 | 11/2023 | Alyekhin |
| 2023/0360490 | A1 | 11/2023 | Alyekhin |
| 2023/0360494 | A1 | 11/2023 | Alyekhin |
| 2023/0394930 | A1 | 12/2023 | Shore et al. |
| 2023/0410591 | A1* | 12/2023 | Monteverdi ........ G07F 17/3209 |
| 2024/0029511 | A1* | 1/2024 | Teruuchi ............. G07F 17/3269 |
| 2024/0086648 | A1 | 3/2024 | Han et al. |
| 2024/0086773 | A1 | 3/2024 | Oppenheimer |
| 2024/0105024 | A1 | 3/2024 | Huke et al. |
| 2024/0282296 | A1 | 8/2024 | Bhathena et al. |
| 2024/0289395 | A1 | 8/2024 | Zhou et al. |
| 2024/0290169 | A1 | 8/2024 | Inamdar et al. |
| 2024/0312312 | A1 | 9/2024 | Flint |
| 2024/0320510 | A1 | 9/2024 | Kundu et al. |
| 2024/0346256 | A1* | 10/2024 | Qin ....................... G06F 40/216 |
| 2024/0350924 | A1 | 10/2024 | Orlow |
| 2024/0362409 | A1 | 10/2024 | Kuan |
| 2024/0362968 | A1 | 10/2024 | Lyons et al. |
| 2024/0362973 | A1 | 10/2024 | Owoyemi |
| 2024/0367054 | A1* | 11/2024 | Nelson .................... A63F 13/67 |
| 2024/0378251 | A1 | 11/2024 | Boyd |
| 2024/0378940 | A1 | 11/2024 | Latifi et al. |
| 2024/0403845 | A1* | 12/2024 | O'Hanlon .............. G06Q 20/10 |
| 2024/0412058 | A1 | 12/2024 | Mayande et al. |
| 2024/0428700 | A1 | 12/2024 | Asgekar et al. |
| 2025/0046150 | A1 | 2/2025 | Huke et al. |
| 2025/0077913 | A1 | 3/2025 | Vodeniktov et al. |
| 2025/0086190 | A1* | 3/2025 | Azarmi ............. G06F 16/24578 |
| 2025/0094143 | A1 | 3/2025 | Huang |
| 2025/0094708 | A1 | 3/2025 | Cunningham et al. |
| 2025/0095438 | A1 | 3/2025 | Russ et al. |
| 2025/0103624 | A1 | 3/2025 | Carta et al. |
| 2025/0118151 | A1 | 4/2025 | Williams |
| 2025/0118156 | A1* | 4/2025 | Jovanovic ............... G06F 40/56 |
| 2025/0124063 | A1 | 4/2025 | Isslieb et al. |
| 2025/0124340 | A1 | 4/2025 | Ni et al. |
| 2025/0140075 | A1 | 5/2025 | Groset et al. |
| 2025/0157284 | A1 | 5/2025 | Wolfe et al. |
| 2025/0161811 | A1* | 5/2025 | Assaad ................. A63F 13/537 |
| 2025/0174083 | A1 | 5/2025 | Huke et al. |
| 2025/0191437 | A1 | 6/2025 | Hanson et al. |
| 2025/0191440 | A1 | 6/2025 | Bradley et al. |
| 2025/0209891 | A1* | 6/2025 | Jacquet .................. G06N 3/084 |
| 2025/0232126 | A1 | 7/2025 | Ma et al. |
| 2025/0238449 | A1 | 7/2025 | Sharma et al. |
| 2025/0265310 | A1 | 8/2025 | Barnes |
| 2025/0278633 | A1 | 9/2025 | Smith et al. |
| 2025/0291866 | A1 | 9/2025 | Park et al. |
| 2025/0294091 | A1 | 9/2025 | Mukherjee et al. |
| 2025/0299053 | A1* | 9/2025 | Cuomo .................. G06N 3/091 |
| 2025/0299536 | A1 | 9/2025 | Chun et al. |
| 2025/0307302 | A1* | 10/2025 | Kolugur .............. G06F 16/3329 |
| 2025/0307572 | A1 | 10/2025 | Shtar et al. |
| 2025/0307639 | A1 | 10/2025 | Jin et al. |
| 2025/0316134 | A1 | 10/2025 | Vaccaro |
| 2025/0316139 | A1 | 10/2025 | Vaccaro |
| 2025/0316145 | A1 | 10/2025 | Merati |
| 2025/0322092 | A1 | 10/2025 | Troiani et al. |
| 2025/0322168 | A1 | 10/2025 | Sharma |
| 2025/0322295 | A1 | 10/2025 | Brin et al. |
| 2025/0329218 | A1 | 10/2025 | Russ et al. |
| 2025/0348580 | A1 | 11/2025 | Galinkin |
| 2025/0355929 | A1 | 11/2025 | Lara Silva et al. |
| 2025/0356725 | A1 | 11/2025 | Nowak |
| 2025/0363856 | A1 | 11/2025 | Turner et al. |
| 2025/0371283 | A1 | 12/2025 | McCurdy et al. |
| 2025/0391250 | A1 | 12/2025 | Todisco et al. |
| 2026/0024524 | A1 | 1/2026 | Perkins et al. |

FOREIGN PATENT DOCUMENTS

| | | | |
|---|---|---|---|
| WO | WO-2023/140642 | A1 | 7/2023 |
| WO | WO-2024/194418 | A1 | 9/2024 |
| WO | WO-2025/019764 | A1 | 1/2025 |
| WO | WO-2025/042386 | A1 | 2/2025 |

OTHER PUBLICATIONS

Non-Final Office Action on U.S. Appl. No. 19/357,856 DTD Jan. 2, 2026.

Non-Final Office Action on U.S. Appl. No. 19/357,889 DTD Jan. 12, 2026.

Non-Final Office Action on U.S. Appl. No. 19/357,902 DTD Dec. 16, 2025.

Non-Final Office Action on U.S. Appl. No. 19/357,918 DTD Jan. 13, 2026.

Non-Final Office Action on U.S. Appl. No. 19/358,919 DTD Dec. 23, 2025.

Non-Final Office Action on U.S. Appl. No. 19/359,002 DTD Jan. 13, 2026.

Non-Final Office Action on U.S. Appl. No. 19/359,036 DTD Jan. 13, 2026.

Non-Final Office Action on U.S. Appl. No. 19/359,438 DTD Dec. 19, 2025.

Non-Final Office Action on U.S. Appl. No. 19/359,531 DTD Dec. 12, 2025.

Non-Final Office Action on U.S. Appl. No. 19/359,534 DTD Dec. 11, 2025.

Non-Final Office Action on U.S. Appl. No. 19/360,020 DTD Jan. 14, 2026.

Non-Final Office Action on U.S. Appl. No. 19/360,328 DTD Dec. 11, 2025.

Non-Final Office Action on U.S. Appl. No. 19/360,383 DTD Dec. 15, 2025.

Non-Final Office Action on U.S. Appl. No. 19/360,405 DTD Jan. 5, 2026.

Non-Final Office Action on U.S. Appl. No. 19/360,512 DTD Dec. 30, 2025.

Non-Final Office Action on U.S. Appl. No. 19/360,809 DTD Jan. 14, 2026.

Non-Final Office Action on U.S. Appl. No. 19/360,880 DTD Dec. 31, 2025.

Non-Final Office Action on U.S. Appl. No. 19/360,886 DTD Dec. 8, 2025.

Non-Final Office Action on U.S. Appl. No. 19/360,892 DTD Jan. 13, 2026.

Schick et al., "Toolformer: Language Models Can Teach Themselves to Use Tools", Feb. 9, 2023, arXiv.com, pp. 1-17 (Year: 2023).

Final Office Action on U.S. Appl. No. 19/357,902 DTD Feb. 9, 2026.

Final Office Action on U.S. Appl. No. 19/360,328 DTD Feb. 26, 2026.

Final Office Action on U.S. Appl. No. 19/360,383 DTD Feb. 3, 2026.

Lee, et al., "Sportify: Question Answering with Embedded Visualizations and Personified Narratives for Sports Video," in arXiv preprint arXiv:2408.05123 (2024). (Year: 2024).

Non-Final Office Action on U.S. Appl. No. 19/357,967 DTD Jan. 28, 2026.

Non-Final Office Action on U.S. Appl. No. 19/358,916 DTD Jan. 28, 2026.

Non-Final Office Action on U.S. Appl. No. 19/360,307 DTD Jan. 20, 2026.

Non-Final Office Action on U.S. Appl. No. 19/360,368 DTD Jan. 28, 2026.

Non-Final Office Action on U.S. Appl. No. 19/360,597 DTD Jan. 30, 2026.

Non-Final Office Action on U.S. Appl. No. 19/360,886 DTD Feb. 19, 2026.

(56) References Cited

OTHER PUBLICATIONS

Notice of Allowance on U.S. Appl. No. 19/359,534 DTD Feb. 11, 2026.
Notice of Allowance on U.S. Appl. No. 19/360,873 DTD Jan. 26, 2026.
Structure Guided Prompt: Instructing Large Language Model in Multi-Step Reasoning by Exploring Graph Structure of the Text (Year: 2024).
Final Office Action on U.S. Appl. No. 19/357,856 DTD Apr. 21, 2026.
Final Office Action on U.S. Appl. No. 19/357,889 DTD Apr. 29, 2026.
Final Office Action on U.S. Appl. No. 19/358,919 DTD Apr. 21, 2026.
Final Office Action on U.S. Appl. No. 19/360,512 DTD Apr. 22, 2026.
Final Office Action on U.S. Appl. No. 19/360,597 DTD Jun. 5, 2026.
Final Office Action on U.S. Appl. No. 19/360,809 DTD May 1, 2026.
Final Office Action on U.S. Appl. No. 19/360,880 DTD Apr. 29, 2026.
Final Office Action on U.S. Appl. No. 19/360,892 DTD May 8, 2026.
Mohsenimofidi S, Prasad AS, Zahid A, Ra?q U, Wang X, Attal MI. Classifying user intent for effective prompt engineering: A case of a chatbot for startup teams. InGenerative Al for Effective Software Development Jun. 1, 2024 (pp. 317-329). Cham: Springer Nature Switzeriand. (Year: 2024).
Non-Final Office Action on U.S. Appl. No. 19/357,902 DTD Jul. 15, 2026.
Non-Final Office Action on U.S. Appl. No. 19/359,036 DTD May 11, 2026.
Non-Final Office Action on U.S. Appl. No. 19/359,948 DTD Jun. 17, 2026.
Non-Final Office Action on U.S. Appl. No. 19/360,030 DTD May 7, 2026.
Notice of Allowance on U.S. Appl. No. 19/358,916 DTD May 13, 2026.
Notice of Allowance on U.S. Appl. No. 19/360,020 DTD Jun. 16, 2026.
Notice of Allowance on U.S. Appl. No. 19/360,307 DTD May 21, 2026.
Notice of Allowance on U.S. Appl. No. 19/360,405 DTD Apr. 24, 2026.
Final Office Action on U.S. Appl. No. 19/357,918 DTD Jul. 29, 2026.
Final Office Action on U.S. Appl. No. 19/357,967 DTD Aug. 13, 2026.
Final Office Action on U.S. Appl. No. 19/360,030 DTD Sep. 1, 2026.
Final Office Action on U.S. Appl. No. 19/360,368 DTD Aug. 26, 2026.
Final Office Action on U.S. Appl. No. 19/360,886 DTD Sep. 2, 2026.
Non-Final Office Action on U.S. Appl. No. 19/359,531 DTD Aug. 11, 2026.
Non-Final Office Action on U.S. Appl. No. 19/360,880 DTD Aug. 25, 2026.
Notice of Allowance on U.S. Appl. No. 19/357,856 DTD Sep. 8, 2026.
Notice of Allowance on U.S. Appl. No. 19/357,889 DTD Aug. 24, 2026.
Notice of Allowance on U.S. Appl. No. 19/358,919 DTD Aug. 12, 2026.
Notice of Allowance on U.S. Appl. No. 19/359,002 DTD Sep. 23, 2026.
Notice of Allowance on U.S. Appl. No. 19/359,036 DTD Sep. 3, 2026.
Notice of Allowance on U.S. Appl. No. 19/360,328 DTD Aug. 18, 2026.
Notice of Allowance on U.S. Appl. No. 19/360,512 DTD Aug. 17, 2026.

* cited by examiner

SYSTEMS AND METHODS FOR GENERATING LANGUAGE MODEL CONTEXT ACCORDING TO LOCATION-BASE NETWORK MESSAGES

CROSS-REFERENCES TO RELATED APPLICATIONS

This application claims the benefit of and priority to U.S. Provisional Patent Application No. 63/741,297, filed Jan. 2, 2025; and claims the benefit of and priority to U.S. Provisional Patent Application No. 63/708,509, filed Oct. 17, 2024; and claims the benefit of and priority to U.S. Provisional Application No. 63/708,492, filed Oct. 17, 2024; and claims the benefit of and priority to U.S. Provisional Patent Application No. 63/708,528, filed Oct. 17, 2024; and claims the benefit of and priority to U.S. Provisional Patent Application No. 63/708,542, filed Oct. 17, 2024; and claims the benefit of and priority to U.S. Provisional Patent Application No. 63/708,504, filed Oct. 17, 2024; and claims the benefit of and priority to U.S. Provisional Patent Application No. 63/711,415, filed Oct. 24, 2024; and claims the benefit of and priority to U.S. Provisional Patent Application No. 63/708,554, filed Oct. 17, 2024; and claims the benefit of and priority to U.S. Provisional Patent Application No. 63/719,406, filed Nov. 12, 2024; and claims the benefit of and priority to U.S. Provisional Patent Application No. 63/741,671, filed Jan. 3, 2025; the contents of each of which are incorporated herein by reference in their entireties for all purposes.

BACKGROUND

Network environments can support communication between multiple computing devices using techniques such as packet-switching. Data transmitted between devices can be synchronized such that multiple devices on the same network access the same information. However, it can be challenging to efficiently synchronize data transmission for graphical elements using conventional networking technology.

SUMMARY

At least one aspect relates to a system. The system can maintain a data structure comprising a plurality of wager opportunities corresponding to a plurality of live events. The system can receive, from a client device, a prompt comprising a request for a wager recommendation. The system can generate, using a language model and the prompt, output identifying at least one wager opportunity of the plurality of wager opportunities selected to satisfy the request. The system can provide the output to the client device in response to the request.

In some implementations, the system can establish a communication session responsive to a message received from the client device and store the prompt and the output in a second data structure corresponding to the communication session. In some implementations, the system can provide a graphical user interface comprising an input field and an output region. The system can receive the prompt via the input field and provide the output for presentation at the client device via the output region.

In some implementations, the system can generate an input context for the language model using the prompt and the data structure and provide the input context as input to the language model. In some implementations, the system can identify a subset of the plurality of wager opportunities using the prompt and generate the input context using data of the subset. In some implementations, the client device is associated with a player profile, and the system can receive a second request to place at least one wager from the client device and update the player profile according to the second request to place the at least one wager.

In some implementations, the system can receive an update corresponding to at least one live event of the plurality of live events and modify the data structure based on the update to the at least one live event. In some implementations, the prompt is a first prompt, and the system can receive, from the client device, a second prompt identifying an attribute for the wager recommendation and generate the output using the language model, the first prompt, and the second prompt. In some implementations, the client device is associated with a player profile, and the system can generate the output further based on one or more historical wagers identified in the player profile. In some implementations, the system can determine an intent metric based on the prompt and generate the output further based on the intent metric.

At least one other aspect relates to a method. The method can include maintaining a data structure comprising a plurality of wager opportunities corresponding to a plurality of live events. The method can include receiving, from a client device, a prompt comprising a request for a wager recommendation. The method can include generating, using a language model and the prompt, output identifying at least one wager opportunity of the plurality of wager opportunities selected to satisfy the request. The method can include providing the output to the client device in response to the request.

In some implementations, the method can include establishing a communication session responsive to a message received from the client device and storing the prompt and the output in a second data structure corresponding to the communication session. In some implementations, the method can include providing a graphical user interface comprising an input field and an output region. In some implementations, the method can include receiving the prompt via the input field and providing the output for presentation at the client device via the output region.

In some implementations, the method can include generating an input context for the language model using the prompt and the data structure and providing the input context as input to the language model. In some implementations, the method can include identifying a subset of the plurality of wager opportunities using the prompt and generating the input context using data of the subset. In some implementations, the client device is associated with a player profile, and the method can include receiving a second request to place at least one wager from the client device and updating the player profile according to the second request to place the at least one wager.

In some implementations, the method can include receiving an update corresponding to at least one live event of the plurality of live events and modifying the data structure based on the update to the at least one live event. In some implementations, the prompt is a first prompt, and the method can include receiving, from the client device, a second prompt identifying an attribute for the wager recommendation and generating the output using the language model, the first prompt, and the second prompt. In some implementations, the client device is associated with a player profile, and the method can include generating the output further based on one or more historical wagers identified in the player profile. In some implementations, the method can include determining an intent metric based on the prompt and generating the output further based on the intent metric.

At least one aspect relates to a system. The system can include one or more processors coupled to non-transitory memory. The system can receive, from a client device, a prompt for a language model. The system can determine, using the prompt, a classification of an intent for the prompt. The system can generate an input context for the language model using the prompt and the classification of the intent. The system can generate, using the language model and the input context, an output message in response to the prompt.

In some implementations, the system can determine that the classification indicates an unknown intent. In some implementations, the system can provide an indication to the client device that the classification indicates the unknown intent. In some implementations, the system can receive a second prompt from the client device in response to the indication. In some implementations, the system can generate a second input context for the language model based on the prompt and the second prompt. In some implementations, the system can generate, using the language model and the second input context, a second output message in response to the second prompt.

In some implementations, the classification of the intent indicates a request for a wager opportunity. In some implementations, the system can retrieve a set of wager opportunities corresponding to the intent. In some implementations, the system can generate the input context further based on the set of wager opportunities. In some implementations, the system can generate the classification of the intent by executing a machine-learning model trained to generate intent classifications. In some implementations, the system can identify a training dataset comprising a plurality of training examples, each example of the plurality of training examples comprising input text data and a corresponding ground truth intent classification. In some implementations, the system can train the machine-learning model using the training dataset. In some implementations, the machine-learning model comprises the language model.

In some implementations, the classification of the intent corresponds to one or more of a request for one or more wager recommendations, a request to modify a wager, a request for information relating to a live event, a request for information relating to a sports team, a request for information relating to at least one wager opportunity, a request to place a wager, or a request for information maintained by the one or more processors. In some implementations, the system can generate a plurality of portions of the prompt. In some implementations, the system can generate a plurality of classifications of intent for the plurality of portions, respectively. In some implementations, the system can generate the input context further based on the plurality of classifications of intent for the plurality of portions. In some implementations, the system can extract one or more wager attributes from the prompt based on the classification of the intent. In some implementations, the system can generate the input context further based on the one or more wager attributes.

At least one other aspect relates to a method. The method can include receiving, from a client device, a prompt for a language model. The method can include determining, using the prompt, a classification of an intent for the prompt. The method can include generating an input context for the language model using the prompt and the classification of the intent. The method can include generating, using the language model and the input context, an output message in response to the prompt.

In some implementations, the method can include determining that the classification indicates an unknown intent. The method can include providing an indication to the client device that the classification indicates the unknown intent. In some implementations, the method can include receiving a second prompt from the client device in response to the indication. In some implementations, the method can include generating a second input context for the language model based on the prompt and the second prompt. In some implementations, the method can include generating, using the language model and the second input context, a second output message in response to the second prompt.

In some implementations, the classification of the intent indicates a request for a wager opportunity. In some implementations, the method can include retrieving a set of wager opportunities corresponding to the intent. In some implementations, the method can include generating the input context further based on the set of wager opportunities. In some implementations, the method can include generating the classification of the intent by executing a machine-learning model trained to generate intent classifications. In some implementations, the method can include identifying a training dataset comprising a plurality of training examples, each example of the plurality of training examples comprising input text data and a corresponding ground truth intent classification. The method can include training the machine-learning model using the training dataset. In some implementations, the machine-learning model comprises the language model.

In some implementations, the classification of the intent corresponds to one or more of a request for one or more wager recommendations, a request to modify a wager, a request for information relating to a live event, a request for information relating to a sports team, a request for information relating to at least one wager opportunity, a request to place a wager, or a request for information maintained by the one or more processors. In some implementations, the method can include generating a plurality of portions of the prompt. In some implementations, the method can include generating a plurality of classifications of intent for the plurality of portions, respectively. In some implementations, the method can include generating the input context further based on the plurality of classifications of intent for the plurality of portions. In some implementations, the method can include extracting one or more wager attributes from the prompt based on the classification of the intent. The method can include generating the input context further based on the one or more wager attributes.

At least one aspect relates to a system. The system can include one or more processors coupled to non-transitory memory. The system can receive, from a client device during a communication session, a first prompt for a language model. The system can determine that an intent of the first prompt for the language model does not satisfy one or more classification criteria. Responsive to determining that the intent does not satisfy the one or more classification criteria, the system can generate a message using the language model based on the first prompt, the message identifying at least one candidate intent. The system can receive, from the client device, a second prompt for the language model in response to the message. The system can generate a classification of the intent for the communication session based on the first prompt and the second prompt.

In some implementations, the system can generate the classification of the intent using the language model. In some implementations, the system can identify a training dataset comprising a plurality of training examples, each example of the plurality of training examples comprising a respective input prompt having ambiguous intent and a corresponding ground truth output message identifying one or more candidate intents. In some implementations, the system can train the language model using the training dataset. In some implementations, the system can generate the classification of the intent using a machine-learning model different from the language model.

In some implementations, the language model is a large language model comprising a generative pre-trained transformer (GPT) model. In some implementations, the system can determine a plurality of candidate intents based on the first prompt, the plurality of candidate intents including the at least one candidate intent, the message identifying the plurality of candidate intents. In some implementations, the system can provide the message to the client device in response to the first prompt. In some implementations, the classification of the intent corresponds to one or more of a request for a wager recommendation, a request to modify a wager, a request for information relating to a live event, a request for information relating to at least one wager opportunity, a request to place a wager, or a request for information maintained by the one or more processors.

In some implementations, the client device is associated with a player profile, and the system can generate the classification of the intent for the communication session further based on data of the player profile associated with the client device. In some implementations, the system can establish the communication session in response to a request from an application executing on the client device. In some implementations, the system can generate a second message for the communication session in response to the request. In some implementations, the system can determine the intent for the communication session further based on the second message.

At least one other aspect relates to a method. The method can include receiving, from a client device during a communication session, a first prompt for a language model. The method can include determining that an intent of the first prompt for the language model does not satisfy one or more classification criteria. Responsive to determining that the intent does not satisfy the one or more classification criteria, the method can include generating a message using the language model based on the first prompt, the message identifying at least one candidate intent. The method can include receiving, from the client device, a second prompt for the language model in response to the message. The method can include generating a classification of the intent for the communication session based on the first prompt and the second prompt.

In some implementations, the method can include generating the classification of the intent using the language model. In some implementations, the method can include identifying a training dataset comprising a plurality of training examples, each example of the plurality of training examples comprising a respective input prompt having ambiguous intent and a corresponding ground truth output message identifying one or more candidate intents. In some implementations, the method can include training the language model using the training dataset. In some implementations, the method can include generating the classification of the intent using a machine-learning model different from the language model. In some implementations, the method can include selecting a language model comprising a generative pre-trained transformer (GPT) model.

In some implementations, the method can include determining a plurality of candidate intents based on the first prompt, the plurality of candidate intents including the at least one candidate intent, the message identifying the plurality of candidate intents. In some implementations, the method can include providing the message to the client device in response to the first prompt. In some implementations, the classification of the intent corresponds to one or more of a request for a wager recommendation, a request to modify a wager, a request for information relating to a live event, a request for information relating to at least one wager opportunity, a request to place a wager, or a request for information maintained by the one or more processors.

In some implementations, the client device is associated with a player profile, and the method can include generating the classification of the intent for the communication session further based on data of the player profile associated with the client device. In some implementations, the method can include establishing the communication session in response to a request from an application executing on the client device. In some implementations, the method can include generating a second message for the communication session in response to the request. In some implementations, the method can include determining the intent for the communication session further based on the second message.

At least one aspect relates to a system. The system can maintain a vector database comprising an encoded set of wager opportunities corresponding to a plurality of live events. The system can receive, during a communication session from a client device, a prompt for a language model, the prompt identifying at least one request corresponding to a live event. The system can generate, using the prompt, a set of values corresponding to the vector database. The system can query the vector database using the set of values to retrieve at least one encoded wager of the encoded set of wagers. The system can generate an input context to provide to the language model based on the prompt and the at least one encoded wager. The system can generate, using the language model and the input context, an output message in response to the prompt. The system can provide the output message to the client device in response to the prompt.

In some implementations, the system can identify odds associated with the at least one encoded wager. In some implementations, the system can update the output message generated by the language model to include the odds associated with the at least one encoded wager. In some implementations, the system can execute a vector search operation using at least a portion of the prompt to identify the at least one encoded wager. In some implementations, the system can identify a set of wagers corresponding to the plurality of live events. In some implementations, the system can generate the encoded set of wagers using an embeddings model. In some implementations, the system can identify odds corresponding to the at least one encoded wager. In some implementations, the system can modify the output message to include the odds corresponding to the at least one encoded wager.

In some implementations, the system can maintain, in the vector database, an encoded set of event information corresponding to the plurality of live events. In some implementations, the system can retrieve, in response to a second prompt for the language model corresponding to a request for live event information, a subset of the encoded set of event information. In some implementations, the system can generate a second output message using the language model and a second input context generated based on the second prompt and the subset of the encoded set of event information. In some implementations, the system can identify an additional wager corresponding to at least one of the plurality of live events.

In some implementations, the system can update the encoded set of wagers to include the additional wager in an encoded format in response to identifying the additional wager. In some implementations, the system can update the vector database according to an update schedule. In some implementations, the system can generate an encoded prompt using a tokenizer model and the prompt. In some implementations, the system can generate the input context by combining the encoded prompt with the at least one encoded wager. In some implementations, the system can store a data structure identifying the communication session in association with the player profile, the data structure comprising the prompt and the output message.

At least one other aspect relates to a method. The method can include maintaining a vector database comprising an encoded set of wager opportunities corresponding to a plurality of live events. The method can include receiving, during a communication session from a client device, a prompt for a language model, the prompt identifying at least one request corresponding to a live event. The method can include generating, using the prompt, a set of values corresponding to the vector database. The method can include querying the vector database using the set of values to retrieve at least one encoded wager of the encoded set of wagers. The method can include generating an input context to provide to the language model based on the prompt and the at least one encoded wager. The method can include generating, using the language model and the input context, an output message in response to the prompt. The method can include providing the output message to the client device in response to the prompt.

In some implementations, the method can include identifying odds associated with the at least one encoded wager. In some implementations, the method can include updating the output message generated by the language model to include the odds associated with the at least one encoded wager. In some implementations, querying the vector database can include executing a vector search operation using at least a portion of the prompt to identify the at least one encoded wager. In some implementations, the method can include identifying a set of wagers corresponding to the plurality of live events. In some implementations, the method can include generating the encoded set of wagers using an embeddings model.

In some implementations, the method can include identifying odds corresponding to the at least one encoded wager. In some implementations, the method can include modifying the output message to include the odds corresponding to the at least one encoded wager. In some implementations, the method can include maintaining, in the vector database, an encoded set of event information corresponding to the plurality of live events. In some implementations, the method can include retrieving, in response to a second prompt for the language model corresponding to a request for live event information, a subset of the encoded set of event information. In some implementations, the method can include generating a second output message using the language model and a second input context generated based on the second prompt and the subset of the encoded set of event information.

In some implementations, the method can include identifying an additional wager corresponding to at least one of the plurality of live events. In some implementations, the method can include updating the encoded set of wagers to include the additional wager in an encoded format in response to identifying the additional wager. In some implementations, the method can include updating the vector database according to an update schedule. In some implementations, the method can include generating an encoded prompt using a tokenizer model and the prompt. In some implementations, the method can include generating the input context by combining the encoded prompt with the at least one encoded wager. In some implementations, the method can include storing a data structure identifying the communication session in association with the player profile, the data structure comprising the prompt and the output message.

At least one aspect relates to a system. The system can maintain a data structure identifying a plurality of historical actions performed using a player profile. The system can maintain a vector database comprising a plurality of encoded wager opportunities. The system can receive, from a client device during a communication session, a prompt identifying a request for a wager recommendation. The system can generate, using the prompt, an encoded data structure comprising at least a subset of the plurality of historical actions in an encoded format. The system can select, from the vector database, at least one encoded wager opportunity of the plurality of encoded wager opportunities based on the encoded data structure. The system can generate, using a language model, the prompt, the encoded data structure, and the at least one encoded wager opportunity to generate an output message identifying the wager recommendation in response to the prompt.

In some implementations, the system can receive an update to at least one wager. In some implementations, the system can update the vector database to include the update to the at least one wager in an encoded format. In some implementations, the system can receive the update to the at least one wager from an external computing system. In some implementations, the system can generate an input context using the prompt, the encoded data structure, and the at least one encoded wager. In some implementations, the system can provide the input context to the language model to generate the output message.

In some implementations, the system can receive a second prompt identifying a plurality of wager selections. In some implementations, the system can generate a parlay wager including the plurality of wager selections. In some implementations, the system can execute the language model using the second prompt, the encoded data structure, and the parlay wager to generate a second output message identifying the parlay wager. In some implementations, the system can determine a wager type identified in the prompt. In some implementations, the system can select the at least one encoded wager further based on the wager type.

In some implementations, the system can determine the wager type using a machine-learning model trained to generate classifications of wager types. In some implementations, the system can retrieve, using data of the at least one encoded wager, real-time odds information for the at least one encoded wager. In some implementations, the system can update the output message to include the real-time odds information. In some implementations, the at least one encoded wager can comprise real-time odds information. In some implementations, the plurality of historical actions can comprise one or more historical wagers, one or more historical interactions, one or more historical prompts, or one or more historical preferences.

At least one other aspect relates to a method. The method can include maintaining a data structure identifying a plurality of historical actions performed using a player profile. The method can include maintaining a vector database comprising a plurality of encoded wager opportunities. The method can include receiving, from a client device during a communication session, a prompt identifying a request for a wager recommendation. The method can include generating, using the prompt, an encoded data structure comprising at least a subset of the plurality of historical actions in an encoded format. The method can include selecting, from the vector database, at least one encoded wager opportunity of the plurality of encoded wager opportunities based on the encoded data structure. The method can include generating, using a language model, the prompt, the encoded data structure, and the at least one encoded wager opportunity to generate an output message identifying the wager recommendation in response to the prompt.

In some implementations, the method can include receiving an update to at least one wager. In some implementations, the method can include updating the vector database to include the update to the at least one wager in an encoded format. In some implementations, the method can include receiving the update to the at least one wager from an external computing system. In some implementations, the method can include generating an input context using the prompt, the encoded data structure, and the at least one encoded wager. In some implementations, the method can include providing the input context to the language model to generate the output message.

In some implementations, the method can include receiving a second prompt identifying a plurality of wager selections. In some implementations, the method can include generating a parlay wager including the plurality of wager selections. In some implementations, the method can include executing the language model using the second prompt, the encoded data structure, and the parlay wager to generate a second output message identifying the parlay wager. In some implementations, the method can include determining a wager type identified in the prompt. In some implementations, the method can include selecting the at least one encoded wager further based on the wager type.

In some implementations, the method can include determining the wager type using a machine-learning model trained to generate classifications of wager types. In some implementations, the method can include retrieving, using data of the at least one encoded wager, real-time odds information for the at least one encoded wager. In some implementations, the method can include updating the output message to include the real-time odds information. In some implementations, the at least one encoded wager can comprise real-time odds information. In some implementations, the plurality of historical actions can comprise one or more historical wagers, one or more historical interactions, one or more historical prompts, or one or more historical preferences.

At least one aspect relates to a system. The system can include one or more processors coupled to non-transitory memory. The system can receive, from a client device during a communication session, a prompt identifying a request for a wager recommendation. The system can determine that the prompt is to be augmented with additional information to satisfy the request for the wager recommendation. The system can retrieve, from at least one data source and based on the prompt, a set of additional contextual data to satisfy the request for the wager recommendation. The system can generate an input context using the prompt and the set of additional contextual data. The system can generate, using the language model and the input context, an output message identifying the wager recommendation.

In some implementations, the system can determine that the prompt is to be augmented with location information. In some implementations, the system can retrieve one or more candidate wagers corresponding to the location information for inclusion in the set of additional contextual data. In some implementations, the at least one data source can include one or more of the client device, a player profile associated with the client device, or a database storing information relating to one or more live events. In some implementations, the client device can be associated with a player profile. In some implementations, the system can determine that the prompt is to be augmented with profile information. In some implementations, the system can retrieve at least a subset of data stored in the player profile for inclusion in the set of additional contextual data. In some implementations, the system can determine that the prompt is to be augmented with information corresponding to one or more sports teams. In some implementations, the system can retrieve at least a subset of data from a database storing sports information for inclusion in the set of additional contextual data.

In some implementations, the system can determine that the prompt is to be augmented with information corresponding to one or more wager types. In some implementations, the system can retrieve at least a subset of data from a database storing wager information of a plurality of candidate wagers for inclusion in the set of additional contextual data. In some implementations, the system can determine that the prompt is to be augmented with odds information for at least one wager. In some implementations, the system can retrieve at least a subset of data from a database storing odds information of a plurality of wagers for inclusion in the set of additional contextual data.

In some implementations, the system can generate a classification of intent for the prompt. In some implementations, the system can determine that the prompt is to be augmented with additional information based on the classification of the intent. In some implementations, the system can generate the classification of the intent for the prompt by providing at least a portion of the prompt as input to a machine-learning model. In some implementations, the system can receive a second prompt in response to the output message. In some implementations, the system can generate a second input context using the second prompt and a second set of additional contextual information retrieved according to the second prompt. In some implementations, the system can execute the language model using the second input context to generate a second output message in response to the second prompt.

At least one other aspect relates to a method. The method can include receiving, from a client device during a communication session, a prompt identifying a request for a wager recommendation. The method can include determining that the prompt is to be augmented with additional information to satisfy the request for the wager recommendation. The method can include retrieving, from at least one data source and based on the prompt, a set of additional contextual data to satisfy the request for the wager recommendation. The method can include generating an input context using the prompt and the set of additional contextual data. The method can include generating, using the language model and the input context, an output message identifying the wager recommendation.

In some implementations, the method can include determining that the prompt is to be augmented with location information. In some implementations, the method can include retrieving one or more candidate wagers corresponding to the location information for inclusion in the set of additional contextual data. In some implementations, the at least one data source can include one or more of the client device, a player profile associated with the client device, or a database storing information relating to one or more live events. In some implementations, the client device can be associated with a player profile. In some implementations, the method can include determining that the prompt is to be augmented with profile information. In some implementations, the method can include retrieving at least a subset of data stored in the player profile for inclusion in the set of additional contextual data. In some implementations, the method can include determining that the prompt is to be augmented with information corresponding to one or more sports teams. In some implementations, the method can include retrieving at least a subset of data from a database storing sports information for inclusion in the set of additional contextual data.

In some implementations, the method can include determining that the prompt is to be augmented with information corresponding to one or more wager types. In some implementations, the method can include retrieving at least a subset of data from a database storing wager information of a plurality of candidate wagers for inclusion in the set of additional contextual data. In some implementations, the method can include determining that the prompt is to be augmented with odds information for at least one wager. In some implementations, the method can include retrieving at least a subset of data from a database storing odds information of a plurality of wagers for inclusion in the set of additional contextual data.

In some implementations, the method can include generating a classification of intent for the prompt. In some implementations, the method can include determining that the prompt is to be augmented with additional information based on the classification of the intent. In some implementations, the method can include generating the classification of the intent for the prompt by providing at least a portion of the prompt as input to a machine-learning model. In some implementations, the method can include receiving a second prompt in response to the output message. In some implementations, the method can include generating a second input context using the second prompt and a second set of additional contextual information retrieved according to the second prompt. In some implementations, the method can include executing the language model using the second input context to generate a second output message in response to the second prompt.

At least one aspect relates to a system. The system can include one or more processors coupled to non-transitory memory. The system can maintain, in one or more data structures, data corresponding to a plurality of historical wager opportunities. The system can generate, using the data corresponding to the plurality of historical wagers, a training dataset comprising a plurality of training examples, at least one training example comprising (i) a respective input prompt indicating an intent relating to wager opportunities, and (ii) a respective output message identifying information associated with at least one historical wager of the plurality of historical wager opportunities. The system can update a language model using the training dataset.

In some implementations, the system can generate a training example of the plurality of training examples wherein the respective input prompt of the training example indicates a request for information relating to a live event, and the respective output message of the training example indicates the information relating to the live event to satisfy the request. In some implementations, the respective input prompt further comprises data corresponding to the live event retrieved from one or more databases. In some implementations, the system can generate a training example of the plurality of training examples wherein the respective input prompt of the training example indicates a request for odds information, and the respective output message of the training example indicates odds of at least one historical wager of the plurality of historical wagers.

In some implementations, the system can generate a training example of the plurality of training examples wherein the respective input prompt of the training example indicates a request for location-based wager information, and the respective output message of the training example indicates at least one historical wager corresponding to a location indicated in the input prompt. In some implementations, the system can generate a training example of the plurality of training examples wherein the respective input prompt of the training example indicates a request for profile information, and the respective output message of the training example indicates at least a subset of data stored in association with a player profile. In some implementations, the system can generate a training example of the plurality of training examples that includes a plurality of input prompts and a plurality of output messages in a conversation format.

In some implementations, the system can generate a training example of the plurality of training examples wherein the respective output message of the training example indicates a classification of intent of the respective input prompt. In some implementations, the classification of the intent corresponds to one or more of a request for a wager recommendation, a request to modify a wager, a request for information relating to a live event, a request for information relating to at least one wager opportunity, a request to place a wager, or a request for information maintained by the one or more processors. In some implementations, the system can update the language model using one or more of a supervised training process or a self-supervised training process.

At least one other aspect relates to a method. The method can include maintaining, in one or more data structures, data corresponding to a plurality of historical wager opportunities. The method can include generating, using the data corresponding to the plurality of historical wagers, a training dataset comprising a plurality of training examples, at least one training example comprising (i) a respective input prompt indicating an intent relating to wager opportunities, and (ii) a respective output message identifying information associated with at least one historical wager of the plurality of historical wager opportunities. The method can include updating a language model using the training dataset.

In some implementations, the method can include generating a training example of the plurality of training examples wherein the respective input prompt of the training example indicates a request for information relating to a live event, and the respective output message of the training example indicates the information relating to the live event to satisfy the request. In some implementations, the respective input prompt further comprises data corresponding to the live event retrieved from one or more databases. In some implementations, the method can include generating a training example of the plurality of training examples wherein the respective input prompt of the training example indicates a request for odds information, and the respective output message of the training example indicates odds of at least one historical wager of the plurality of historical wagers.

In some implementations, the method can include generating a training example of the plurality of training examples wherein the respective input prompt of the training example indicates a request for location-based wager information, and the respective output message of the training example indicates at least one historical wager corresponding to a location indicated in the input prompt. In some implementations, the method can include generating a training example of the plurality of training examples wherein the respective input prompt of the training example indicates a request for profile information, and the respective output message of the training example indicates at least a subset of data stored in association with a player profile. In some implementations, the method can include generating a training example of the plurality of training examples that includes a plurality of input prompts and a plurality of output messages in a conversation format.

In some implementations, the method can include generating a training example of the plurality of training examples wherein the respective output message of the training example indicates a classification of intent of the respective input prompt. In some implementations, the classification of the intent corresponds to one or more of a request for a wager recommendation, a request to modify a wager, a request for information relating to a live event, a request for information relating to at least one wager opportunity, a request to place a wager, or a request for information maintained by the one or more processors. In some implementations, the method can include updating the language model using one or more of a supervised training process or a self-supervised training process.

These and other aspects and implementations are discussed in detail below. The foregoing information and the following detailed description include illustrative examples of various aspects and implementations and provide an overview or framework for understanding the nature and character of the claimed aspects and implementations. The drawings provide illustration and a further understanding of the various aspects and implementations and are incorporated in and constitute a part of this specification. Aspects can be combined, and it will be readily appreciated that features described in the context of one aspect of the invention can be combined with other aspects. Aspects can be implemented in any convenient form. For example, by appropriate computer programs, which may be carried on appropriate carrier media (e.g., computer readable media), which may be tangible carrier media (e.g., disks) or intangible carrier media (e.g., communications signals). Aspects may also be implemented using suitable apparatuses, which may take the form of programmable computers running computer programs arranged to implement the aspect. As used in the specification and in the claims, the singular form of "a", "an", and "the" include plural referents unless the context clearly dictates otherwise.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

Figure 1:
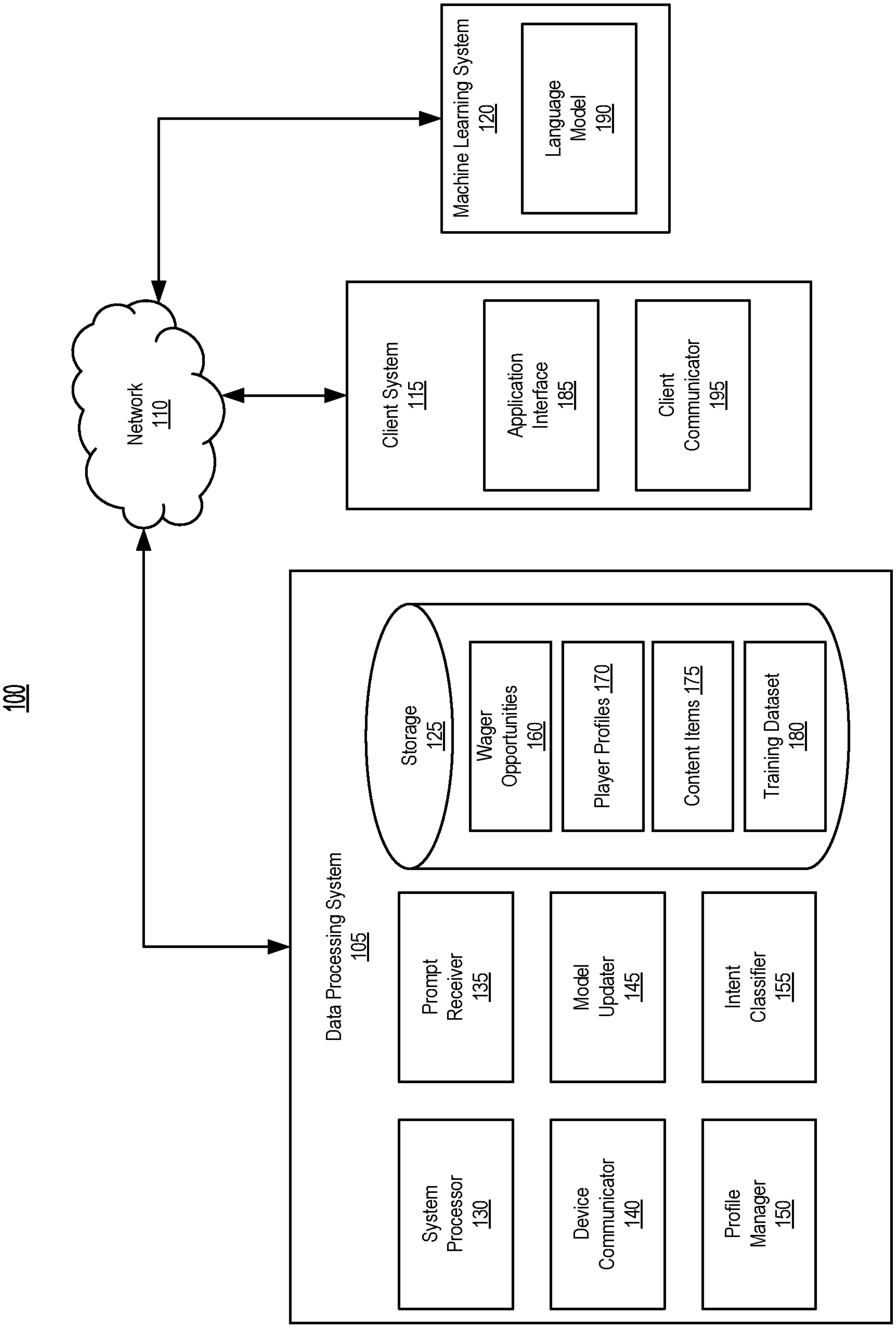
FIG. 1 illustrates a block diagram of a system to provide wager opportunities to client systems, in accordance with one or more implementations.

Below are detailed descriptions of various concepts related to, and implementations of, techniques, approaches, methods, apparatuses, and systems for providing interactive game experiences. The various concepts introduced above and discussed in greater detail below may be implemented in any of numerous ways, as the described concepts are not limited to any particular manner of implementation. Examples of specific implementations and applications are provided primarily for illustrative purposes.

Natural language processing techniques can be applied across a wide range of computing environments to generate responses or other outputs based on natural language prompts. Language models and other machine-learning models can be used in various applications, including but not limited real-time information retrieval interfaces, which can be limited according to processing capacity of the systems executing such machine-learning models. To perform such operations, a language model can process input data sequences that represent prompts, contextual information, and other relevant data.

As language models typically include a large number of parameters, invoking such language models typically requires significant processing resources that make language models challenging to use for certain applications (e.g., real-time or near real-time applications. The number of operations and the amount of memory used to process a prompt is generally influenced by the size of the input context provided to the language model. Input contexts can include historical exchanges, metadata, and/or external reference information that may be relevant to generating an accurate or contextually suitable output. Generating suitable outputs typically involves providing large amounts of information as input to language models, which can significantly hinder performance, both in terms of accuracy and execution performance (e.g., computing resource utilization).

Conventional techniques for supplying input contexts to language models fail to ameliorate these issues. For example, conventional approaches often require sending large contexts, which often include an entire accumulated input, across multiple requests to achieve a requested output. Increasing the size of the input context results in increased network latency and bandwidth consumption. During output generation, executing language models with large input contexts causes processor load and increased memory allocation that grow at rates that reduce the feasibility of using language model in many real-time or near real-time applications. As a result, existing systems experience limited throughput, excessive memory consumption, and elevated network resource usage.

The techniques described herein address these and other issues by generating targeted input contexts for a language model that include only data determined to be relevant to a given prompt. In general, the techniques can select prompt-specific subsets of available context data based on one or more classification processes and/or rule-based policies. By constructing an input context from only the selected subset, the techniques described herein can significantly reduce the processing resources needed to process the input context without omitting information that is pertinent to generating an accurate output. Such context selection operations can be perform in connection with session-based data persistence, such that follow-on prompts can be processed according to previously stored interaction data, in some implementations.

By selectively reducing the contents of an input context based on prompt relevance and by avoiding redundant transmission of static context data, the techniques described herein can lower processing time and memory requirements for language model execution. Network bandwidth consumption can also be reduced because only incremental or newly relevant data is transmitted for follow-on prompts, rather than the entire accumulated context. These improvements can provide faster response times for multi-turn interactions, sustain throughput in high-load scenarios, and enable the use of large-scale language models within low-latency applications where conventional approaches would exceed performance constraints.

In further detail, various implementations of the systems and methods described herein can be used to reduce processor utilization and memory consumption when processing prompts with additional contextual input via one or more language models or other machine-learning models. For example, a system can maintain one or more data structures storing specific information that can be automatically selected for inclusion in an input context of the language/machine-learning models. As noted above, the computing resources (e.g., computing time and/or memory/caching consumption) used to execute language models or other natural language processing functions on computers increase at least quadratically with the size of the input context (e.g., the input data to be processed). Executing language models using existing techniques therefore restricts the context size according to the expected/target processing time of a corresponding request. For real-time or near real-time applications, such extended delays make using language models impossible to use.

To address these challenges, the systems and methods described herein can dynamically generate an input context that includes a subset of data that can be used to carry out requested computing operations. Such automatic selection may be performed, for example, according to intent classification operations executed using additional machine-learning models and/or specific rules-based selection policies. By automatically selecting certain data to be included in the input context, the systems and methods described herein automatically limit the input context for the language model to a targeted subset of available data, thereby reducing the latency (e.g., processing time) and memory allocation required to carry out the requested operations using the language model. As a result, the systems and methods described herein operate more efficiently, and allow for the use of language models in real-time or near real-time processing applications, which would otherwise be impossible to implement using existing techniques.

Referring to FIG. 1, depicted is a block diagram of an example system 100 for providing wage opportunities, in accordance with one or more implementations. In FIG. 1, the system 100 can include at least one data processing system 105, at least one network 110, at least one client system 115, and at least one machine learning system 120. In FIG. 1, the data processing system 105 can include at least one storage 125, at least one system processor 130, at least one prompt receiver 135, at least one device communicator 140, at least one model updater 145, at least one profile manager 150, and at least one intent classifier 155. The storage 125 can include one or more wager opportunities 160, and one or more training datasets 180. The client system 115 can include at least one application interface 185 and at least one device communicator 140. The machine learning system 120 can include at least one language model 190.

The data processing system 105 can include a physical computer system operatively coupled or couplable with one or more components of the system 100. The data processing system 105 can include a cloud system, a server, a distributed remote system, or any combination thereof. The data processing system 105 can include a virtual computing system, an operating system, and a communication bus to effect communication and processing. The data processing system 105 can include physical infrastructure, such as physical servers, storage devices, and network equipment housed in data centers. The data processing system 105 can include a virtual computing system, which can include cloud-based virtual machines or containers for running applications and services. The data processing system 105 can include an operating system that can function as the core manager, allocating resources, configuring processes, and maintaining seamless interaction between hardware and applications. The data processing system 105 can include a communication bus that can facilitate communication between different components within the system. The data processing system 105 can be configured to connect with external systems to allow for data exchange and service delivery to end users.

The client system 115 can include a computing system that can be used to access the functionality of the data processing system 105. The client system 115 can include a smart phone, mobile device, laptop computer, desktop computer, one or more servers, or any other type of computing device. The client system 115 can include at least one processor and a memory, e.g., a processing circuit. The memory can store processor-executable instructions that, when executed by the processor, cause the processor to perform one or more of the operations described herein. The processor can include a microprocessor, an ASIC, an FPGA, etc., or combinations thereof. The memory can include, but is not limited to, electronic, optical, magnetic, or any other storage or transmission device capable of providing the processor with program instructions. The memory can further include a floppy disk, CD-ROM, DVD, magnetic disk, memory chip, ASIC, FPGA, ROM, RAM, EEPROM, EPROM, flash memory, optical media, or any other suitable memory from which the processor can read instructions. The instructions can include code from any suitable computer programming language.

The client system 115 can include one or more devices to receive input from a user and/or to provide output to a user. For example, the output capabilities of the application interface 185 can be presented by a display device that provides visual feedback to the user. The display device can enhance the user experience with electronic displays, such as liquid crystal displays (LCD), light-emitting diode (LED) displays, or organic light-emitting diode (OLED) displays. The electronic displays can implement interactive features, including capacitive or resistive touch input, allowing for multi-touch functionality. The input functionalities can include a keyboard, mouse, or an integrated touch-sensitive panel on the display device but are not limited thereto.

The machine learning system 120 can include one or more machine learning models trained on datasets. The machine learning system 120 can include a cloud system, a server, a distributed remote system, or any combination thereof. The machine learning system 120 can include, but is not limited to, at least, central processing unit (CPU), graphics processing unit (GPU), tensor processing units (TPUs), or the like. The machine learning system 120 can include a memory operable to store one or more instructions for operating components of the machine learning system 120 and operating components operably coupled to the machine learning system 120. For example, the instructions can include firmware, software, hardware, operating systems, or embedded operating systems, among others. The machine learning system 120 can be internal to the data processing system 105. The machine learning system 120 can exist external to the data processing system 105 and can be accessed via the network 110. In some implementations, the machine learning system 120 implement or otherwise provide access to one or more application programming interfaces (APIs), via which the data processing system 105 and/or the client system 115 can access the language model 190 or other functionality of the machine learning system 120.

The network 110 can include computer networks such as the Internet, local, wide, metro, or other area networks, intranets, satellite networks, other computer networks such as voice or data mobile phone communication networks, and combinations thereof. The data processing system 105 of the system 100 can establish a communication session via the network 110, for example, with the client systems 115 and/or the machine learning system 120. Establishing a communication session can refer to creating a temporary connection between two or more devices to exchange information. For example, this can include setting up a data exchange session between the client system 115 and the data processing system 105. The network 110 may be any form of computer network that can relay information between the data processing system 105, the client system 115, the machine learning system 120, and one or more information sources, such as web servers or external databases, amongst others. The network 110 can include the Internet and/or other types of data networks, such as a local area network (LAN), a wide area network (WAN), a cellular network, a satellite network, or other types of data networks. The network 110 can include any number of computing devices (e.g., computers, servers, routers, network switches, etc.) that are configured to receive and/or transmit data within the network 110. The network 110 can further include any number of hardwired and/or wireless connections. Any or all of the computing devices described herein (e.g., the data processing system 105, the client system 115, the machine learning system 120, etc.) can communicate wirelessly (e.g., via Wi-Fi, cellular, radio, etc.) with a transceiver that is hardwired (e.g., via a fiber optic cable, a CAT5 cable, etc.) to other computing devices in the network 110. Any or all of the computing devices described herein can communicate wirelessly with the computing devices of the network 110 via a proxy device (e.g., a router, network switch, or gateway).

The data processing system 105 is shown as including the storage 125. The storage 125 can be a computer-readable memory that can store or maintain any of the information described herein. The storage 125 can store data associated with the system 100. The storage 125 can include one or more hardware memory devices to store binary data, digital data, or the like. The storage 125 can include one or more electrical components, electronic components, programmable electronic components, reprogrammable electronic components, integrated circuits, semiconductor devices, flip flops, arithmetic units, or the like. The storage 125 can include at least one of a non-volatile memory device, a solid-state memory device, a flash memory device, or a NAND memory device. The storage 125 can include one or more addressable memory regions disposed on one or more physical memory arrays. A physical memory array can include a NAND gate array disposed on, for example, at least one of a particular semiconductor device, an integrated circuit device, or a printed circuit board device. In an aspect, the storage 125 can correspond to a non-transitory computer readable medium. In an aspect, the non-transitory computer readable medium can include one or more instructions executable by the system processor 130.

The storage 125 can store/maintain one or more data structures, which can include containers, indices, or otherwise store each of the values, pluralities, sets, variables, vectors, numbers, or thresholds described herein. In some implementations, the storage 125 can store, modify, or otherwise maintain any of the information described herein using one or more databases. The storage 125 can be accessed using one or more memory addresses, index values, or identifiers of any item, structure, or region maintained in the storage 125. The storage 125 can be accessed by the components of the data processing system 105, the client system 115, the machine learning system 120, or any other computing device described herein, via the network 110. The storage 125 can be internal to the data processing system 105. The storage 125 can exist external to the data processing system 105 and can be accessed via the network 110. For example, the storage 125 can be distributed across many different computer systems (e.g., a cloud computing system) or storage elements and may be accessed via the network 110 or a suitable computer bus interface.

The data processing system 105, the client system 115, or the machine learning system 120 can store in the storage 125 the results of any or all computations, determinations, selections, identifications, generations, constructions, or calculations in one or more data structures indexed or identified with appropriate values. Any or all values stored in the storage 125 can be accessed by any computing device described herein, such as the data processing system 105, the client system 115, or the machine learning system 120, to perform any of the functionalities or functions described herein. In implementations where the storage 125 forms a part of a cloud computing system, the storage 125 can be a distributed storage medium in a cloud computing system and can be accessed by any of the components of the data processing system 105, the client system 115, the machine learning system 120, or by any other computing devices described herein.

The storage 125 can store wager opportunities 160 for one or more live events. The wager opportunities 160 can include event information, identifying the specific live event each wager is tied to, such as team names, game details, etc. The wager opportunities 160 can include bet options, including different types of bets available for each event, such as moneyline, point spread, or over/under, among other markets. The wager opportunities 160 can include odds, for example, the payout ratio associated with each wager and how much a winning wager would return. The wager opportunities 160 can include an indication of a live event. The live event can function as an identifier or reference, pointing to a specific ongoing or upcoming live event from. The wager opportunities 160 can include an indication of a parlay or a single bet recommendation. For example, the wager opportunities 160 can include flags or markers indicating whether a wager is a parlay or a single bet. The wager opportunities 160 can include a record of the number of wagers placed. The wager opportunities 160 can include data corresponding to historical wager opportunities (e.g., past wagers) used to calculate or adjust the odds associated with the current wager opportunities.

In some implementations, odds associated with wager opportunities 160 can be dynamically adjusted based on various factors, such as live event data/developments, fluctuations in betting volume, and historical wager patterns, among others. In some implementations, upon detecting significant events, such as scores or timeouts, the data processing system 105 can recalculate and adjust wager odds. In some implementations, the data processing system 105 can track the popularity of specific wager types, such as quick single game parlays (Quick SGPs), by tracking the number of times the corresponding wager types have been selected. Furthermore, based on prompts and betting trends, the data processing system 105 can categorize or flag wager opportunities 160 as components or legs of parlay wagers.

The storage 125 can store one or more content items 175. The content item 175 can be any digital content that can include different content formats, including media and interactive modules. The content item 175 can be visual or graphical elements used within the application. For example, the content item 175 can include an image, such as a preview, icon, or other visual representations associated with specific application interfaces. The content item 175 can include an interactive element, which can be a button, link, or any clickable component. When a user interacts with the interactive elements (e.g., select, click-on, touch, hover), the interaction can trigger navigation within the application running on the client system 115. The content item 175 can provide attributes for the corresponding application interface. The content item 175 can include an event identifier (ID), which can be an identifier for a specific event within the application. In some implementations, the content item 175 can include, but is not limited to, creator ID, sport type, bet limits, odds limits, event status, expiration time, or event information, among other attributes/properties/characteristics. An event can be referred to as any sporting or competitive activity that functions as the basis for wagering. In some implementations, an event may refer to any video or broadcast stream for which wagers can be provided. In some implementations, events can refer to specific moments within a live sporting event upon which wagers can be placed (e.g., events for which live betting can occur). The event can include specific sporting events, tournaments, brackets, or other any activity or outcome on which wager(s) can be placed, including but not limited to individual contests between teams or players. The event can include entire competitions with multiple live events.

The storage 125 can store one or more training datasets 180. A training dataset 180 can include a collection of structured data used to train the language model 190 (or other machine learning models described herein) to perform specific tasks. The data processing system 105 can collect data from sources such as sports data providers, betting platforms, user interactions, and more, through data extraction. The data processing system 105 can address missing values, inconsistencies, and outliers to maintain data quality, for example, through data cleaning or preprocessing. The data processing system 105 can aggregate data from multiple sources to generate training datasets 180. In some implementations, the data processing system 105 can generate additional training datasets 180 through techniques such as random cropping, flipping, or data augmentation. In some implementations, the data processing system 105 can generate artificial data to supplement training datasets 180 via synthetic data generation techniques. In some implementations, the data processing system 105 can assign labels or tags to data points for supervised learning tasks through labeling and annotation. In some implementations, the data processing system 105 can generate additional features or transform existing ones to improve model performance through feature engineering.

The training dataset 180 can function as a knowledge base from which the machine learning models learn patterns and relationships. The training dataset 180 can include various data formats, including text, numerical data, and structured data related to sports events, teams, player statistics, and betting odds, among others. The training dataset 180 can be comprised of individual data points, referred to as training examples. Each training example can include an input and a corresponding output.

For example, the training dataset 180 may include pairs of input prompts and output responses, which may be used to train/update the language model 190 and/or adapters therefor. The input prompts may include natural language prompts that may have been transmitted by one or more players, as well as any other additional input context data that may be used to generate corresponding output. The training dataset 180 can be comprised of individual data points, referred to as training examples. Each training example can include an input and a corresponding output. In supervised learning, the training dataset 180 can include labeled examples where the input can include a specific sporting event (e.g., a basketball game between Team A and Team B), as well as an identifier of a wager opportunity 160 (or simulated/historical wager opportunity), which may include bet type (e.g., moneyline) and corresponding odds.

In one example, the training examples may include input data from one or more players as well as structured data providing search results of one or more historical wager opportunities 160 retrieved based on the corresponding input data. For example, the input context may include natural language text requesting a wager for a particular sports team, intent information derived from the natural language text (as described herein), and structured data of one or more wager opportunities 160 corresponding to the natural language text. The output data of the training example may include natural language output relating to the particular structured data.

The data processing system 105 can include the system processor 130. The system processor 130 can execute one or more instructions associated with the data processing system 105. The system processor 130 can include an electronic processor, an integrated circuit, or the like, including one or more of digital logic, analog logic, digital sensors, analog sensors, communication buses, volatile memory, nonvolatile memory, and the like. The system processor 130 can include, but is not limited to, at least one central processing unit (CPU), graphics processing unit (GPU), physics processing unit (PPU), tensor processing unit (TPU), embedded controller (EC), or the like. The system processor 130 can include a memory operable to store or storing one or more instructions for operating components of the system processor 130 and operating components operably coupled to the system processor 130. For example, the one or more instructions can include one or more of firmware, software, hardware, operating systems, or embedded operating systems. The system processor 130 or the data processing system 105 can include one or more communication bus controllers to effect communication between the system processor 130 and the other elements of the data processing system 105.

The data processing system 105 can include the prompt receiver 135. The prompt receiver 135 can be or include any script, file, program, application, set of instructions, or computer-executable code that is configured to process input data in the form of a prompt. The prompt receiver 135 can include hardware, software, or any combination. A prompt can include to any user-provided command, request, or text data. The prompt may include a request or information relating to bet placement, such as an indication of a wager type, a wager amount, or selecting specific live events or outcomes. The prompt receiver 135 can receive the prompt from the client system 115 in natural language (e.g., a text string). The prompt receiver 135 can receive prompts through user interactions with the application interface 185. User interactions can include clicking buttons, entering text, or using voice commands within one or more application interfaces 185, among others. In some implementations, the prompt receiver 135 can expose an API endpoint, allowing other applications or systems to send prompts in structured formats such as JavaScript Object Notation (JSON) or XML. In some implementations, the prompt receiver 135 can subscribe to a message queue where prompts are published by other components/devices of the system 100, for example, according to a publisher-subscriber communication protocol. In some implementations, the prompt receiver 135 can be configured to identify specific events or triggers, such as user actions or system state changes, which can generate prompts. In some implementations, the prompt receiver 135 can process prompts loaded from files stored on the data processing system 105.

In some implementations, the prompt receiver 135 can be configured to parse and process the prompts to extract information, such as wager type, amount, and live event selections, among others. The prompt receiver 135 can execute functions based on the prompt's content. In some implementations, the prompt receiver 135 can be configured to perform validation checks for received prompts, for example, to verify that the prompt conforms to one or more predetermined rules, such as length, content, or completeness. The prompt receiver 135 can provide a prompt, as well as any information extracted therefrom, to other components of the data processing system 105 for further processing according to the techniques described herein. The prompt receiver 135 can format the wager information or the user's input into a standardized data structure for transmission to the backend for further processing, such as logging, risk assessment, and odds calculation, among others. The prompt receiver 135 can collect or store records of player prompts (and in some implementations, conversation records including corresponding responses) in the storage 125 in one or more player profiles 170. In some implementations, the prompt receiver 135 can collect or store datasets of user prompts in the storage 125 as part of one or more training datasets 180 to improve the classification accuracy of the language model 190 over time, in some implementations.

The data processing system 105 can include the device communicator 140. The device communicator 140 can be or include any script, file, program, application, set of instructions, or computer-executable code that is configured to facilitate communication between the data processing system 105, the client system 115, and the machine learning system 120. The device communicator 140 can include hardware, software, or any combination. The device communicator 140 can facilitate communication between the data processing system 105, the network 110, the client system 115, and/or the machine learning system 120 via one or more communication interfaces. A communication interface can include, for example, an API compatible with components of the data processing system 105, the client system 115, or the machine learning system 120.

The device communicator 140 can support various communication protocols (TCP/IP, UDP) compatible with a particular component of the data processing system 105, a particular component of the client system 115, or a particular component of the machine learning system 120. The device communicator 140 can implement multiple communication interfaces, including web sockets or messaging protocols, to accommodate a range of client applications. The device communicator 140 can facilitate data transfer through techniques such as compression, encryption, and error correction, among others. The device communicator 140 can be compatible with diverse content items 175 and can be compatible with particular content delivery systems corresponding to particular content items 175, structures of data, types of data, or any combination thereof. For example, the device communicator 140 can be compatible with the transmission of text data or binary data structured according to one or more metrics or data of the application interface 185 or the client system 115. The device communicator 140 can provide the client system 115 with instructions to display lists of interactive options, such as live events, content items, or wagering opportunities.

The data processing system 105 can include the model updater 145. The model updater 145 can train, fine-tune, update, re-train, or otherwise maintain one or more machine learning models (e.g., the language model 190, etc.). The model updater 145 can include hardware, software, or any combination thereof. The model updater 145 can use various machine learning algorithms, including supervised learning techniques, to train/fine-tune/update one or more machine-learning models (e.g., the language model 190) using labeled data (e.g., one or more training datasets 180) to improve their prediction accuracy or classification capabilities. In some implementations, the model updater 145 can implement unsupervised learning techniques, such as clustering and association rule mining, to identify patterns in unlabeled data, and/or to generate labels for said unlabeled data. The model updater 145 can implement reinforcement learning techniques to update the language model 190 based on user-provided feedback or examples in one or more training datasets 180.

The model updater 145 can update the machine learning models, such as the language model 190 or adapters therefor, using one or more training examples of the training dataset 180. As described herein, each training example can include an input context and a corresponding output message. The input context can include data related to wager opportunities, deep links, historical wager information/interactions, or any other relevant information. The output message can define the response or outcome, such as text messages, recommendations, or instructions for displaying information. The configuration and training of the language model can include various training parameters, such as the learning rate, number of epochs, batch size, activation functions, and regularization techniques, to improve learning and prevent overfitting.

The model updater 145 can train/update/fine-tune the language model 190 or other machine learning components to generate text formats, provide recommendations of wager opportunities 160, classify user intents, or perform any other functionality described herein based on the training dataset 180. The model updater 145 can be configured to implement various machine learning techniques, including supervised, unsupervised, and reinforcement learning, to continuously improve the performance of language model 190. In some implementations, the model updater 145 can provide instructions, training examples (e.g., from the training data-set(s) 180, etc.) to the machine learning system 120, to cause the machine learning system 120 to train/fine-tune/update the language model(s) 190 according to the techniques described herein. In some implementations, training/updating/fine-tuning the language model 190 can involve periodic retraining using updated datasets, incorporating additional linguistic data, and refining model parameters based on performance metrics, among others. The model updater 145 can leverage feedback mechanisms and adaptive learning strategies such that the language models 190 are aligned with evolving language patterns relating to wager opportunities 160 and/or live events (or information associated therewith).

In some implementations, the model updater 145 can use Low-Rank Adaptation (LoRA), Quantized Low-Rank Adaptation (QLoRA), or other adapters to train/update/fine-tune the language model 190. The model updater 145 can use LoRA to address the challenge of fine-tuning large models without updating all parameters. For example, instead of fine-tuning all the weights in the model, the model updater 145 can inject trainable low-rank matrices into each layer of the transformer architecture to reduce the number of trainable parameters or the computational load. In some implementations, the model updater 145 can extend LoRA by incorporating quantization techniques through QLoRA. For example, the model updater 145 can combine quantization with low-rank adaptation to reduce computational load. In some implementations, the model updater 145 can use prefix tuning, which adds trainable vectors to the input sequence to guide the model's attention. In some implementations, the model updater 145 can use p-tuning, which uses continuous prompts to fine-tune the model. In some implementations, the model updater 145 can use LongLoRA, a variant of LoRA configured to manage longer sequences.

The data processing system 105 can include the profile manager 150. The profile manager 150 can be or include any script, file, program, application, set of instructions, or computer-executable code that is configured to create, modify, delete, or otherwise manage player profiles 170 stored within the profile manager 150 or within the storage 125. The profile manager 150 can include hardware, software, or any combination. The player profiles 170 can be associated with a user (sometimes referred to herein as a "player") of the client system 115 associated with a client device. The player profile 170 of a player can be a user profile that includes information about the player and information about one or more of the client systems 115 used to access the data processing system 105 using the player profile 170. For example, the identifiers of the player profile 170 can be used to access the functionality of the data processing system 105. The identifiers can include a username, a password, an e-mail address, a phone number, a personal identification number (PIN), a secret code-word, and device identifiers for use in a two-factor authentication technique, among others. The player profile 170 can store information about wagers, games, and live events that are performed by the player via the data processing system 105. The player profile 170 can store a credit balance, wager information, or side wager information (e.g., an amount of a wager/side wager, a timestamp associated with a wager/side wager, information about gaming conditions or game state information that resulted in a side wager, a client device identifier of the client system 115 that was used to place the wager/side wager, etc.). The player profile 170 can store information about the client system 115 used to access the data processing system 105, such as an IP address, a MAC address, a GUID, a player profile 170 name (e.g., the name of a user of the client system 115, etc.), and a device name, among others. In some implementations, the player profile 170 can be created by the data processing system 105 in response to the player profile 170 creation request transmitted by the client system 115.

The profile manager 150 can store and organize player information, including account details, preferences, and wager history, among others. The profile manager 150 can generate profile information based on data received from the client systems 115. This configuration can allow the profile manager 150 to capture activity across different gaming applications and different devices, and store records of that activity in the player profile 170. The profile manager 150 can update credit balances, game statistics, and other relevant information based on the outcomes of games played by the client system 115. The profile manager 150 can receive data about game results from the client system 115 and use this information to make adjustments to the player profile 170. The profile manager 150 can store game statistics such as the number of wins, losses, and ties, as well as the player's average bet size, win percentage, and longest winning streak, among others. In some implementations, the profile manager 150 can store records of player interactions, including prompts, responses, or conversation histories, with the language model 190.

The data processing system 105 can include the intent classifier 155. The intent classifier 155 can be or include any script, file, program, application, set of instructions, or computer-executable code that is configured to determine the classification of the request included in a user input, referred to as a prompt. The intent classifier can include hardware, software, or any combination. The intent classifier 155 can parse prompts received from the client system 115 to determine an intent of the prompts. For a given prompt, the data processing system 105 can use the intent classifier 155 to generate an input context for the language model 190 using the prompt and its classification. The input context can include a variety of information, such as prompts, questions, or previous parts of a conversation. The intent classifier 155 can identify the desired action or information sought by the user.

In some implementations, the intent classifier 155 can use rule-based techniques to identify user intents. For example, the intent classifier 155 can use a set of predefined rules or patterns that match specific prompts to predefined intents. In some implementations, the intent classifier 155 can use keyword matching or regular expressions to identify patterns that capture variations in prompts. For example, a rule can specify that a prompt related to placing a wager may indicate a betting intent. In some implementations, the intent classifier 155 can use machine learning models to identify a wider range of intents, including those that are context-dependent or ambiguous. For example, the intent classifier 155 can use implement vector machines (SVMs), naive bayes, or deep learning architectures such as recurrent neural networks (RNNs) and transformers (BERT). The models can be trained on large datasets of user prompts and their corresponding intents. The intent classifier 155 can use the machine learning model(s) to distinguish between user intents, such as checking odds, placing wagers, or requesting payouts, among other prompts.

The intent classifier 155 can process user prompts to extract the underlying intent or purpose. The intent classifier 155 can categorize the user's prompt into specific intents, such as placing a bet, checking odds, or requesting information about a specific game or team, among others. The intent classifier 155 can determine, select, or otherwise identify the actions to fulfill the user's request based on the classified intent. For example, if a user enters the prompt "What are the odds for Team A to win tonight?", the intent classifier 155 can determine that the prompt is a request for wagering information, identify the specific wager type as a moneyline bet, and extract relevant details such as the team's name (in this example, Team A) and the game timeframe (in this example, tonight).

In some implementations, upon receiving a prompt (e.g., a first prompt), the intent classifier 155 can process the input to identify the user's intent by processing keywords, entities, or semantic meaning. In some implementations, where the intent classifier 155 cannot identify the intent based on a first prompt, the intent classifier 155 can provide an indication to the client system 115 with a request for additional information to classify the intent. The client system 115 can transmit a second prompt to the data processing system 105. The intent classifier 155 can process the first and second prompts to identify the intended application interface 185 or the user's intent. For example, if the first prompt reads "Odds for," and the second prompt reads "Yankees game tonight," the intent classifier 155 can determine that the user intends to access the current odds for tonight's baseball game for the Yankees team.

In some implementations, based on the prompt or system-defined criteria, the intent classifier 155 can retrieve additional relevant wager opportunities 160 from the storage 125. In some implementations, the intent classifier 155 can identify additional wager opportunities 160 (or data thereof) to combine with a candidate wager opportunity 160, for example, to generate a parlay wager opportunity 160. For example, the intent classifier 155 can identify potential legs for the parlay based on available betting options identified in the wager opportunities 160. In some implementations, the intent classifier 155 or the prompt receiver 135, depending on the implementation, can process user requests for payout information. For example, upon receiving a prompt about wager winnings, the intent classifier 155, via the data processing system 105, can cause the language model 190 to generate a data structure that includes the details of the payout based on the wager's outcome and odds. In some implementations, where the intent classifier 155 receives updates (e.g., updated odds for a specific wager), the intent classifier 155 can search through the existing wager data in the storage 125 to find the corresponding wager based on identifiers (e.g., wager ID).

In some implementations, the data processing system 105, via the prompt receiver 135 or the intent classifier 155, can extract relevant keywords or metadata from the content items 175 to facilitate content discovery, for example, through search functionalities. When a user initiates a search via the application interface 185, the data processing system 105 can process the prompt and retrieve the relevant content item by matching keywords, embeddings, or other data extracted/generated from the prompt with corresponding keywords, embeddings, or other data stored with the content item. The intent classifier 155 can generate an input context for the language model 190. The data processing system 105 can transmit the input context to the language model 190, which can generate data structures corresponding to the content items.

The client system 115 can execute an application that communicates with the data processing system 105. The application can present one or more application interfaces 185. The application interface 185 can include a set of rules or protocols that allow different software programs or systems to communicate with each other. The application interface 185 can provide user interfaces to facilitate interaction. Users can input information, view content, or initiate actions through the application interface 185. In some implementations, the application interface 185 can be associated with a particular client application that communicates with the data processing system 105. The client application can include an application executing on each client system 115. The client application can include a web application, a server application, a resource, a desktop, or a file. In some implementations, the client application can include a local application (e.g., local to a client system 115), a hosted application, a software-as-a-service (SaaS) application, a virtual application, a mobile application, and other forms of content. In some implementations, the client application can include or correspond to applications provided by remote servers or third-party servers.

The application interface 185 can include graphical user interfaces that present content items, interaction modes, or wager recommendations. The application interface 185 can dynamically configure the graphical user interface based on the user's activities and preferences. The application interface 185 can receive interactions from the user, such as selections or specifications of wagers to be placed through the application interface 185. In response to receiving the interactions, the client application presenting the application interface 185 can communicate with the data processing system 105 to execute the placement of wagers. In some implementations, the application interface 185, via the client system 115, can cause the data processing system 105 to update the storage 125 to include the details of the wager counts. In some implementations, upon interaction with a graphical element, the application interface 185, via the data processing system 105, can cause the profile manager 150 to update a player profile 170 associated with the client system 115 according to the wager placed.

The client communicator 195 within the client system 115 can be similar to, and include any of the structure and functionality of, the device communicator 140 described in connection with the data processing system 105. For example, the client communicator 195 within the client system 115 can communicate with the data processing system 105 via the network 110 using one or more communication interfaces to carry out the various operations described herein. The client communicator 195 can be compatible with particular content objects and can be compatible with particular content delivery systems corresponding to particular content objects, structures of data, types of data, or any combination thereof.

The machine learning system 120 can include the language model 190. The language model 190 can be trained on text data. For instance, the language models 190 can be trained/updated/fine-tuned to perform a variety of text processing tasks, including, but not limited to, generating text, comprehending and processing natural language input, and responding to queries with contextually relevant information. The language model 190 can include a transformer architecture, such as a generative pre-trained transformer (GPT) architecture. The transformer architecture can include an encoder that can process the input text and a decoder that can generate the output text. The language model 190 can include multiple layers that can operate to process and generate text. For example, embedding layers can convert words or tokens into dense vectors of fixed size, attention layers can use mechanisms such as self-attention to weigh the importance of different tokens in a sequence, and feed-forward layers can apply transformations to the data to learn complex patterns. In some implementations, the language model 190 can use a self-attention mechanism to weight different parts of the input sequence when generating predictions. The language model 190 can be trained/fine-tuned/updated on vast datasets (e.g., one or more training datasets 180, etc.), for example, generated or updated by the model updater 145 using different learning techniques, as described herein. The language model 190 may be pre-trained using large corpuses of natural language text data, such that the language model 190 can efficiently process and provide output corresponding to natural language input.

The language model 190 can determine one or more properties of an input that corresponds to natural language. Natural language input can have a syntactic structure in which individual words, collections of words (e.g., phrases), or relative positions of words (e.g., word order) can indicate specific meanings. The language model 190 can be trained/updated/fine-tuned to parse sentences into their grammatical components to understand the structure and relationships between words. The language model 190 can use phrasing structure rules that define how words combine to form phrases and sentences. The language model 190 can receive an input context, which can include a sequence of tokens and/or text data structured in a format compatible with an input layer of the language model 190. In some implementations, the language model 190 may include or may be associated with a tokenizer model, which can convert a text-based or media-based input context into a sequence of tokens compatible with an input layer of the language model 190. The input context may include natural language, structured data, or combinations thereof, and may specify instructions for the model to generate particular output (e.g., indications of content items corresponding to wager opportunities 160, etc.) according to the techniques described herein.

The language model 190 can receive an input context generated via the intent classifier 155. As described herein, the input context can include relevant wager opportunities 160 identified based on the prompt. The data processing system 105 can transmit the input context to the language model 190. The machine learning system 120 can execute the language model 190 to process the input context. The language model 190 can generate a data structure including one or more tokens indicative of the syntactic meaning of a portion of the input context. For example, the language model 190 can tokenize the input context to identify one or more named entities or the document, and one or more syntactic relationships between portions of the input context (e.g., adjectives, verb modifiers). In some implementations, the token can indicate the beginning of specific data types, data structures (e.g., indicating wager opportunity data), or formatting instructions, among others. For example, the token can function as a marker, indicating where the instructions for displaying the generated content start.

The language model 190 can process a wide range of input formats, including but not limited to text, audio, images, video, or other modalities. In some implementations, based on the input context, the language model 190 can generate output, which can range from simple text responses to complex data structures. In some implementations, the language model 190 can use the input context to predict the next word or phrase, generate responses, or perform specific tasks.

In some implementations, based on the prompt or user intent, the language model 190 can receive input contexts from the data processing system 105 in various formats, such as text, JSON, or structured data. The language model 190 can process the input context to determine a desired output or action. In some implementations, the language model 190 can generate natural text output which may include one or more data structures or indications of one or more wager opportunities 160 or data thereof. In some implementations, the data structure can include metadata specifying the target application interface 185 to be navigated to upon interaction with the graphical element. The client system 115 can parse the received data structure and present the corresponding graphical element via the application interface 185. In some implementations, where a user interacts with the graphical element, for example, representing a wager recommendation, the data processing system 105 can update the associated player profile 170 accordingly.

The language model 190 can receive wager opportunities 160 or data thereof via the input context. For example, the input context can include details regarding the wager type (e.g., moneyline, point spread, parlay) and relevant details, such as teams, odds, and bet amounts. In some implementations, the language model 190 can generate an additional data structure or update an existing data structure in response to receiving an input context that includes updated information, such as new odds for a specific wager. The data structure can include a timestamp indicating when the update occurred and a list of changes. For example, each change can specify the field that was modified. The language model 190 can transmit the updated data structure, including the updated wager data, to the client system 115 via the data processing system 105.

In some implementations, the data processing system 105 can directly execute the language model 190 as a component. The data processing system 105 can select the language model 190 based on factors, such as computational complexity, efficiency, and task-specific capabilities, among other attributes. The data processing system 105 can determine the deployment strategy for the language model 190, such as using cloud-based APIs, deploying the language model 190 on-premises, or embedding the language model 190 directly into the data processing pipeline. The data processing system 105 can use data cleansing, tokenization, or other standardization techniques to maintain compatibility with the language mode 190. In some implementations, the data processing system 105 can implement batch processing, data streaming, or asynchronous data management techniques to manage data flow into the language model 190. In some implementations, where the data processing system 105 is using cloud-based APIs, the data processing system 105 can integrate API calls into its operational workflow. In some implementations, where the data processing system 105 is deploying the language model 190 on local infrastructure, the data processing system 105 can load the language model 190 into system memory. The data processing system 105 can format incoming data to match the input structure of the language model 190.

Figure 2A:
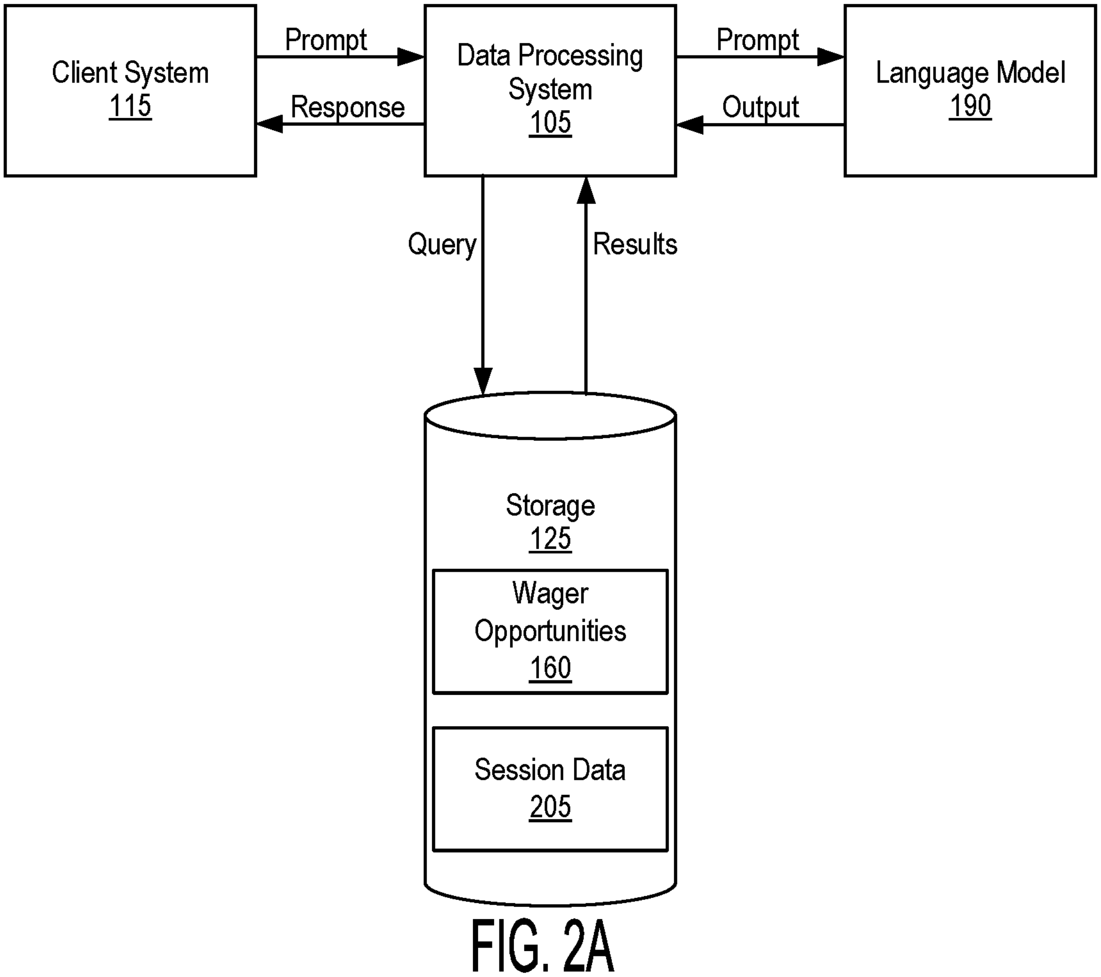
FIG. 2A illustrates a flow diagram of communication between devices included in the system of FIG. 1, in accordance with one or more implementations.

Referring to FIG. 2A in the context of the components described in connection with FIG. 1, depicted is a block diagram illustrating communication between components included in the system 100, in accordance with one or more implementations. In some implementations, the data processing system 105 may receive one or more messages from the client system 115. For example, as shown in FIG. 2A, the data processing system 105 can receive one or more prompts from the client system 115. In some implementations, the prompts may include one or more requests for services from the data processing system 105. For example, the prompts may include a request for a wager recommendation (e.g., an available conditional event, an association with a live event, etc.). As another example, the prompts may include a request for information regarding an event (e.g., a sporting event, a live event, a game, etc.).

In some implementations, the data processing system 105 may maintain one or more data structures. For example, the data processing system 105 may maintain data structures in the storage 125. As show in FIG. 2A, the data processing system 105 maintains wager opportunities 160 and session data 205 in the storage 125. In some embodiments, the wager opportunities 160 may correspond to and/or represent conditional events associated with one or more live events (e.g., games, contests, sporting events, tournaments, etc.). A data structure used to store wager scenarios and related data may be indexed, such that an indexed data structure may include one or more various types of data stores that are indexed. For example, an indexed data structure may include one or more various types of data stores that are indexed using one or more indexing methods, such as B-Tree and B+ Tree indexing, hash indexes, bitmap indexes, R-Tree indexes, clustered indexes, etc. Some embodiments may maintain multiple indexes that permit and induce a search to pursue both the target items indicated by a player and also search for alternative records that are not explicitly defined by the player. The multiple indexes may further include other associations between wagers not apparent to a player, such as alternative bet associations between a record for a wager involving a first outcome for a sports team and a wager involving a team member in the sports teams performing a specified task. The specified task may include scoring a number of points, committing a number of sports actions, etc. Some embodiments may update the indexes without updating the events themselves based on an indicated popularity for an alternative bet.

In some embodiments, historical wager scenarios can refer to a record of past wager opportunities or wager options that have been available on a betting platform. In some embodiments, the historical wager scenarios may include simulated wager scenarios used to present to a player such that a player may indicate a perceived likelihood of the simulated wager scenario occurring. For example, a wager scenario may indicate a hypothetical wager opportunity such that a player may indicate a likelihood of the hypothetical wager opportunity being presented in the next day. The historical wager scenarios can include a range of information including event details (e.g., which can specify the particular sporting event, match, or competition associated with the scenario), bet types (e.g., which can indicate different wagering options available for the event such as moneyline, point spread, parlay, etc.) odds (e.g., a probability score or values which can indicate the payout ratios for each wager option at different points in time), wager outcomes (e.g., which can indicate the final results of the event and the corresponding win/loss status for each wager type), and other relevant data (e.g., which can include additional information such as wager limits, wager popularity, or associated promotional activities), among others.

In some embodiments, a data processing system can maintain wager scenario records in storage that include wager type information. For example, the data processing system may indicate a wager opportunity or other type of wager scenario with a structured record, including fields such as an identifier, event details (sport, teams, date, time), wager type (moneyline, point spread, same-game parlay, multi-game parlay, exotic wager, etc.), odds, wager limits, and other relevant attributes (e.g., player prop, team prop), among others. In such a data structure, each respective opportunity of a set of wager opportunities may be associated with a respective wager type indicating the general type of wager for that respective opportunity.

In some implementations, the data processing system 105 can store one or more wager opportunities 160 or data thereof in a vector database. The vector database can index wager opportunities by matching line values and a second vector store to index wager opportunities by alternate line values. Some implementations may then persist these generated data stores in a persistent storage resource such that, even after the container itself is closed, the persistent storage resource will continue to store the generated vector stores. For example, some implementations may use an artificial intelligence framework to access/retrieve/load documents, articles, data tables, or other sources of text data related to wagers into a data store and extract the data into vector representations. In some implementations, the data processing system 105 can implement an indexing system, such as a system based on a Facebook Artificial Intelligence Similarity Search (FAISS) library, to index the vector representations and permit searches through one or more indexes described herein.

In some implementations, the client system 115 may transmit or provide the prompts in one or more formats. For example, the client system 115 may transmit the prompts as a natural language input (e.g., a spoken message, a written message, a verbal prompt, etc.) to the data processing system 105. The prompts may be provided via a graphical user interfaces, including but not limited to any of the graphical user interfaces described herein. In some implementations, speech recognition (e.g., execution of speech-to-text models, etc.) may enable verbally providing natural language input as one or more prompts for the language model 190.

In some implementations, the data processing system 105 may orchestrate and/or provide services to the client system 115 as at least one of a chatbot, an application programming interface (API), an API gateway, a middleware device, and/or a forwarding device. For example, the data processing system 105 may receive the prompts via one or more API calls transmits by the client system 115. In some embodiments, the data processing system 105 may execute and/or otherwise implement the language model 190. For example, the data processing system 105 may execute the language model 190 to generate one or more outputs. As another example, the data processing system 105 may provide the prompts to the language models 190.

In some embodiments, the language model 190 may generate an output that identifies one or more wager opportunities. For example, the language model 190 may generate an output that indicates and/or specifies a given wager opportunity 160. In some embodiments, the language model may determine wager opportunities based on a sentiment analysis and/or similarities between descriptions of the wager opportunities and a context of the prompts.

In some embodiments, the data processing system 105 may return the outputs to the client system 115. For example, the data processing system 105 may provide the outputs, to the client system 115, via a user interface. As another example, the data processing system 105 may provide, to the client system 115, the outputs as one or more text strings. In some embodiments, the data processing system 105 and the client system 115 may communicate via a communication session. For example, the data processing system 105 may establish a communication session responsive to receiving one or more messages (e.g., prompts) from the client system 115. In some embodiments, the data processing system 105 may establish the communication session by facilitating the transfer of data packets between the client system 115 and the data processing system 105.

In some embodiments, the data processing system 105 may store and/or otherwise maintain records of communication between the data processing system 105 and the client system 115. For example, the data processing system 105 may store, in the storage 125, the prompts transmitted by the client system 115. As another example, the data processing system 105 may store the outputs, generated by the language model 190, in the storage 125. In some embodiments, the data processing system 105 may provide one or more graphical displays. For example, the data processing system 105 may transmit one or more signals, to the client system 115, to provide a graphical user interface. In some embodiments, the graphical user interface may include one or more fields. For example, the graphical user interface may include an input field. As another example, the graphical user interface may include an output region.

In some embodiments, the client system 115 may provide the prompts via the input field. For example, the input field may refer to and/or include a text window for which text can be entered into and/or otherwise provided. As another example, the input field may include a data structure configured to receive an audible and/or spoken message. In some embodiments, the data processing system 105 may provide and/or display the output via the output region. For example, the output region may refer to and/or include a window or other graphical element that can display information. As another example, the output region may include a region or section for which the output may be presented.

In some embodiments, the data processing system 105 may generate one or more input contexts. For example, the data processing system 105 may generate input contexts for the language model 190. In some embodiments, the data processing system 105 may generate the input contexts based on the prompt and one or more data structures. For example, the data processing system 105 may generate the input contexts based on the wager opportunities 160. As another example, the data processing system 105 may generate the input contexts based on the prompts provided by the client system 115. In some embodiments, the data processing system 105 may provide the input context as one or more inputs. For example, the data processing system 105 may provide the input context as inputs to the language model 190.

In some embodiments, the data processing system 105 may identify one or more subsets. For example, the data processing system 105 may identify one or more subsets and/or portions of the wager opportunities 160. In some embodiments, the data processing system 105 may identify the subset using the prompt. For example, the data processing system 105 may identify the subsets based on one or more similarities between the prompt the subsets. As another example, the data processing system 105 may identify the subsets by using the prompt as a filter. In some embodiments, the data processing system 105 may generate the input context using data associated with the subset of wage opportunities 160.

In some embodiments, the client system 115 may be associated with one or more profiles. For example, the client system 115 may be associated with a given player profile 170. As another example, the client system 115 may provide information, to the data processing system 105, that indicates and/or identifies the player profile 170. In some embodiments, the data processing system 105 may receive one or more requests. For example, the data processing system 105 may receive requests to place one or more wagers. As another example, the data processing system 105 may receive an indication of a given wager opportunity 160.

In some embodiments, the data processing system 105 may update the player profile 170 based on the requests. For example, the data processing system 105 may update the player profile 170 to indicate that a given wager was placed or added to a bet slip of the player profile 170. As another example, the data processing system 105 may retrieve and/or otherwise allocate one or more resources of the player profile 170, to enqueue the wager for placement.

In some embodiments, the data processing system 105 may receive one or more updates. For example, the data processing system 105 may receive updates pertaining to one or more events. As another example, the data processing system 105 may receive updates pertaining to one or more given wager opportunities 160, such as odds updates. The odds updates may be real-time or near real-time changes in odds that can be stored in association with corresponding wager opportunities 160. In some embodiments, the data processing system 105 may update one or more data structures. For example, the data processing system 105 may update the storage 125 to reflect the updates to live events or odds associated therewith. As another example, the data processing system 105 may modify the storage 125 by removing one or more wage opportunities from the wager opportunities 160.

In some embodiments, the data processing system 105 may receive one or more prompts that identify attributes for wager recommendations. For example, the data processing system 105 may receive a prompt that indicates a number of resources (e.g., a wager amount) to associate with the wager recommendation. As another example, the data processing system 105 may receive a prompt that indicates a second wager recommendation to link or associate with the wager recommendation. In some embodiments, the data processing system 105 may generate, using the language model 190, the output based on the prompts that identify the attributes for the wage recommendation. Each indication, association, or information indicated in prompts described herein can be extracted and classified, for example, using the intent classification processes described herein.

In some embodiments, the data processing system 105 may generate, using the language model 190, the output based on one or more historical and/or previous wagers. For example, the data processing system 105 may use previous wagers, associated with a given player profile 170, to determine given events for which the player profile 170 has placed wagers. In some embodiments, the language model 190 may generate the output by using the previous wagers as one or more inputs and/or constraints.

In some embodiments, the data processing system 105 may determine one or more metrics. For example, the data processing system 105 may determine one or more intent metrics for the prompts. As another example, the data processing system 105 may determine context associated with the prompts. In some embodiments, the data processing system 105 may generate the output based on the intent metric. For example, the data processing system 105 may use the intent metric as a constraint and/or filter.

Figure 2B:
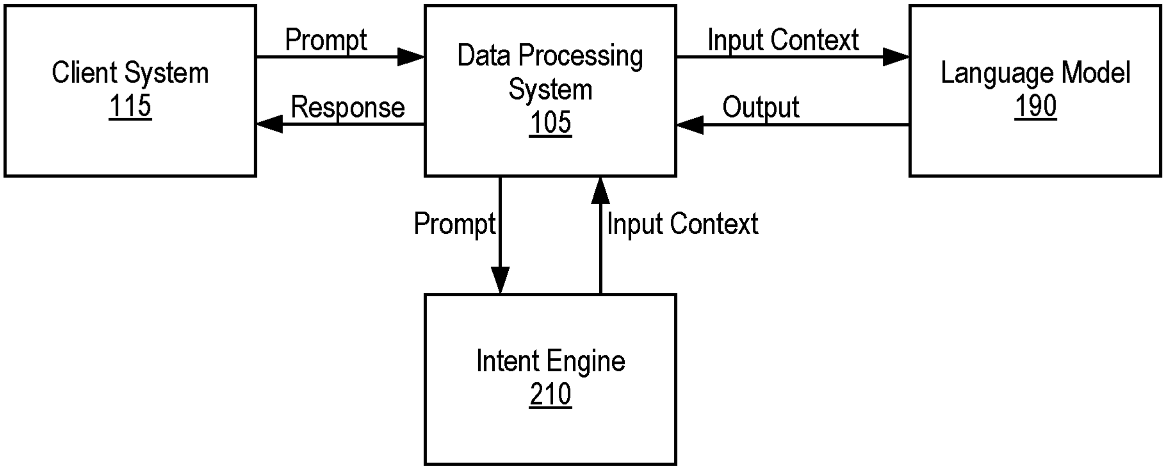
FIG. 2B illustrates a flow diagram of communication between devices included in the system of FIG. 1, in accordance with one or more implementations.

Referring to FIG. 2B in the context of the components described in connection with FIG. 1, depicted is a flow diagram block diagram illustrating communication between components included in the system 100, in accordance with one or more implementations. In some implementations, the data processing system 105 may receive one or more messages from the client system 115. For example, as shown in FIG. 2A, the data processing system 105 receives one or more prompts from the client system 115. In some implementations, the prompts may include one or more requests for services from the data processing system 105. For example, the prompts may include a request for a wager recommendation (e.g., an available conditional event, an association with a live event, etc.). As another example, the prompts may include a request for information regarding an event (e.g., a sporting event, a live event, a game, etc.).

In some implementations, the data processing system 105 may receive prompts for services by a language model. For example, the data processing system 105 may receive prompts for the language model 190, which may include generative pretrained transformer model, as described herein. In some implementations, the data processing system 105 may execute and/or implement one or more functions to determine classifications of the intent of the prompt(s) provided by the client system 115. For example, as shown in FIG. 2B, the data processing system 105 may execute an intent engine 210 to determine classifications for intents of the prompts. As another example, the intent engine 210 may determine classifications that correspond to an intent for the prompts. Stated otherwise, the intent engine 210 may determine a context, semantic meaning, and/or desired/targe attributes for information, wager opportunities, or services indicated in the prompt. In some implementations, the intent engine 210 may use and/or include one or more machine learning models to classify the intent of prompts. For example, the intent engine 210 may include a machine learning model that is trained to generate intent classifications (e.g., classifications of intents).

In some implementations, the intent engine 210 can utilize the language model 190 to classify the intent of prompts using corresponding instructions (e.g., a system prompt, additional context providing instructions to classify the intent, etc.). For example, the intent engine 210 can process the prompts through the language model 190 using the additional instructions/context information, causing the language model 130 to generate output relating to the semantic structure and context of the prompts to determine the underlying intent. In some implementations, the language model 190 can generate embeddings for the prompts, which can then be used by the intent engine 210 to match against predefined intent categories. For example, if a prompt includes phrases such as "recommend a wager" or "suggest a bet," the language model 190 can generate embeddings that the intent engine 210 can use to classify the intent as a request for a wager recommendation. In some implementations, the language model 190 can incorporate contextual information, such as the time of day or the player's previous interactions, to refine the classification process. For example, if a user frequently requests information about a specific sports team, the language model 190 can use this context to more accurately classify intents related to that team.

In some implementations, the intent engine 210 can use the language model 190 to classify the intent of prompts by employing a multi-step classification process. For example, the intent engine 210 can first preprocess the prompts to identify key phrases and entities, such as specific events or teams. The language model 190 can then analyze these elements to determine/classify the intent of the prompt. In some implementations, the language model 190 can generate a preliminary classification, which the intent engine 210 can further refine by applying additional rules or constraints. For example, if a prompt includes the phrase "place a bet on the game," the language model 190 can initially classify this as a request to place a wager. The intent engine 210 can then verify this classification by checking for additional details, such as the specific game or the type of bet. In some implementations, the intent engine 210 can also use the language model 190 to handle ambiguous prompts by generating multiple possible classifications and selecting the most likely one based on additional contextual information. For instance, if a prompt is vague, such as "I want to know more," the language model 190 can generate several potential classifications, and the intent engine 210 can use user history or other contextual data to determine the most probable intent. This may involve generating output requesting clarification for ambiguous intents, until the language model 190 generates an output classifying/determining the intent of the initial prompt (incorporating details of any further prompts provided by the player).

In some implementations, the classifications may refer to and/or include at least one of a request for one or more wager recommendations, a request to modify a wager, a request for information relating to a live event, a request for information relating to a sports team, a request for information relating to at least one wager opportunity, a request to place a wager, and/or a request for information maintained by the data processing system 105. For example, the classifications may include an indication that the prompt is a request to place a given wager. As another the classifications may include an indication that the prompt is a request for wager recommendations.

In some implementations, the intent engine 210 may generate one or more input contexts based on the prompt and the classified intent. For example, the intent engine 210 may generate an input context for the language model 190. As another example, the intent engine 210 may generate an input content using the prompt and a classification regarding the prompt (e.g., the intent). In some implementations, the intent engine 210 and/or the data processing system 105 may provide the input context to the language model 190. For example, the intent engine 210 may provide the input context via an API message.

In some implementations, the intent engine 210 may extract one or more sets of information from the prompts. For example, the intent engine 210 may extract wager attributes from the prompts. As another example, the intent engine 210 may extract information that indicates a given wager from the prompts. In some implementations, the intent engine 210 may extract the wager attributes based on the classification of the intent. For example, the intent engine 210 may search the prompt for a given set of information based on a classification associated with the prompt. As another example, the intent engine 210 may execute a given data scrapping function based on the classification associated with the prompt.

In some implementations, the intent engine 210 may generate and/or update one or more input contexts for the language model 190 based on extracted/classified intent information. For example, the intent engine 210 may generate the input context for a given prompt based on wager attributes extracted from the prompt. As another example, the intent engine 210 may generate the input context using information, extracted from the prompt, as a constraint and/or weight.

In some implementations, the intent engine 210 may determine that one or more classifications indicate an unknown intent. For example, the intent engine 210 may determine that a given classification for a prompt indicates that an intent for the prompt is unknown. In some embodiments, the intent of a prompt may be unknown when the prompt is brief, broad, non-descriptive, and/or otherwise lacking a sufficient amount of information. For example, an intent for a prompt may be unknown if the prompt is not a complete sentence, phrase, or does not include sufficient information to accurately classify the intent of the prompt.

In some implementations, the intent engine 210 may flag and/or otherwise indicate given prompts that have unknown intents or intents that cannot be classified with a sufficient confidence. For example, the intent engine 210 may return the prompts to the data processing system 105. As another example, the intent engine 210 may store and/or add the prompts, having unknown intents, to a queue and/or data cache. In some implementations, the data processing system 105 may provide one or more indications to the client system 115. For example, the data processing system 105 may provide a response, to the client system 115, that indicates that the prompt has an unknown intent. As another example, the data processing system 105 may prompt the client system 115 to provide subsequent and/or additional information.

In some implementations, the intent engine 210 may generate one or more portions of a prompt. For example, the intent engine 210 may separate and/or otherwise split a prompt into one or more sections. In some implementations, the intent engine 210 may generate classifications for each portion of a corresponding prompt. For example, the intent engine 210 may generate a first classification for a first portion of a prompt. As another example, the intent engine 210 may generate a second classification for a subsequent portion of the prompt. In some implementations, the intent engine 210 may generate an input context that reflects given individual portions of a prompt and/or a collection of the portions for the prompt. For example, a first prompt may include a first portion and a second portion. The intent engine 210 may generate a first input context for the first portion and a second input context for the second portion. As another example, the intent engine 210 may generate an input context that reflects both the first portion and the second portion.

In some implementations, the data processing system 105 may receive one or more second prompts. For example, the data processing system 105 may receive prompts responsive to the data processing system 105 indicating that a first prompt was associated with an unknown intent. As another example, the data processing system 105 may receive second prompts that provide supplemental and/or additional information, relative to a first prompt. In some implementations, the data processing system 105 may provide the second prompts to the intent engine 210. The intent engine 210 may generate one or more second input context to supplement and/or replace an original input context. For example, the intent engine 210 may generate a second input context based on the second prompts. As another example, the intent engine 210 may generate a second input context based on a classification of the second prompts.

In some implementations, the language model 190 may generate one or more outputs. For example, the language model 190 may generate an output message that is responsive to the prompt. As another example, the language model 190 may generate an output that responds to and/or addresses the intent of the prompt. In some implementations, the data processing system 105 may provide and/or transmit the output message to the client system 115. For example, the data processing system 105 may transmit one or more signals that cause the client system 115 to display a user interface which presents the output message.

In some implementations, the data processing system 105 may determine that a classification for an intent indicates a request for a wager opportunity. For example, the data processing system 105 may determine that a given prompt includes a request for a wager opportunity. In some implementations, the data processing system 105 may retrieve one or more sets of information responsive to determining that the intent indicates a request for wager opportunities. For example, the data processing system 105 may retrieve one or more wager opportunities from a database and/or a data structure (e.g., the storage 125).

In some implementations, the data processing system 105 may forward and/or otherwise provide information associated with the wager opportunities to the intent engine 210. For example, the data processing system 105 may provide a list of wager opportunities to the intent engine 210. As another example, the data processing system 105 may provide, to the intent engine 210, an indication of a location of the list of wager opportunities.

In some implementations, the intent engine 210 may generate one or more input contexts based on the wager opportunities. For example, the intent engine 210 may determine that a given subset of wager opportunities likely correspond to the prompt. The intent engine 210 may generate an input context that accounts for the given subset of wager opportunities. In some embodiments, the data processing system 105 may identify one or more datasets that include explanations and/or examples. For example, the data processing system 105 may identify training datasets that include input text data. As another example, the data processing system 105 may identify training datasets that include and/or correspond to ground truth intent classification.

In some embodiments, the data processing system 105 may train and/or reinforce the language model 190. For example, the data processing system 105 may train the language model 190 using tagged datasets. As another example, the data processing system 105 may train the language model 190 using training datasets that include the input text data and/or the ground truth intent classifications.

Figure 2C:
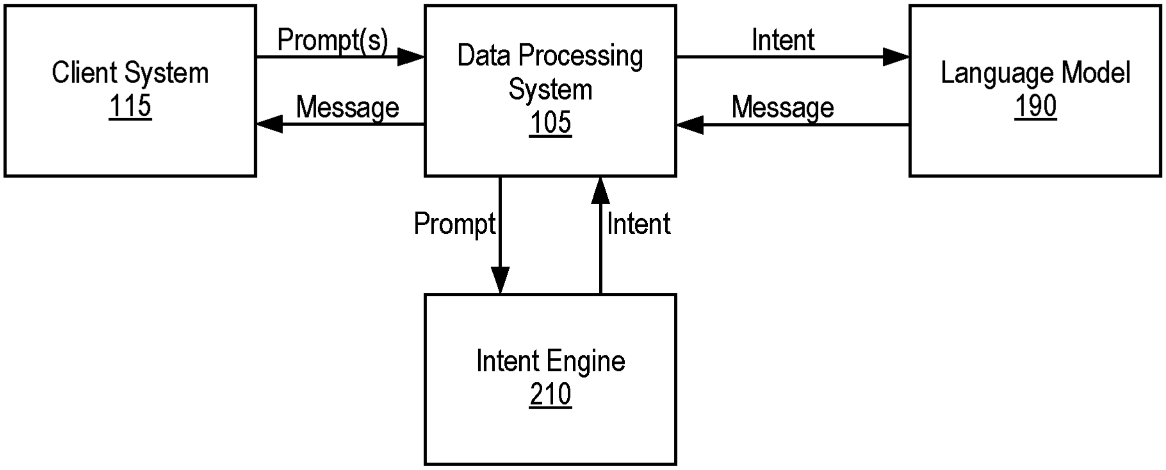
FIG. 2C illustrates a flow diagram of communication between devices included in the system of FIG. 1, in accordance with one or more implementations.

Referring to FIG. 2C in the context of the components described in connection with FIG. 1, depicted is a flow diagram illustrating communication between components included in the system 100, in accordance with one or more implementations. In some implementations, the data processing system 105 may receive one or more messages from the client system 115. For example, the data processing system 105 receives one or more prompts from the client system 115 during a communication session. As another example, the data processing system 105 may receive the prompts while the data processing system 105 is serving as a chatbot. In some implementations, the prompts may include information provided to a user interface presented by the client system 115. For example, the prompts may include a natural language message and/or a natural language input. In some implementations, the prompts may refer to and/or represent a request for information from the data processing system 105.

In some implementations, the prompts may include requests for information from the language model 190. For example, the prompts may include unformatted and/or unstructured information for which the language model 190 is trained to evaluate. As another example, the prompts may include a request for recommendations from the language model 190. In some implementations, the data processing system 105 may provide the prompts the intent engine 210. For example, the data processing system 105 may transmit the prompts, to the intent engine 210, for pre-processing. As another example, the data processing system 105 may query the intent engine 210 for an indication of an intent of the prompts (e.g., what the prompts are asking).

In some implementations, the intent engine 210 may determine that an intent for the prompts does not satisfy classification criteria. For example, the intent engine 210 may determine that the prompts are too brief (e.g., not enough information). As another example, the intent engine 210 may determine that a number of likely intents, associated with the prompts, exceeds a predetermined threshold. In some embodiments, the intent engine 210 may return and/or output one or more messages to the data processing system 105. For example, the intent engine 210 may flag given prompts for which the intent does not satisfy classification criteria. In some implementations, the intent engine 210 may generate an output that indicates a low confidence score in the accuracy of the classification of the intent.

In some implementations, the data processing system 105 may forward one or more prompts, to the language model 190, for processing. For example, the data processing system 105 may forward prompts having intent that do not satisfy the classification criteria. In some implementations, the data processing system 105 may generate one or more messages. For example, the data processing system 105 may execute the data processing system 105 to generate one or more messages that identify candidate intents. As another example, the data processing system 105 may use the language model 190 to generate messages that identify certain intents. In some implementations, the data processing system 105 may generate one or more candidate intents. For example, the data processing system 105 may generate a plurality of candidate intents.

In some implementations, the data processing system 105 may transmit the candidate intents and/or the messages to the client system 115. For example, the data processing system 105 may provide the candidate intents to the client system 115 as a response to the prompt. As another example, the data processing system 105 may return the messages as one or more suggestions regarding the prompts. The data processing system 105 may transmit the messages such that the messages identify and/or include the candidate intents. In some implementations, the data processing system 105 may receive one or more subsequent prompts. For example, the data processing system 105 may receive a second prompt that is responsive to transmission of the messages. As another example, the data processing system 105 may receive a second prompt that identifies a given candidate intent.

In some implementations, the second prompts may include additional and/or supplemental information. For example, the second prompts may provide clarifying information relative to a previous prompt. As another example, the second prompts may provide additional information for which the intent engine 210 may determine an intent of the second prompt. In some implementations, the data processing system 105 may provide the second prompts to at least one of the intent engine 210 and/or the language model 190. The data processing system 105 may generate a classification of an intent using a first prompt and a second prompt. For example, the data processing system 105 may aggregate and/or combine information included in a first prompt and a second prompt to generate a classification of an intent. As another example, the data processing system 105 may consider an intent associated with the first prompt and an intent associated with the second prompt to generate a classification. In some implementations, the data processing system 105 may generate the classifications of intents using the language model 190. For example, the data processing system 105 may provide the first prompt and the second prompt to the language model, as one or more inputs. The language model may return and/or output the classification of an intent based on the first prompt and the second prompt.

In some implementations, the classification of the intent may correspond to one or more types of information. For example, the classification of the intent may correspond to a request for a wager recommendation. The classification of the intent may correspond to a request to modify a wager. As another example, the classification of the intent may correspond to a request for information relating to a live event. The classification of the intent may correspond to a request for information relating to at least one wager opportunity. As another example, the classification of the intent may correspond to a request to place a wager. The classification of the intent may correspond to a request for information maintained by the data processing system 105 (e.g., the storage 125).

In some implementations, the data processing system 105 may identify one or more datasets. For example, the data processing system 105 may identify training datasets that include one or more examples. The examples may include one or more inputs (e.g., prompts) having an ambiguous intent (e.g., more than one possibility). The examples may also include a ground truth output message that corresponds to the inputs. The ground truth outputs may identify one or more candidate intents. In some implementations, the language model 190 may train and/or reinforce the language model 190 using the training datasets.

In some implementations, the intent engine 210 and the language model 190 may represent and/or refer to separate/discrete models. For example, the intent engine 210 may represent a first machine learning model and the language model 190 may represent a second machine learning model. As another example, the intent engine 210 and the language model 190 may have different characteristics and/or parameters that are distinguishable. In some implementations, the language model 190 may refer to and/or include a large language model that includes a generative pre-trained transformer (GPT) model.

In some implementations, the data processing system 105 may receive the prompts from one or more devices associated with a profile. For example, the data processing system 105 may receive a prompt a given client system 115 having a player profile 170. As another example, the data processing system 105 may receive prompts via a chat session that was initiated using credentials associated with an account identifier. In some implementations, the data processing system 105 may generate the classification of the intent based on data associated with the player profile 170. For example, the data processing system 105 may use previous wagers, associated with the player profile 170, as one or more constraints and/or filters for the language model 190. As another example, the data processing system 105 may select a given candidate intent based on similarities between the given candidate intent and information associated with the player profile 170.

In some implementations, the data processing system 105 may establish the communication session responsive to one or more inputs. For example, the data processing system 105 may receive a request from a mobile application, stored on the client system 115, to establish a communication session. The data processing system 105 may establish the communication session responsive to the request. In some implementations, the data processing system 105 may generate one or more messages in response to the request. For example, the data processing system 105 may generate a second message that indicates establishment of the communication session. As another example, the data processing system 105 may generate a message for display via an output region of a user interface. In some implementations, the data processing system 105 may determine one or more intents based on the second message. For example, the second message may include a first set of information (e.g., what sport are you interested, what event would you like information about, etc.). The data processing system 105 may determine the intent based on the information included in the second message.

Figure 2D:
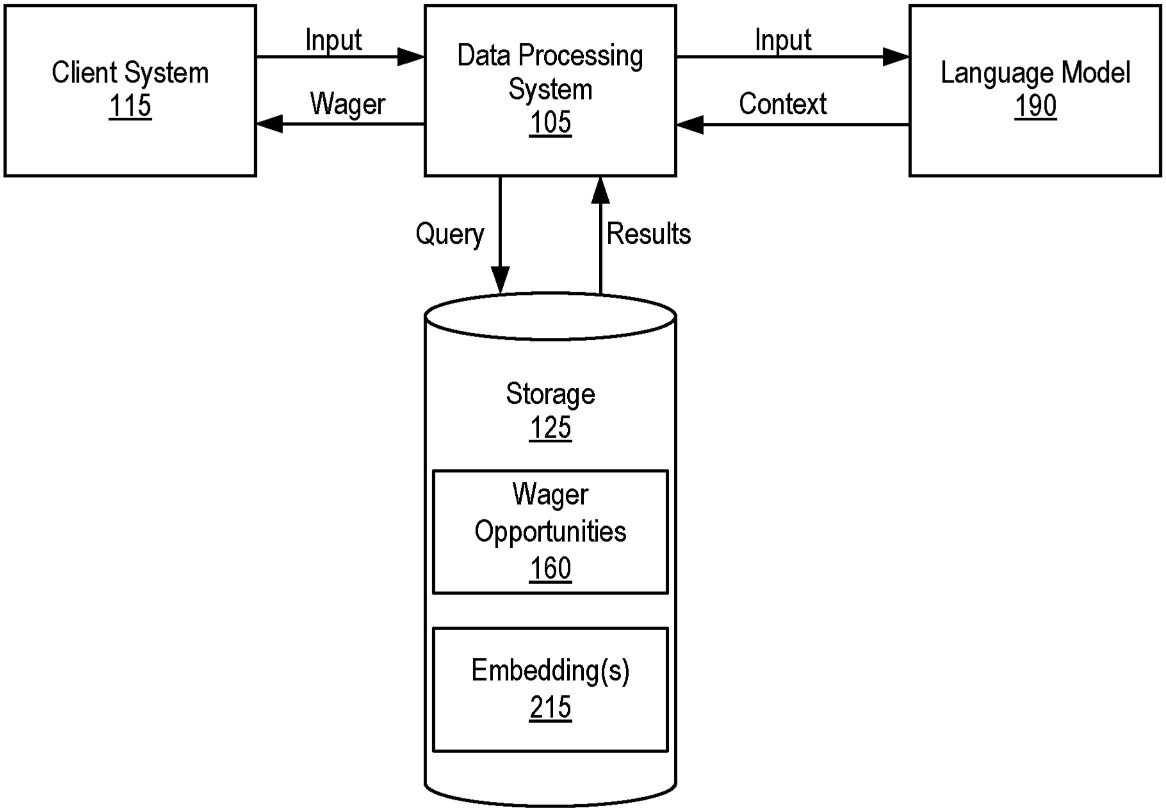
FIG. 2D illustrates a flow diagram of communication between devices included in the system of FIG. 1, in accordance with one or more implementations.

Referring to FIG. 2D in the context of the components described in connection with FIG. 1, depicted is a flow diagram illustrating communication between components included in the system 100, in accordance with one or more implementations. In some implementations, the data processing system 105 may receive one or more inputs. For example, the data processing system 105 may receive data inputs from the client system 115. As another example, the data processing system 105 may receive inputs via a chatbot session. In some implementations, the data processing system 105 receive inputs that represent and/or correspond to one or more requests for information.

In some implementations, the data processing system 105 may maintain one or more databases. For example, the data processing system 105 may store databases in the storage 125. As shown in FIG. 2D, the data processing system 105 may maintain wager opportunities 160 and embeddings 215 in the storage 125. In some implementations, the data processing system 105 may maintain a vector database that includes encoded information. For example, the embeddings 215 may represent one or more encoded wager opportunities.

In some implementations, the data processing system 105 may receive one or more prompts that correspond to an event. For example, the data processing system 105 may receive a prompt that identifies a request corresponding to a sporting event (e.g., a live event). In some implementations, the data processing system 105 may receive the prompts during a communication session. For example, the data processing system 105 may receive prompts from the client system 115 while the data processing system 105 is in communication with the client system 115. The prompts may be provided via input to one or more graphical user interfaces, as described herein.

In some implementations, the data processing system 105 may generate one or more values using prompts received by the data processing system 105. For example, the data processing system 105 may generate a token and/or an embedding that represents prompts received by the data processing system 105. In some implementations, the tokens/embeddings may be generated by the language model 190 or a tokenizer model associated therewith. In some implementations, the data processing system 105 may query the storage 125 to retrieve one or more values. For example, the data processing system 105 may query the storage 125 to retrieve a given embedding of the embeddings 215. In some implementations, the data processing system 105 may select the given embedding based on one or more similarities between a set of values (e.g., embeddings, tokens, etc.) and the embedding stored in the storage 125.

In some implementations, the data processing system 105 may generate an input context based on information retrieved from the storage 125. For example, the data processing system 105 may generate an input context using prompts, provided by the client system 115, and encoded values, stored in the storage 125. As another example, the data processing system 105 may generate an input context for the language model 190 that serves as a constraint for the language model 190. In some implementations, the data processing system 105 may generate one or more messages using the language model 190. For example, the data processing system 105 may generate an output message that is responsive to prompts from the client system 115. As another example, the data processing system 105 may generate one or more responses and/or replies to inputs provided by the client system 115. In some implementations, the data processing system 105 may transmit and/or otherwise provide one or more responses to the client system 115. For example, the data processing system 105 may provide one or more outputs, generated by the language model 190, to the client system 115. As another example, the data processing system 105 may provide one or more wage opportunities to the client system 115.

In some implementations, the data processing system 105 may identify one or more characteristics associated with encoded wagers (e.g., the embeddings 215, etc.). For example, the data processing system 105 may identify odds associated with an encoded wager. As another example, the data processing system 105 may identify one or more enhancers associated with the encoded wager. In some implementations, the data processing system 105 may generate and/or otherwise update one or more output messages such that the output messages include the odds associated with the encoded value.

In some implementations, the data processing system 105 may execute one or more operations to identify one or more encoded wagers. For example, the data processing system 105 may execute a vector search operation using at least a portion of a prompt. As another example, the data processing system 105 may execute a query operation using information included in an input provided by the client system 115. The operations may include a vector searching operation, as described herein, which may involve searching the wager opportunities 160 using an encoded (e.g., as embeddings) form of the prompt or data extracted therefrom to identify relevant wager opportunities.

In some implementations, the data processing system 105 may identify one or more wagers that correspond to live events and are relevant to the prompt. For example, the data processing system 105 may identify the wager opportunities 160. As another example, the data processing system 105 may identify one or more wages that correspond to a sporting event (e.g., a given live event). In some implementations, the data processing system 105 may generate encoded set of wagers using an embedding model prior to receiving prompts. For example, the data processing system 105 may execute a model that is configured to generate one or more embeddings (e.g., the embeddings 215). In some implementations, the embeddings may be generated using the language model. As another example, the data processing system 105 may transmit one or more inputs to a model to cause the model to generate the embeddings 215.

In some implementations, the data processing system 105 may maintain one or more encoded sets of information, which may be stored in association with the data of the wager opportunities 160 to facilitate retrieval using vector search, semantic search operations, or similar searching operations. For example, the data processing system 105 may maintain, in the storage 125, an encoded set of event information. As another example, the data processing system 105 may maintain one or more encodings that represent and/or describe one or more aspects of live events. In some implementations, the data processing system 105 may retrieve, responsive to one or more subsequent prompts, one or more encoded sets of information. For example, the data processing system 105 may retrieve a given encoded set of information based on the prompt identifying a given live event.

In some implementations, the data processing system 105 may generate one or more output messages based on subsequent prompts and/or one or more encoded sets of information. For example, the data processing system 105 may execute the language model 190 to cause the language model 190 to generate one or more output messages for which the encoded sets of information were constraints. In some implementations, the data processing system 105 may identify one or more additional sets of information. For example, the data processing system 105 may identify an additional wager that corresponds to a live event. The live event may have been identified in a prompt provided by the client system 115. As another example, the live event may have been identified by the data processing system 105.

In some implementations, the data processing system 105 may update one or more wager opportunities 160. For example, in some implementations, the data processing system 105 may update the storage 125 to include additional wager opportunities (and embeddings 215 associated therewith) upon being identified/received by the data processing system 105. In some implementations, the data processing system 105 may update the vector database according to one or more predetermined points in time. For example, the data processing system 105 may update the vector database according to an update schedule. The data processing system 105 may query and/or retrieve, from one or more open source and/or publicly accessible locations, one or more sets of information to update the vector database.

Figure 2E:
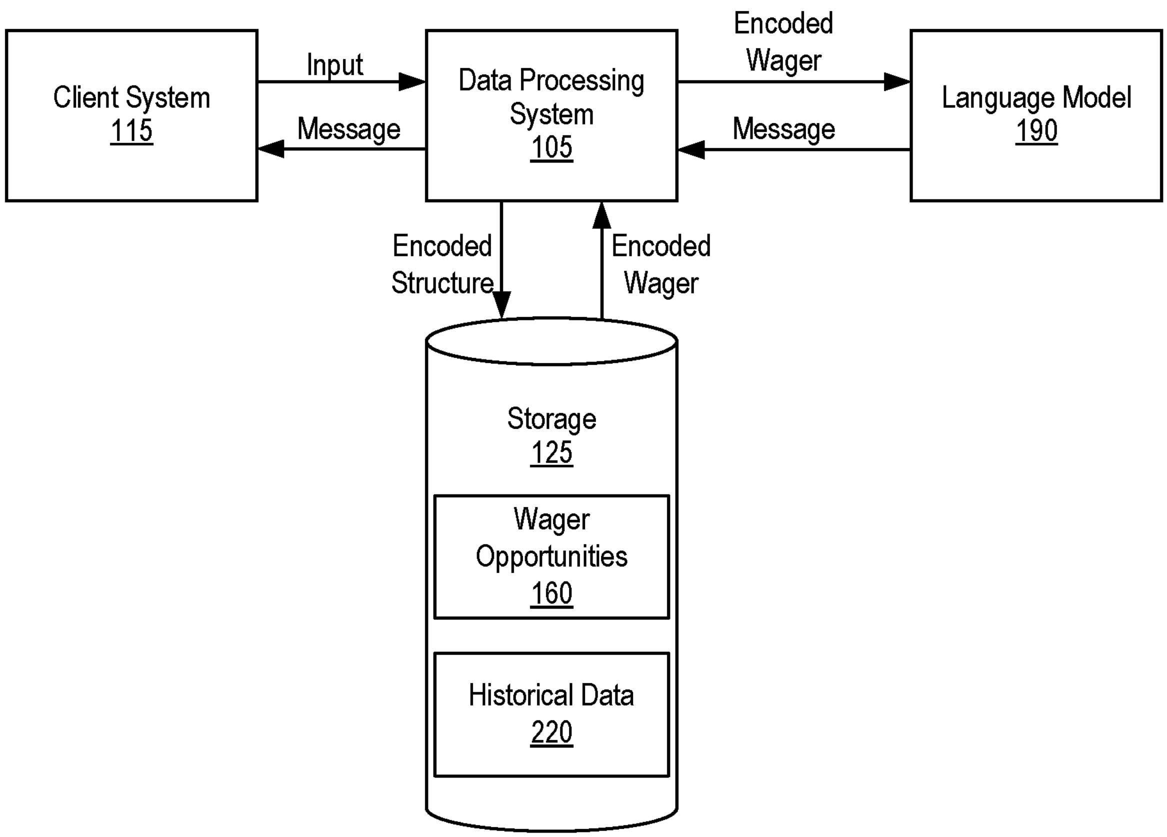
FIG. 2E illustrates a flow diagram of communication between devices included in the system of FIG. 1, in accordance with one or more implementations.

In some implementations, the data processing system 105 may generate one or more encoded prompts. For example, the data processing system 105 may execute a tokenizer model to generate an encoded prompt associated with a prompt provided by the client system 115. In some implementations, the data processing system 105 may generate the input context by combining the encoded prompt and the encoded wager. For example, the data processing system 105 may generate the input context by aggregating and/or otherwise concatenating the encoded prompt with the wagers. In some implementations, the data processing system 105 can generate an encoded Referring to FIG. 2E in the context of the components described in connection with FIG. 1, depicted is a flow diagram illustrating communication between components included in the system 100, in accordance with one or more implementations. In some implementations, the data processing system 105 may receive one or more inputs. For example, the data processing system 105 may receive data inputs from the client system 115. As another example, the data processing system 105 may receive inputs via a communication session. In some implementations, the data processing system 105 receive inputs that represent and/or correspond to one or more requests for information, wager opportunities 160, or other types of requests.

In some implementations, the data processing system 105 may maintain one or more data structures. For example, the data processing system 105 may maintain data structures that store and/or represent information associated with player profiles 170. The information may include historical (e.g., previous) actions performed using a player profile 170. For example, the historical actions may include previous wagers placed with the player profile 170. In some implementations, the data processing system 105 may maintain the data structures as historical data 220, which may be included in player profiles of players that access the functionality of the data processing system 105. The historical data 220 may include one or more of historical wagers, historical interactions, historical prompts, and/or historical preferences.

In some implementations, the data processing system 105 may generate one or more encoded data structures. For example, the data processing system 105 may generate embeddings based on the historical data 220. The embeddings may reflect and/or represent one or more historical actions. For example, a first embedding may represent a first historical action and a second embedding may represent a second historical action. In some implementations, the data processing system 105 may generate the encoded data structures in accordance with one or more formats. For example, the encoded data structures may include an encoded format.

In some implementations, encoded actions may be stored as part of the player profile of a player rather than encoded into an embedding or a similar format. For example, player profiles maintained by the data processing system 105 may include records of previously executed wagers (and corresponding identifiers of wager opportunities 160), characteristics of wagers, and other types of data relating to actions performed by the player when accessing functionality of the data processing system 105 or similar systems. The data may be represented in a structured format, such as a JSON format, an XML format, or another format that can be processed by the language model 190. In some implementations, the data processing system 105 can convert the data stored in one or more player profiles into a format compatible with an input of the language model 190, which may include generating a text string or similar data structure (which may have a structured format) that represents historical actions, requests, or data provided to/received from one or more players interacting with the data processing system 105.

In some implementations, the data processing system 105 may select one or more wager opportunities 160, for example, based on the historical actions, personalization data, or preferences specified in a corresponding player profile. For example, the wager opportunities 160 may be associated with and/or include one or more corresponding embeddings generated by the data processing system 105. The data processing system 105 may select at least one wager opportunity 160 based on the encoded data structures stored in the storage 125, for example, using a vector search operation or similar operation.

In some implementations, the data processing system 105 can access a player profile of a player that provided an input prompt by identifying the player based on authentication credentials or session identifiers. For example, when a player submits a prompt through the client system 115, the data processing system 105 can authenticate (or may have previously authenticated) the player using credentials such as a username and password or a session token. Once authenticated, the data processing system 105 can retrieve the player profile associated with the player from the storage 125. The player profile can include historical data 220, which encompasses previous actions, interactions, and preferences of the player. For instance, the historical data 220 may include records of past wagers, interactions with the system, and preferences specified by the player. The data processing system 105 can then use this historical data 220 to inform the classification and processing of the input prompt.

In some implementations, the data processing system 105 can use the historical data 220 of the player profile to select one or more wager opportunities 160 based on the player's preferences, historical interactions, or other data stored in the player profile. For example, the historical data 220 may include structured data representing the player's past wagers and preferences. The data processing system 105 can access the structured data to identify features such as a preference for certain types of events, specific teams, athletes, wagering time periods, or other similar information. Using this information, the data processing system 105 can identify wager opportunities 160 that align with the player's historical preferences. For instance, if the historical data 220 indicates that the player frequently places wagers on basketball games, the data processing system 105 can prioritize selecting basketball-related wager opportunities 160. The data processing system 105 can also use machine learning models to predict and recommend wager opportunities 160 that are likely to be of interest to the player based on their historical data 220.

In some implementations, the data processing system 105 can generate an input context for the language model 190 using the selected wager opportunities 160 and the input prompt. For example, the data processing system 105 can combine the input prompt with structured data of the selected wager opportunities 160 to create the input context. The input context can include details from the input prompt (or portions thereof, such as specific phrases or keywords), along with relevant information from the selected wager opportunities 160, such as event details, odds, and other pertinent data. The input context can be formatted in a manner that is compatible with the language model 190, such as a structured text string or a JSON object. For instance, if the input prompt is a request for a wager recommendation, the input context can include the prompt along with the details of the selected wager opportunities 160, such as the event name, teams involved, and betting options.

In some implementations, at least a portion of the historical data 220 of the player profile can be included in the input context for the language model 190. For example, the input context can include one or more of the player's historical interactions, such as past wagers and preferences, to provide context for the language model 190 to generate more personalized and relevant responses. The historical data 220 can be integrated into the input context in a structured format, such as a JSON object, to ensure that the language model 190 can effectively process and utilize this information. For instance, if the player has a history of placing wagers on a specific team, the input context can include this information to guide the language model 190 in generating recommendations that align with the player's preferences. This approach can enhance the accuracy and relevance of the responses generated by the language model 190, thereby improving the overall user experience.

In some implementations, the data processing system 105 may generate at least one output message. For example, the data processing system 105 may generate an output message that is responsive to one or more prompts from the client system 115. The output message can identify (e.g., with a corresponding indication of priority, etc.) one or more wager recommendations (e.g., a selected wager opportunity 160). For example, the data processing system 105 can provide the generated input context (which includes the prompt) as input to the language model 190 to generate output data. The output data may include structured data indicating one or selected wager opportunities 160 and associated data, natural language output (e.g., natural language text data communicating the selected wager opportunities 160 or aspects thereof, etc.). In some implementations, the output message may indicate one or more historical actions or patterns of historical actions used to select the selected wager opportunities 160. In some implementations, the encoded wager opportunity may identify and/or include one or more odds associated with each wager opportunity 160. For example, the wager opportunities 160 may identify real-time odds information.

In some implementations, the data processing system 105 may receive one or more updates. For example, the data processing system 105 may receive updates from an external computing system (e.g., a system remote and/or separate from the data processing system 105). In some implementations, the data processing system 105 may receive an update to a wager. For example, the data processing system 105 may receive a change and/or an adjustment to a wager. The data processing system 105 may receive the update from the client system 115. In some implementations, the data processing system 105 may update the vector database. For example, the update may include a removal of a wager. The data processing system 105 may update the vector database to remove the wager from the historical data 220. As another example, the update may include a linkage and/or a pairing of two or more wagers (e.g., as a custom parlay wager).

In some implementations, the data processing system 105 may receive one or more prompts that identify selections. For example, the data processing system 105 may receive a wager selection that indicates a selection of a given wager. The data processing system 105 may receive the wager selection responsive to one or more inputs provided to the client system 115. For example, the wager selection may be responsive to a selection (e.g., an input) of a given wager opportunity identified in the output message. As another example, the wager selection may include a natural language response that identifies a given wager opportunity. Selected wagers can be added to the player profile of the player (e.g., as part of a bet slip).

In some implementations, the data processing system 105 may generate one or more parlay wagers. For example, the data processing system 105 may link and/or associate one or more wager opportunities as legs of a parlay wager such that each wager is grouped as a single parlay wager. In some implementations, the data processing system 105 may execute the language model 190 to generate an output message that identifies the parlay wager and its associated legs. In some implementations, the output message may suggest or provided one or more wager opportunities 160 selected based on the historical data 220 of the player profile to add as a leg to a current parlay wager. The data processing system 105 can process subsequent prompts according to the techniques described herein to update the parlay wager to include any selected legs.

Figure 2F:
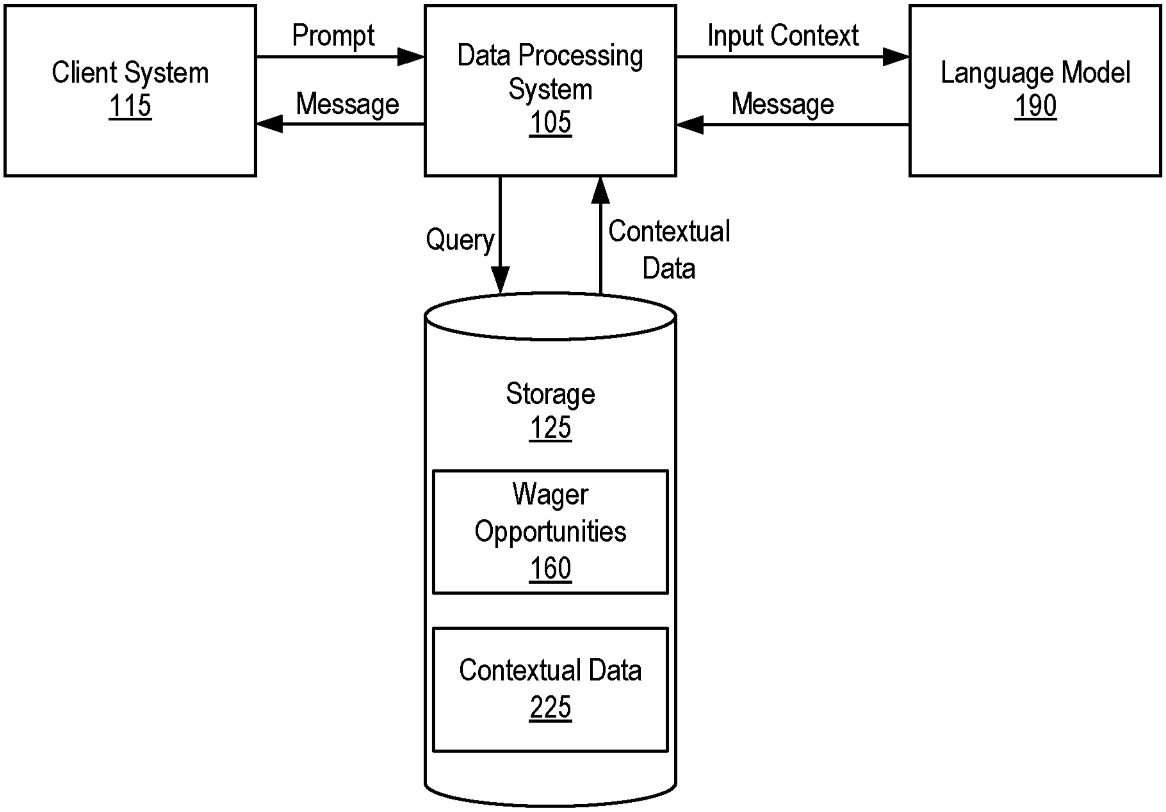
FIG. 2F illustrates a flow diagram of communication between devices included in the system of FIG. 1, in accordance with one or more implementations.

Referring to FIG. 2F in the context of the components described in connection with FIG. 1, depicted is a flow diagram illustrating communication between components included in the system 100 to generate output messages providing wager opportunities 160 selected based on indirect inputs, in accordance with one or more implementations. In some implementations, the data processing system 105 may receive one or more inputs. For example, the data processing system 105 may receive data inputs from the client system 115. As another example, the data processing system 105 may receive inputs via a chatbot session. In some implementations, the data processing system 105 receive inputs that represent and/or correspond to one or more requests for information.

In some implementations, the data processing system 105 may receive one or more prompts that identify a request for a wager recommendation, as described herein. For example, the data processing system 105 may receive a prompt that identifies a request for wager recommendation regarding the wager opportunities 160. In some implementations, the data processing system 105 may receive the prompts from the client system 115 during a communication session. For example, the data processing system 105 may receive the prompts during a chatbot session with the client system 115. The prompts may be provided via input to one or more user interfaces described herein.

In some implementations, the data processing system 105 may determine that the prompts include one or more sets of ambiguous intent. For example, the data processing system 105 may determine that an intent of the prompt may be interpreted more than one way, or that the intent may encompass a broader classification of intent with many sub-classifications that cannot readily be determined using the prompt alone. For example, the data processing system 105 may receive a prompt that includes the message "give me wager recommendations for teams in my current city." In this example, the language "current city" is ambiguous as the data processing system 105 is unaware of the location associated with the prompt.

In some implementations, the data processing system 105 may determine that the prompt is be augmented with additional information. For example, the data processing system 105 may determine that the prompts are to be augmented with location information to assist in responding to the prompts. As another example, the data processing system 105 may determine that the prompts are to be augmented with personalized information associated with a player profile 170.

In some implementations, the data processing system 105 can use the language model 190 to classify the intent of the prompt as needing additional information by analyzing the semantic structure and context of the prompt according to the techniques described herein. For example, in some implementations, the language model 190 can process the prompt to identify key phrases and entities that indicate the need for additional information. If the prompt includes ambiguous terms or phrases that lack sufficient context, the language model 190 can determine that the intent of the prompt is ambiguous and requires additional information to clarify. Furthering the example above, if the prompt includes the phrase "current city" or "near me," the language model 190 can detect and classify the prompt as including terms that are ambiguous without additional context, such as the player's location. The language model 190 can then classify the intent of the prompt as needing additional information to resolve the ambiguity.

The language model 190 can identify information that, if used to augment the prompt, can address the ambiguity by analyzing the specific terms and phrases within the prompt. In some implementations, when providing the input context to the language model 190, the data processing system 105 can automatically generate/include additional instructions to classify a prompt as potentially including ambiguous terms, and to identify information that is to augment the prompt. For example, if the prompt includes the phrase "teams in my current city," the language model 190 can identify (e.g., based on context instructions provided in the input context by the data processing system 105) that the term "current city" is ambiguous and requires additional location information to clarify. The language model 190 can determine that augmenting the prompt with location information of the player would resolve the ambiguity and provide a more accurate classification of the intent of the prompt. Similarly, if the prompt includes terms related to personal preferences or historical interactions, the language model 190 can identify that augmenting the prompt with personalized information from the player profile can address the ambiguity and provide a more accurate classification of the intent.

In addition to determining that the prompt has ambiguous intent, the language model 190 may specify instructions to the data processing system 105 to access additional information resources to augment the prompt. For example, if the language model 190 identifies that the prompt requires location information, it can instruct the data processing system 105 to access the player's location data from the player profile or from a location service associated with the player, the client system 115, and/or the data processing system 105. The language model 190 can generate specific instructions for the data processing system 105 indicating parameters for retrieving or otherwise accessing any additional information into the prompt to augment the input context. For example, the language model 190 can specify that the data processing system 105 is to retrieve the player's current city from the player profile and use it to augment the prompt in a subsequent input context. Similarly, if the prompt requires personalized information, the language model 190 can instruct the data processing system 105 to access the player's historical interactions and preferences (e.g., historical actions 220) from the player profile. Other sources of information may include data relating to one or more sports teams, athletes, wager opportunities 160, or any other information maintained or accessible by the data processing system 105.

In some implementations, the data processing system 105 may execute and/or use another classification technique (e.g., other than the language model 190) to classify the intent of player-provided prompts. For example, the data processing system 105 may execute a machine learning model (e.g., maintained by the intent classifier 155, etc.) to classify a prompt as ambiguous with respect to one or more terms or phrases. As another example, the data processing system 105 may execute the same or a different machine-learning model to identify which additional information may clarify any ambiguities associated with the prompts, in some implementations.

In some implementations, the data processing system 105 may retrieve one or more sets of information. For example, the data processing system 105 may retrieve contextual data 225 from the storage 125. To do so, the data processing system 105 may parse the instructions provided in the output of the language model 190, which as described herein may specify one or more portions of information to retrieve in a structured format. This structured format can be extracted/parsed from the output message of the language model an acted upon as instructions. In some implementations, the data processing system 105 may execute/carry out the instructions to retrieve the contextual data 225 using one or more searches and/or queries for a corresponding data source. As another example, the data processing system 105 may retrieve the contextual data 225 via one or more application programming interface (API) messages. In some implementations, the data processing system 105 may retrieve one or more sets of additional contextual data that satisfies the prompts (e.g., requests for wager recommendations). For example, the data processing system 105 may retrieve location information associated with the client system 115. As another example, the data processing system 105 may retrieve information that identifies a favorite team for a given player profile 170.

In some implementations, the data processing system 105 may identify relevant data sources based on an intent associated with the prompt. For example, the intent may be associated with placing a wager with a team of a given city. In this example, the relevant data sources may be sources that can identify and/or indicate the given city. As another example, the intent may be associated with placing a wager on the same team as an earlier wager. In this example, the relevant data sources may be sources that can identify the earlier wager. In some implementations, the data sources may refer to and/or include one or more of client devices, player profiles 170 associated with the client devices, and/or or a database storing information relating to one or more live events. In some implementations, the data sources may be specified or otherwise identified based on the output message generated by the language model 190 that indicates the additional information to clarify any ambiguity in an input prompt.

Once the data processing system 105 has retrieved relevant contextual information, the data processing system can generate an input context for the language model that includes the additional contextual information 225 (e.g., retrieved information to clarify any ambiguity) with the prompt, as well as any other information relevant to respond to the initial prompt. This may include executing one or more searches over the wager opportunities 160 according to the techniques described herein, using the prompt and the additional contextual information.

For example, in some implementations, the data processing system 105 may retrieve one or more candidate wagers that correspond to location information, upon determining that location information is to be used to respond to a prompt identifying a request for wager opportunities 160. For example, the data processing system 105 may retrieve one or more wager opportunities from the wager opportunities 160 that corresponding to the retrieved location information. The location information may include and/or indicate a location of the event, a location of a team and/or entity of the event, and/or a location of the client system 115.

In some implementations, the data processing system 105 may determine that the prompts are to be augmented with information that corresponds to one or more wager types. For example, the data processing system 105 may determine that the prompts correspond to a single game parlay. The data processing system 105 may retrieve one or more subsets of data from a database that stores wager information that corresponds to candidate wager opportunities 160 having the indicated wager types. For example, the data processing system 105 may retrieve subsets of data that correspond to candidate wagers based on an identified wager type.

In some implementations, the data processing system 105 may generate an input context that includes the prompt and the wager opportunities 160. The input context may refer to and/or represent an aggregation of the prompts and the set of additional contextual, such that the language model can accurately and efficiently classify the intent of the prompt, as well as generate a response for the player that provided the prompt. The various contextual information may be provided in the input context using one or more tokens, characters, or other data that delineates the prompt and the additional contextual information 225 within the input context. For example, the input context may include a first token that represents or indicates the start of a prompts and a second token the represents or indicates the start of the set of additional contextual data.

In some implementations, the data processing system 105 may generate one or more output messages using the language model 190, as escribed herein. For example, the data processing system 105 may generate an output message to identify the wager recommendation (e.g., a response to the prompts). In some implementations, the data processing system 105 may execute the language model 190 to generate the output message. For example, the data processing system 105 may provide the input context as an input to the language model 190. The language model 190 may generate the output message responsive to receipt of the input context.

In some implementations, the data processing system 105 may determine that prompts are to be augmented with profile information. For example, the data processing system 105 may determine that a prompt is to be augmented with historical and/or previous wagers. As another example, the data processing system 105 may determine that a prompt is to be augmented with profile preferences. In some implementations, the data processing system 105 may retrieve one or more subsets of data stored in a player profile 170. For example, the data processing system 105 may retrieve subsets of data from the contextual data 225.

In some implementations, the data processing system 105 may determine that the prompts are to be augmented with information that corresponds to one or more entities. For example, the data processing system 105 may determine that a prompt is to be augmented with information that corresponds to a sports team. In some implementations, the data processing system 105 may retrieve one or more subsets of data from a database that stores sports information. For example, the data processing system 105 may retrieve data that identifies the sports team for inclusion in the contextual data.

In some implementations, the data processing system 105 may determine that the prompts are to be augmented with odds information. For example, the data processing system may determine that the prompts are to be augmented with odds information for one or more wager opportunities of the wager opportunities 160. In some implementations, the data processing system 105 may retrieve one or more subsets of data from a database that stores odds information. The data processing system 105 may retrieve the subsets of data for inclusion in the contextual data.

In some implementations, the data processing system 105 may generate one or more classifications. For example, the data processing system 105 may generate classifications for prompts received from the client system 115. As another example, the data processing system 105 may generate classifications for prompts provided into an input region of a user interface. In some implementations, the data processing system 105 may determine one or more prompts to augment with additional information based on the classifications. For example, a first prompt may be classified as having an ambiguous classification. The data processing system 105 may determine that the first prompt is to be augmented with additional information based on the ambiguous classification of the first prompt.

In some implementations, the data processing system 105 may generate the classifications of the intents using a machine learning model. For example, the data processing system 105 may provide one or more portions of a prompt as an input to the machine learning model. The machine learning model may output one or more classifications based on the information input into the machine learning model. For example, the machine learning model may output an indication of a classification for the information provided to the machine learning model.

In some implementations, the data processing system 105 may receive one or more subsequent prompts. For example, the data processing system 105 may receive a second prompt that is responsive to the output message. As another example, the data processing system 105 may receive a response, from the client system 115, to the output message. In some implementations, the second prompts may include additional and/or supplemental information. For example, the second prompts may include information that clarifies an ambiguity of a previous prompt.

In some implementations, the data processing system 105 may generate one or more second input contexts. For example, the data processing system 105 may generate an input context based on the information provided in the second prompts. As another example, the data processing system 105 may generate an input context based on contextual data associated with information included in the second prompts. In some implementations, the data processing system 105 may execute the language model 190 to generate one or more second output messages. For example, the data processing system 105 may provide the second input contexts to the language model 190 as one or more inputs. The language model 190 may output the second output messages responsive to receipt of the second input context.

Figure 2G:
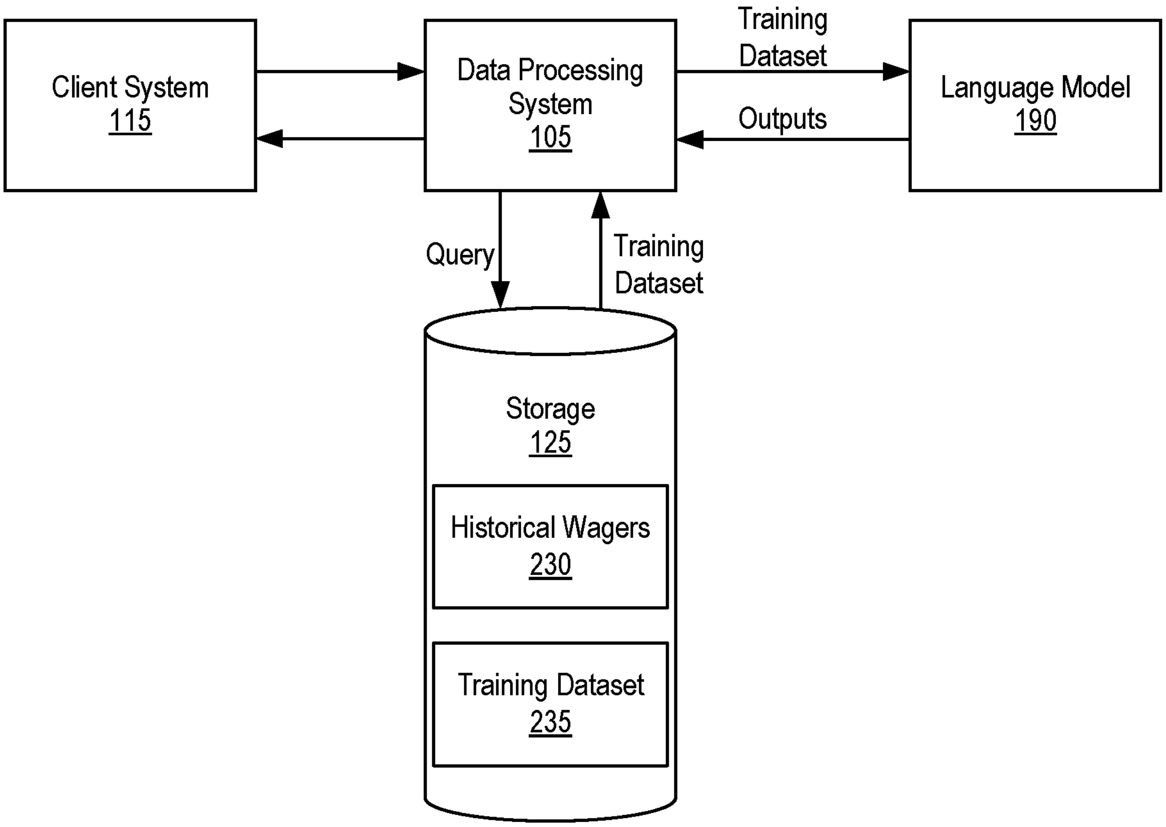
FIG. 2G illustrates a flow diagram of communication between devices included in the system of FIG. 1, in accordance with one or more implementations.

Referring to FIG. 2G, depicted is a flow diagram illustrating communication between components included in the system 100 that implement a training/update process for one or more language models 190 and/or machine-learning models described herein, in accordance with one or more implementations. In some implementations, the data processing system 105 may receive one or more inputs. For example, the data processing system 105 may receive data inputs from the client system 115. As another example, the data processing system 105 may receive inputs via a chatbot session. In some implementations, the data processing system 105 may receive inputs that represent and/or identify one or more sets of information to train and/or reinforce the language model 190.

In some implementations, the data processing system 105 can maintain one or more sets of training data (e.g., the training data 180, the training dataset 235, etc.). For example, the data processing system 105 may maintain one or more sets of data in the storage 125. As another example, the data processing system 105 may maintain one or more sets of data in remote storage and/or remote data databases. In some implementations, the data processing system 105 may maintain data that corresponds to historical wager opportunities. For example, the data processing system 105 may maintain historical wager opportunities, in the storage 125, as historical wagers 230. In some implementations, the historical wagers 230 may refer to and/or include information that indicates previous actions taken with one or more player profiles 170.

In some implementations, the data processing system 105 may generate one or more training datasets. For example, the data processing system 105 may generate training datasets for the language model 190. In some implementations, the data processing system 105 may generate training datasets using the historical wagers 230. The data processing system 105 may store the training datasets, in the storage 125, as training datasets 235. In some implementations, the training datasets 235 may include one or more training examples. For example, the training datasets 235 may include a training example having an input prompt and a corresponding output message. The input prompt may indicate an intent that relates to wager opportunities. The output message may identify information associated with one or more historical wagers of the historical wagers 230. In some implementations, the training datasets 235 may represent one or more prompts and one or more outputs that include responses to the prompts.

In some implementations, the data processing system 105 may train/update the language model 190 to generate any of the outputs described herein when processing prompts similar to those described herein. For example, the data processing system 105 may utilize the training datasets 235 to update the language model 190. As another example, the data processing system 105 may utilize the training datasets 235 to adjust one or more weights and/or parameters of the language model 190.

In some implementations, the data processing system 105 may generate one or more training examples for inclusion in the training datasets 235. For example, the data processing system 105 may apply one or more tags to associate input prompts with one or more output messages. As another example, the data processing system 105 may group or otherwise link input prompts with one or more output messages. In some implementations, the training example may indicate a request for information relating to a live event. For example, the training example may indicate a prompt for which information relating to a sports event was requested. The training example may indicate information that relates to the live event. For example, the training example indicate information that satisfied the request. In some implementations, the input prompts may include data that correspond to live events. For example, the input prompts may include data the correspond to events for which one or more wagers may be placed.

In some implementations, the training examples may include examples of input prompts that indicate requests for odds information. For example, the training examples may include tags that identify one or more strings and/or textual inputs that requested odds information. As another example, the training examples may include an indicator that an input prompt included a request for odds information. In some implementations, the training examples may include examples of output messages that were responses to input prompts requesting odds information.

In some implementations, the training examples may include examples of input prompts having requests for location-based wager information. For example, the training examples may include an example of an input that includes a request for a wager opportunity for a team in a given city. As another example, the training examples may include an example of an input prompt that included a message asking for a wager opportunity for a team in from the home state of a player profile 170. In some implementations, the training examples may include one or more examples of output messages that were responses to the input prompts. For example, the output messages may include indications of one or more wager opportunities that were selected based on location information.

In some implementations, the training examples may include examples of input prompts having requests for profile information. For example, the input prompts may include a request for a list of previous wagers placed within a given amount of time. As another example, the input prompts may include a request for an indication of all pending wagers for a given player profile 170. In some implementations, the training examples may include examples of one or more output messages that were responses to input prompts having requests for profile information. For example, the output messages may include indication of profile information that corresponds to the input prompts.

In some implementations, the training examples may include examples of input prompts and/or output messages having one or more formats. For example, the training examples may include examples of an input prompt having a conversation format. As another example, the training examples may include examples of an output message having a visual format that includes one or more selectable elements. In some implementations, the training examples may include examples of output messages that indicated one or more classifications. For example, the training examples may include an output message that included a classification of an intent. The classification of the intent may correspond to an associated input prompt (e.g., a prompt that triggered the output message). In some implementations, the classification of the intent may correspond to one or more of a request for a wager recommendation, a request to modify a wager, a request for information relating to a live event, a request for information relating to at least one wager opportunity, a request to place a wager, and/or a request for information maintained by the data processing system 105.

In some implementations, the data processing system 105 may update the language model 190 using one or more techniques. For example, the data processing system 105 may update the language model 190 using supervised training. As another example, the data processing system 105 may update the language model 190 using self-supervised training. In some implementations, the data processing system 105 may train, update, and/or reinforce the language model 190, using the training datasets 235, to configure and/or train the language model 190 to process at least one of the various inputs described herein. The data processing system 105 may train, update, and/or reinforce the language model 190, using the training datasets 235, to configure and/or train the language model 190 to generate and/output at least one of the various outputs and/or responses described herein.

Figure 3:
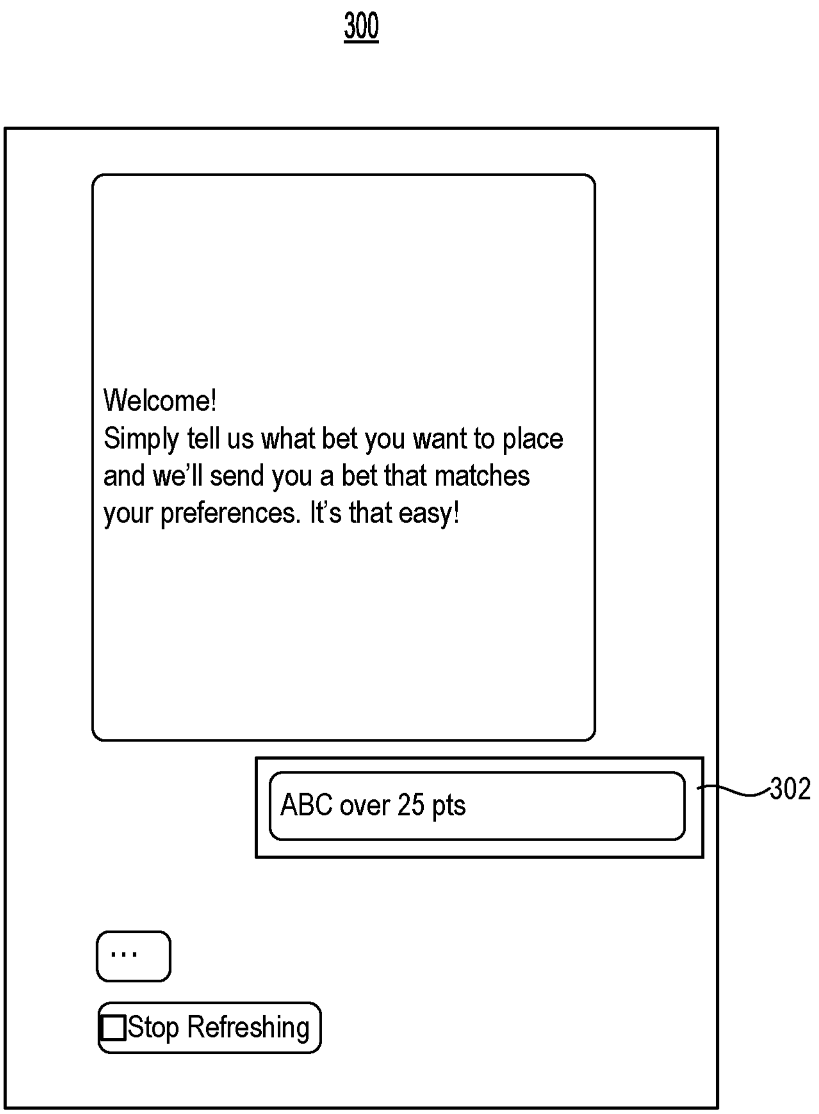
FIG. 3 illustrates a user interface including one or more input fields, in accordance with one or more implementations.
Figure 4:
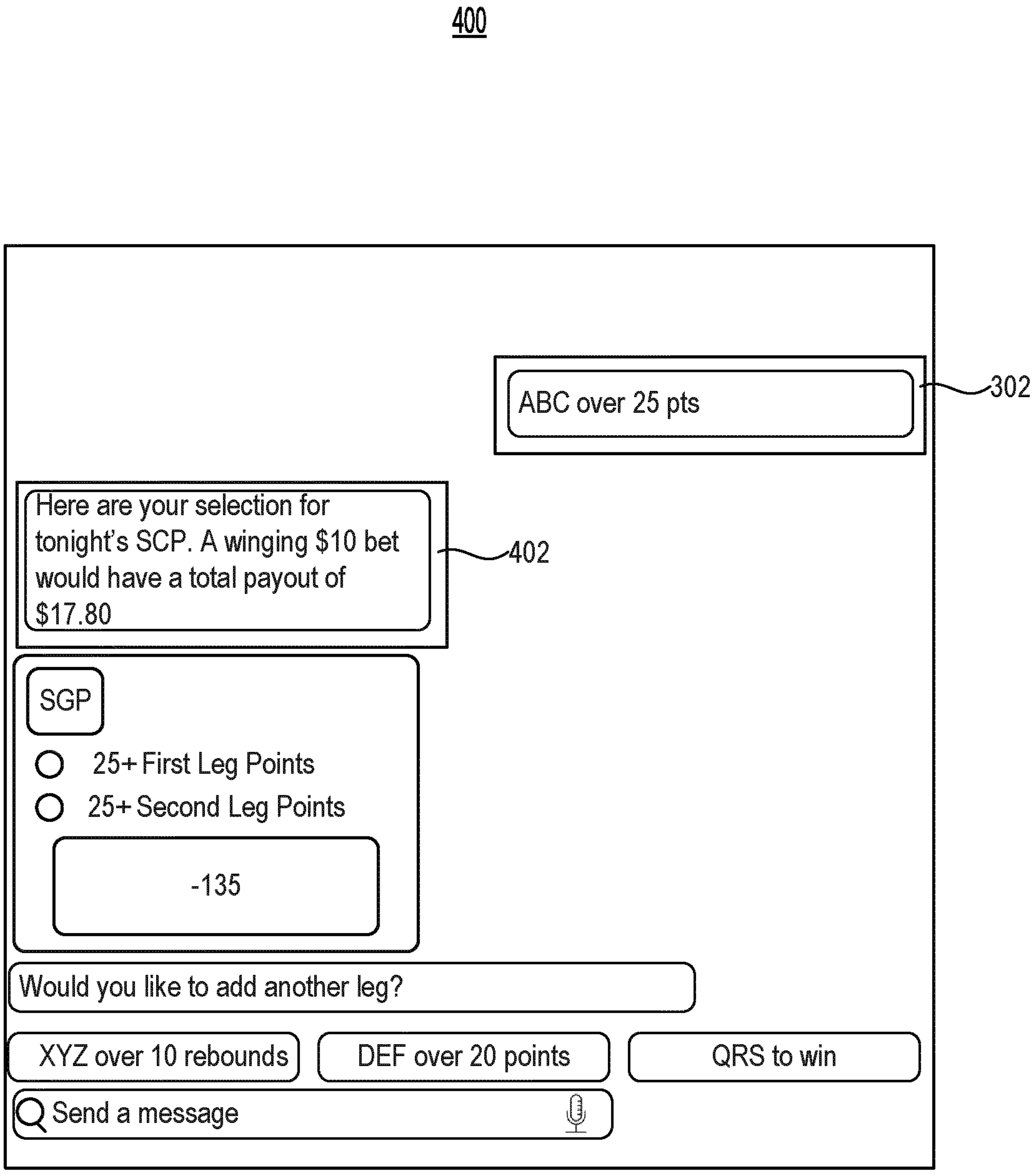
FIG. 4 illustrates a user interface including one or more output fields, in accordance with one or more implementations.

FIGS. 3 and 4 depict example user interfaces, in accordance with one or more implementations. For example, as shown in FIG. 3, a user interface 300 may include at least one field 302. The field 302 may refer to and/or include an input field. For example, the field 302 may include a field for which information may be provided to and/or entered. In some implementations, the field 302 may receive one or more prompts from the client system 115.

In some implementations, the data processing system 105 may provide the user interface 300 as a graphical user interface. For example, the data processing system 105 may cause one or more display devices to present and/or otherwise display the user interface 300. As shown in FIG. 4, a user interface 400 may include one or more regions 402. For example, the regions 402 may refer to and/or include one or more data regions. In some implementations, the regions 402 may provide and/or present one or more outputs. For example, the regions 402 may provide the outputs generated by the language model 190.

Figure 5:
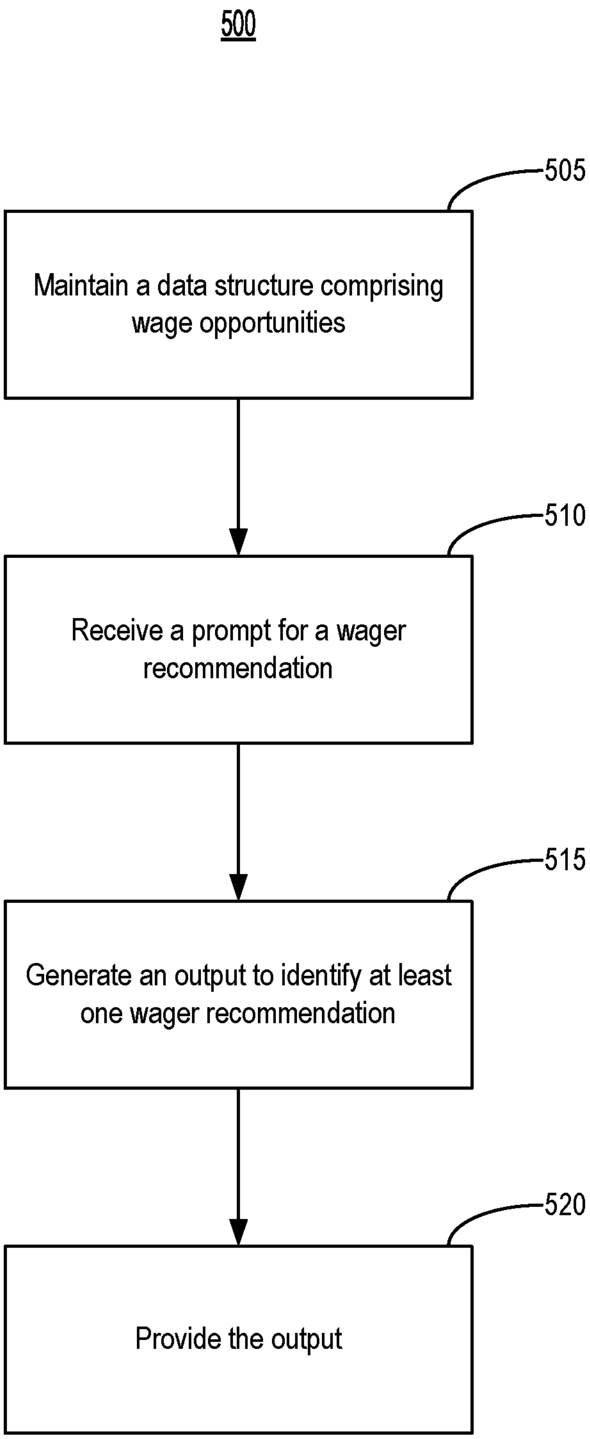
FIG. 5 illustrates a flow diagram of a method to provide wager recommendations to client systems, in accordance with one or more implementations.

Referring now to FIG. 5, depicted is an illustrative flow diagram of a method 500 to provide wager recommendations to client systems, in accordance with one or more implementations. The method 500 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 500, the data processing system can maintain a data structure comprising a plurality of wager opportunities corresponding to a plurality of live events (STEP 505), receive, from a client device, a prompt comprising a request for a wager recommendation (STEP 510), generate, using a language model and the prompt, output identifying at least one wager opportunity of the plurality of wager opportunities selected to satisfy the request (STEP 515), and provide the output to the client device in response to the request (STEP 520).

In further detail of method 500, the data processing system can maintain a data structure that includes a plurality of wager opportunities corresponding to a plurality of live events (STEP 505). Each wager opportunity can correspond to a predefined wager type. The data processing system can generate and manage a collection of wager opportunities. The wager opportunities can be directly tied to live events. Examples of wager opportunities can include Team A to win the game, Team B to win the game, total points scored over/under X points, Team A to win by X or more points, and Player C to score over X points, among others.

In further detail of method 500, the data processing system can receive a prompt for a wager recommendation (STEP 510). The data processing system can receive the prompt from a client system and/or a client device. A wager recommendation can refer to a given wager opportunity for which a wager can be placed. For example, the prompt can include a message or input and the wager recommendation can refer to a wager opportunity associated with the message.

In further detail of method 500, the data processing system can generate an output to identify at least one wager recommendation (STEP 515). For example, the data processing system can generate the output using one or more language models. As another example, the data processing system can generate the output based on the prompt. The data processing system can use a language model to generate one or more wage recommendations that are associated with wager opportunities stored and/or maintained in a data structure.

In further detail of method 500, the data processing system can provide the output (STEP 520). For example, the data processing system can provide the output to the client device that provided the prompt. As another example, the data processing system can provide the output via one or more user interface. In some implementations, the data processing system can provide the output via a data region and/or output region of a user interface.

Figure 6:
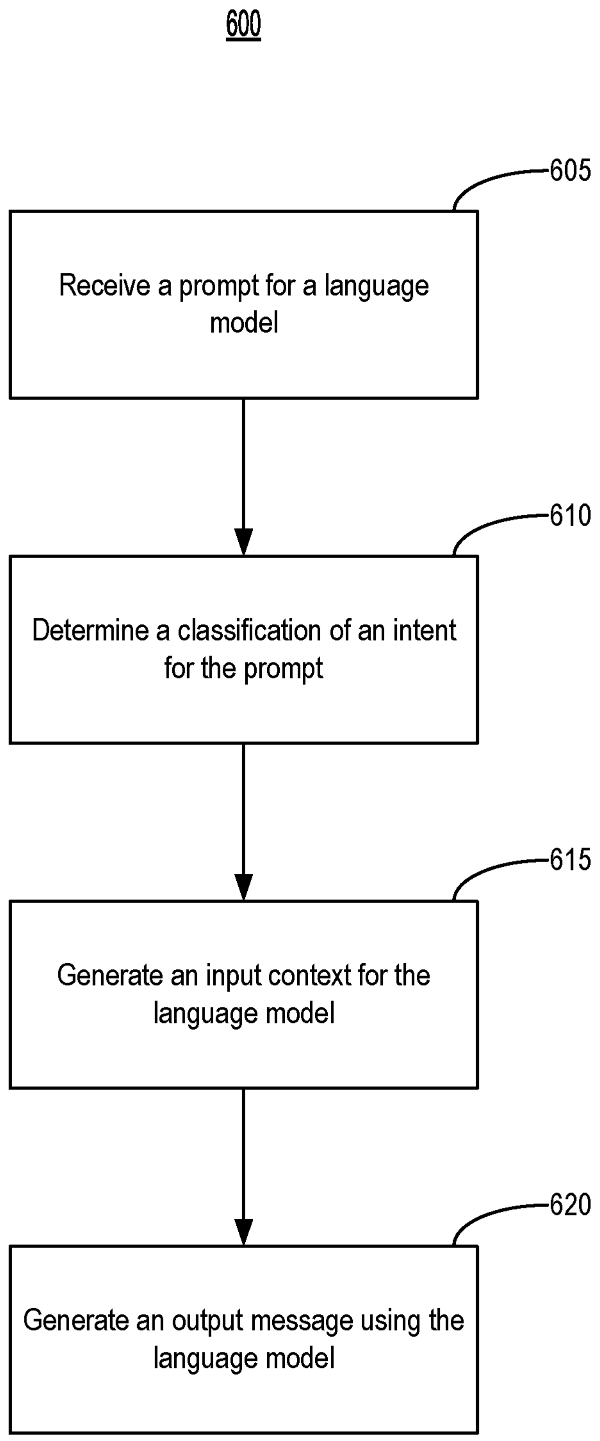
FIG. 6 illustrates a flow diagram of a method to generate input contexts for a language model, in accordance with one or more implementations.

Referring now to FIG. 6, depicted is an illustrative flow diagram of a method 600 to provide wager recommendations to client systems, in accordance with one or more implementations. The method 600 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 600, the data processing system can receive a prompt for a language model (STEP 605), determine a classification of an intent for the prompt (STEP 610), generate an input context for the language model (STEP 615), and generate an output message using the language model (STEP 620).

In further detail of method 600, the data processing system can receive one or more prompts (STEP 605). For example, the data processing system can receive prompts from a client system. In some implementations, the data processing system can receive prompts that include intents and/or requests for information.

In further detail of method 600, the data processing system can determine a classification of an intent (STEP 610). For example, the data processing system can execute an intent engine and/or machine learning model trained to determine classifications. As another example, the data processing system can determine intents (e.g., contexts) for one or more prompts.

In further detail of method 600, the data processing system can generate an input context (STEP 615). For example, the data processing system can generate the input context to described and/or represent one or more prompts. As another example, the data processing system can generate an input context as one or more inputs for a language model.

In further detail of method 600, the data processing system can generate an output message. (STEP 620). For example, the data processing system can execute a language model to generate an output message that is responsive to one or more prompts. As another example, the data processing system can execute the language model to generate an output message based on one or more input contexts.

Figure 7:
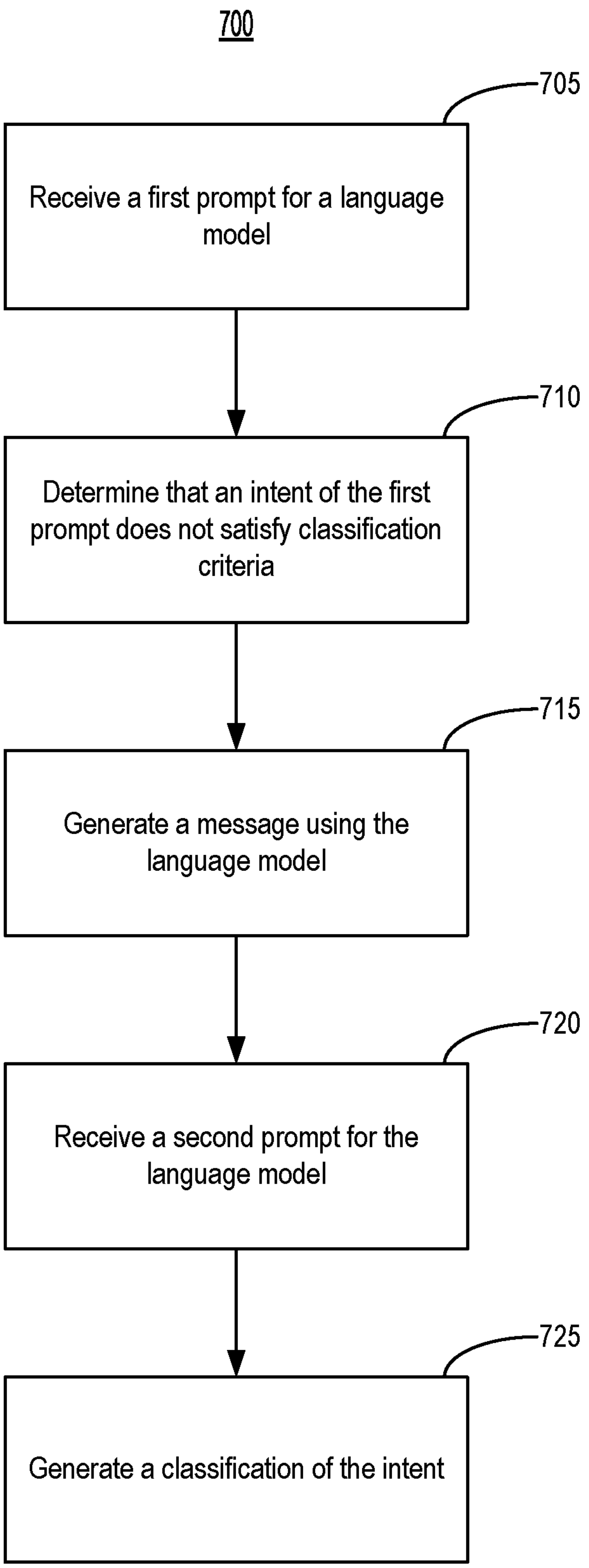
FIG. 7 illustrates a flow diagram of a method to generate a classification of an input provided to a language model, in accordance with one or more implementations.

Referring now to FIG. 7, depicted is an illustrative flow diagram of a method 700 to generate a classification of an input provided to a language model, in accordance with one or more implementations. The method 700 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 700, the data processing system can receive a first prompt for a language model (STEP 705), determine an intent for the first prompt (STEP 710), generate a message using the language model (STEP 715), receive a second prompt for the language model (STEP 720), and generate a classification of the intent (STEP 725).

In further detail of method 700, the data processing system can receive one or more prompts (STEP 705). For example, the data processing system can receive a first prompt from a client system. The first prompt can be a request for information from the data processing system. For example, the first prompt may include a natural language query. As another example, the first prompt may include a selection of an element presenting via a user interface.

In further detail of method 700, the data processing system can determine that a classification of an intent does not satisfy classification criteria (STEP 710). For example, the data processing system can determine that one or more intents, generated by an intent engine, do not satisfy given criteria. The criteria may include a threshold that dictates a given total number of possible of intents. For example, the threshold may dictate that when a number of possible intents exceeds the threshold that the classification of the intent cannot be determined.

In further detail of method 700, the data processing system can generate a message (STEP 715). For example, the data processing system can generate a message to prompt the client system to provide additional and/or supplemental information regarding the first prompt. As another example, the data processing system can generate a message that includes and/or identifies the intents determined by the data processing system.

In further detail of method 700, the data processing system can receive a second prompt for the language model (STEP 720). For example, the data processing system can receive the second prompt as a response to the message generated by the data processing system. As another example, the data processing system can receive the second prompt via a communication session established by the data processing system.

In further detail of method 700, the data processing system can generate a classification of the intent (STEP 725). For example, the data processing system can provide the second prompt to the language model. The language model can generate one or more outputs that indicate a classification of the intent. As another example, the data processing system can generate the classification of the intent by using the second prompt and/or information associated with the second prompts as one or more filters or constraints.

Figure 8:
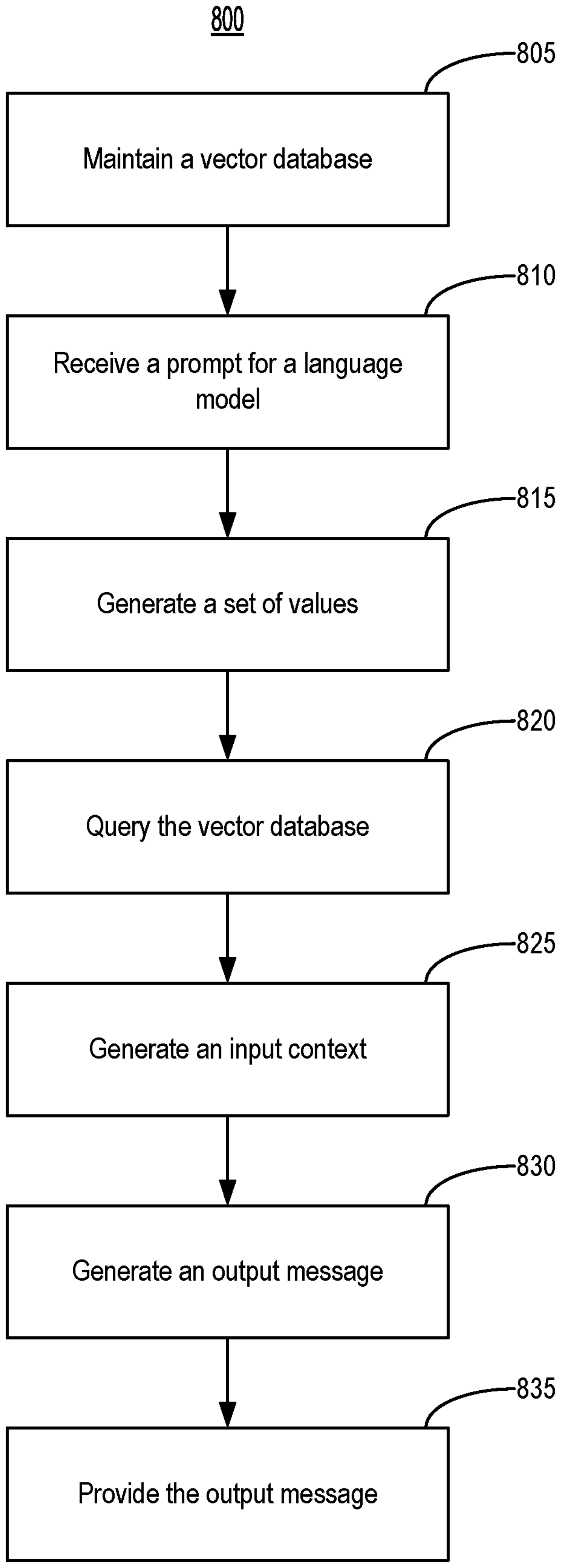
FIG. 8 illustrates a flow diagram of a method to generate an output message using a language model, in accordance with one or more implementations.

Referring now to FIG. 8, depicted is an illustrative flow diagram of a method 800 to generate an output message using a language model, in accordance with one or more implementations. The method 800 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 800, the data processing system can maintain a vector database (STEP 805), receive a prompt for a language model (STEP 810), generate a set of values (STEP 815), query the vector database (STEP 820), generate an input context (STEP 825), generate an output message (STEP 830), and provide the output message (STEP 835).

In further detail of method 800, the data processing system can maintain a vector database (STEP 805). For example, the data processing system can maintain a vector database in storage (e.g., memory, memory storage, etc.). As another example, the data processing system maintain information in the vector database. The vector database can include an encoded set of wager opportunities. For example, the encoded set of wager opportunities can be embeddings that represent one or more wager opportunities. The encoded set of wager opportunities can correspond to one or more live events.

In further detail of method 800, the data processing system can receive a prompt for a language model (STEP 810). The data processing system can receive the prompt during a communication with a client device. For example, the data processing system can receive the prompt during a chatbot session. The prompt can be for a language model. For example, the prompt can include a request for information for which the language model may generate. The prompt can identify one or more requests that corresponds to a live event. For example, the prompt can include a request for identification of one or more wager opportunities associated with a live event.

In further detail of method 800, the data processing system can generate a set of values (STEP 815). For example, the data processing system can generate one or more embeddings that represent information stored in the vector database. As another example, the data processing system can generate embeddings that reflect the prompts received from a client device.

In further detail of method 800, the data processing system can query the vector database (STEP 820). For example, the data processing system can query the vector database to search for matches between the set of values and information stored and/or maintained in the vector database. The data processing system can query the vector database to identify one or more wager opportunities that correspond to the prompts from the client device.

In further detail of method 800, the data processing system can generate an input context (STEP 825). For example, the data processing system can generate an input context for which a language model may generate an output. As another example, the data processing system can generate an input context that describes and/or represents prompts provided by the client device.

In further detail of method 800, the data processing system can generate an output message (STEP 830). For example, the data processing system can execute a language model to cause the language model to generate one or more outputs. The outputs may represent an output message. The output message may represent a response to one or more prompts provided by the client device. For example, the output message my identify one or more wager opportunities associated with the prompts of the client device, In further detail of method 800, the data processing system can provide the output message (STEP 835). For example, the data processing system can provide the output message via an output region of a user interface presented by the client device. As another example, the data processing system can transmit one or more signals that causes the client device to display a user interface that includes the output message.

Figure 9:
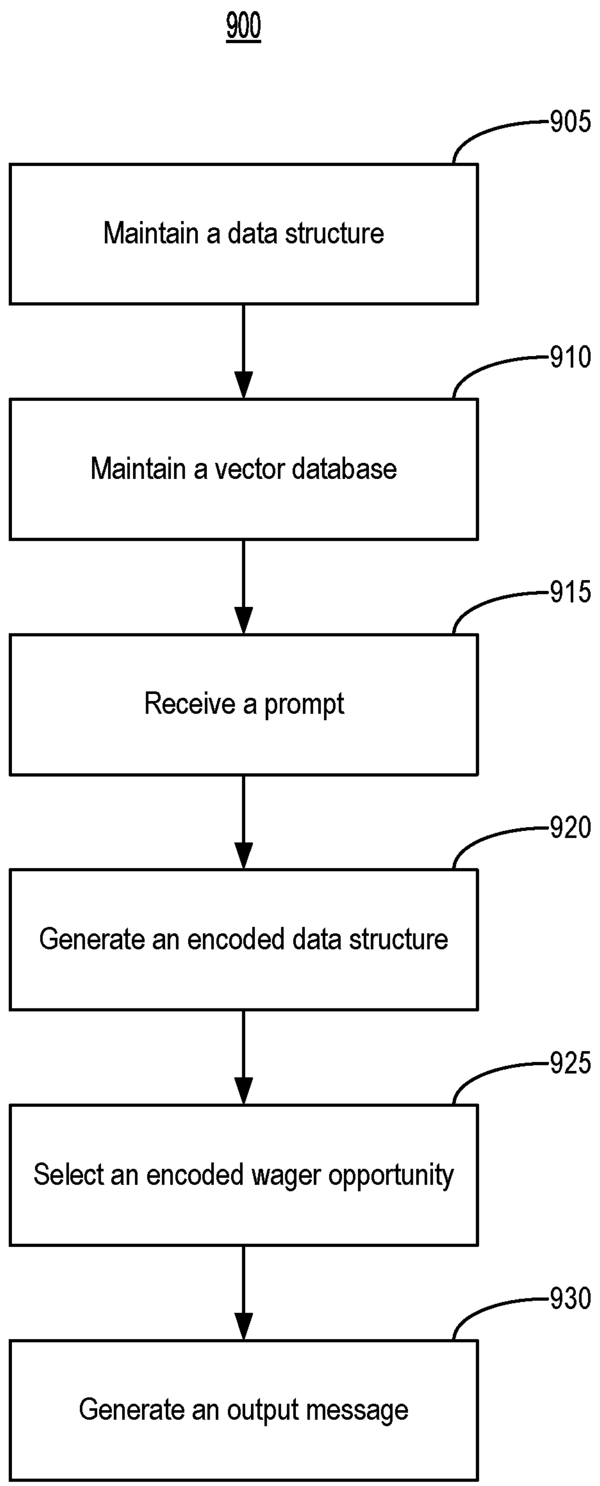
FIG. 9 illustrates a flow diagram of a method to generate an output message using a language model, in accordance with one or more implementations.

Referring now to FIG. 9, depicted is an illustrative flow diagram of a method 900 to generate an output message using a language model, in accordance with one or more implementations. The method 900 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 900, the data processing system can maintain a data structure (STEP 905), maintain a vector database (STEP 910), receive a prompt for a language model (STEP 915), generate an encoded data structure (STEP 920), select an encoded wager opportunity (STEP 925), and generate an output message (STEP 930).

In further detail of method 900, the data processing system can maintain a data structure (STEP 905). For example, the data processing system can maintain a collection of historical actions performed using a player profile. The historical actions can include placing wagers, viewing wagers, viewing stats associated with events and/or entities of the events, obtaining NFTs associated with performers of the events, etc.

In further detail of method 900, the data processing system can maintain a vector database (STEP 910). For example, the data processing system can maintain a vector database in storage (e.g., memory, memory storage, etc.). As another example, the data processing system maintain information in the vector database. The vector database can include an encoded set of wager opportunities. For example, the encoded set of wager opportunities can be embeddings that represent one or more wager opportunities. The encoded set of wager opportunities can correspond to one or more live events.

In further detail of method 900, the data processing system can receive a prompt for a language model (STEP 915). The data processing system can receive the prompt during a communication with a client device. For example, the data processing system can receive the prompt during a chatbot session. The prompt can be for a language model. For example, the prompt can include a request for information for which the language model may generate. The prompt can identify one or more requests that corresponds to a live event. For example, the prompt can include a request for identification of one or more wager opportunities associated with a live event.

In further detail of method 900, the data processing system can generate an encoded data structure (STEP 920). For example, the data processing system can generate an embedding of the prompts received from a client device. As another example, the data processing system generate a token that represents information associated with and/or included in the prompts. The data processing system can generate encoded data structures based on and/or using the historical actions.

In further detail of method 900, the data processing system can select an encoded wager opportunity (STEP 925). For example, the data processing system can use historical actions as search criteria for which the vector database is searched. As another example, the data processing system can identify wager opportunities based on similarities between encodings of the historical actions and encodings of the wager opportunities.

In further detail of method 900, the data processing system can provide the output message (STEP 930). For example, the data processing system can provide the output message via an output region of a user interface presented by the client device. As another example, the data processing system can transmit one or more signals that causes the client device to display a user interface that includes the output message.

Figure 10:
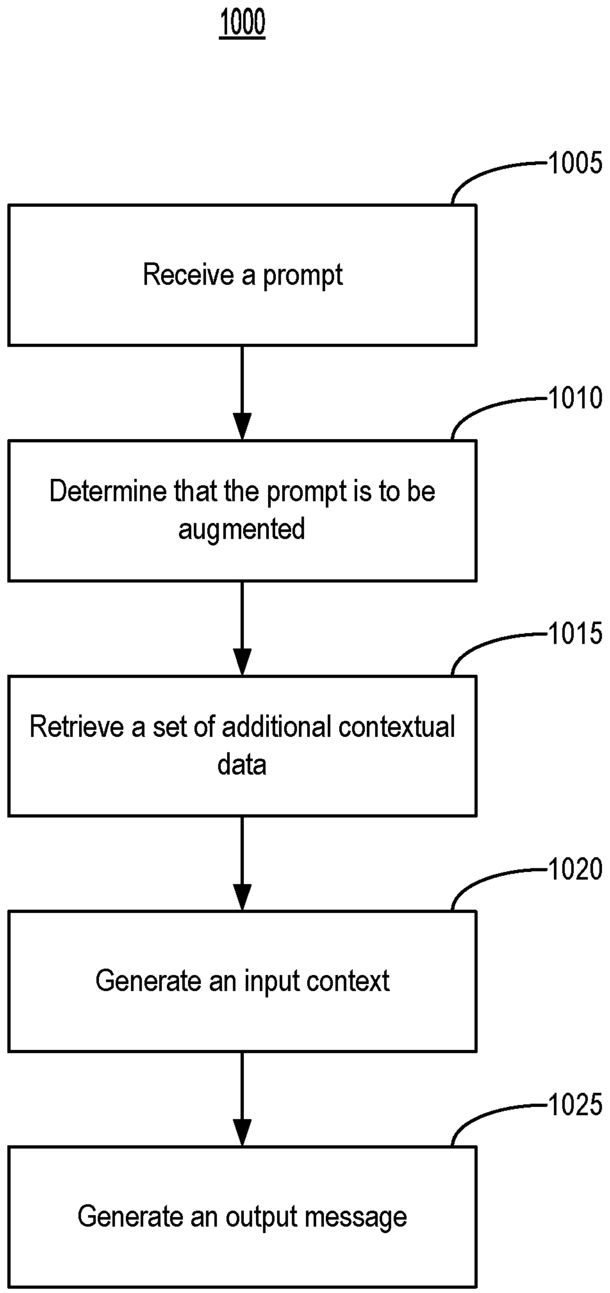
FIG. 10 illustrates a flow diagram of a method to generate an output message using a language model, in accordance with one or more implementations.

Referring now to FIG. 10, depicted is an illustrative flow diagram of a method 1000 to generate an output message using a language model, in accordance with one or more implementations. The method 1000 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 1000, the data processing system can receive a prompt for a language model (STEP 1005), determine that the prompt is to be augmented (STEP 1010), retrieve a set of additional contextual data (STEP 1015), generate an input context (STEP 1020), and generate an output message (STEP 1025).

In further detail of method 1000, the data processing system can receive a prompt for a language model (STEP 1005). The data processing system can receive the prompt during a communication with a client device. For example, the data processing system can receive the prompt during a chatbot session. The prompt can be for a language model. For example, the prompt can include a request for information for which the language model may generate. The prompt can identify one or more requests that corresponds to a live event. For example, the prompt can include a request for identification of one or more wager opportunities associated with a live event. As another example, the prompt can include a request for a wager recommendations.

In further detail of method 1000, the data processing system can determine that the prompt is to be augmented (STEP 1010). For example, the data processing system can determine that the prompt is to be supplemented with contextual data. As another example, the data processing system can determine that the prompt is to be ingest with additional information.

In further detail of method 1000, the data processing can retrieve a set of additional contextual data (STEP 1015). For example, the data processing system can retrieve contextual data to augment with one or more prompts. As another example, the data processing system can retrieve contextual data by querying and/or searching one or more databases.

In further detail of method 1000, the data processing system can generate an input context. For example, the data processing system can generate an input context for a language model. The data processing system can generate the input context by augmenting the prompts with one or more sets of data. For example, the data processing system can augment the prompts with contextual data retrieved from one or more databases. The data processing system can provide the input context to a language model.

In further detail of method 1000, the data processing system can generate an output message. For example, the data processing system can generate an output message to responds to one or more prompts. As another example, the data processing system can execute a language model to generate an output message. The output message may identify and/or indicate one or more wager recommendations to provide to a client device.

Figure 11:
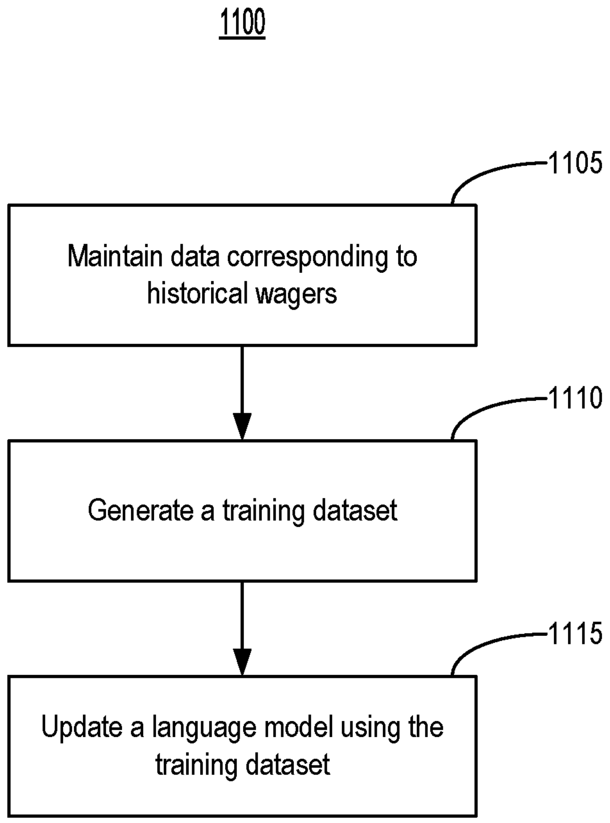
FIG. 11 illustrates a flow diagram of a method to train a language model to generate one or more sets of information, in accordance with one or more implementations.

Referring now to FIG. 11, depicted is an illustrative flow diagram of a method 1100 to generate one or more sets of information, in accordance with one or more implementations. The method 1100 can be executed, performed, or otherwise carried out by a processing system or computing system. A data processing system (e.g., the data processing system 105) can be remote to one or more client systems (e.g., the client system 115) and one or more machine learning systems (e.g., the machine learning system 120) and can communicate with the one or more client systems or the one or more machine learning systems via a computer network (e.g., the network 110).

In a brief overview of method 1100, the data processing system can maintain data corresponding to historical wagers (STEP 1105), generate a training dataset (STEP 1110), and update a language model using the training dataset (STEP 1115).

In further detail of method 1100, the data processing system can maintain data corresponding to historical wagers. For example, the data processing system can maintain data that includes one or more previous wager opportunities. As another example, the data processing system can maintain data associated with wager opportunities stored in a database. The data processing system can maintain the data as one or more data structures.

In further detail of method 1100, the data processing system can generate a training dataset (STEP 1110). For example, the data processing system can generate a training dataset using the historical wagers. The data processing system can generate the training dataset by applying one or more tags and/or labels to the historical wagers. The data processing system can generate the training dataset bay linking one or more input prompts to corresponding output prompts.

In further detail of method 1100, the data processing system can update a language model using the training dataset (STEP 1115). For example, the data processing system can apply the training datasets to the language model to adjust one or more weights and/or constraints of the language model. As another example, the data processing system can use the training datasets to update and/or adjust the language model to cause the language model to generate given output messages.

Figure 12:
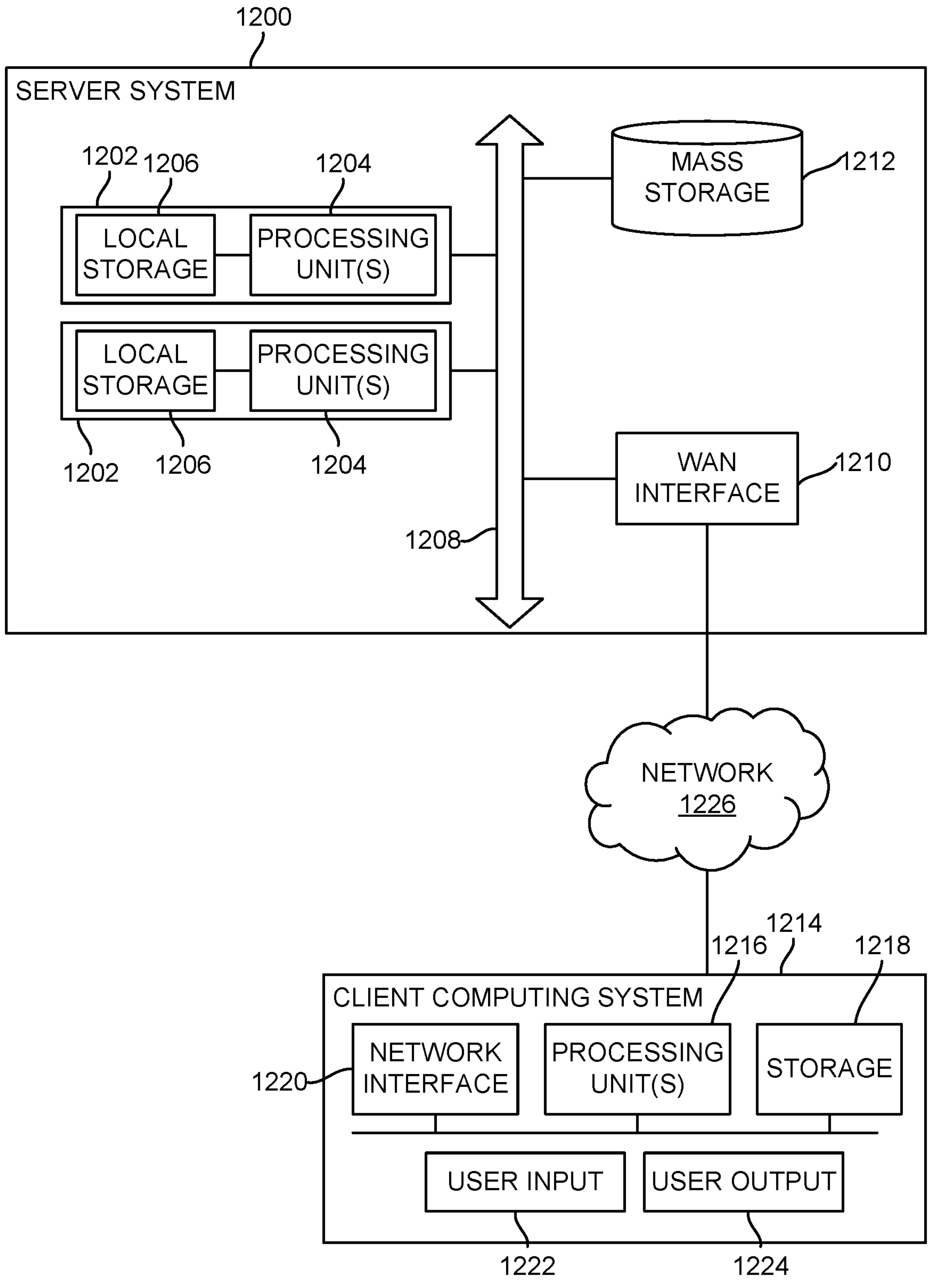
FIG. 12 illustrates a block diagram of a server system and a client computer system in accordance with an illustrative implementation.

Various operations described herein may be implemented on computer systems. FIG. 12 shows a simplified block diagram of a server system 1200, client computing system 1214, and network 1226 usable to implement certain embodiments of the present disclosure. In various embodiments, server system 1200 or similar systems can implement services or servers described herein or portions thereof. Client computing system 1214 or similar systems can implement clients described herein. The system (e.g., the data processing system 105) and others described herein may be similar to the server system 1200.

Server system 1200 can have a modular design that incorporates a number of modules 1202; while two modules 1202 are shown, any number may be provided. Each module 1202 can include processing unit(s) 1204 and local storage 1206.

Processing unit(s) 1204 can include a single processor, which can have one or more cores, or multiple processors. In some embodiments, processing unit(s) 1204 can include a general-purpose primary processor as well as one or more special-purpose co-processors such as graphics processors, digital signal processors, or the like. In some embodiments, some or all processing unit(s) 1204 may be implemented using customized circuits, such as application specific integrated circuits (ASICs) or field programmable gate arrays (FPGAs). In some embodiments, such integrated circuits execute instructions that are stored on the circuit itself. In other embodiments, processing unit(s) 1204 can execute instructions stored in local storage 1206. Any type of processors in any combination may be included in processing unit(s) 1204.

Local storage 1206 can include volatile storage media (e.g., DRAM, SRAM, SDRAM, or the like) and/or non-volatile storage media (e.g., magnetic or optical disk, flash memory, or the like). Storage media incorporated in local storage 1206 may be fixed, removable or upgradeable as desired. Local storage 1206 may be physically or logically divided into various subunits such as a system memory, a read-only memory (ROM), and a permanent storage device. The system memory may be a read-and-write memory device or a volatile read-and-write memory, such as dynamic random-access memory. The system memory can store some or all of the instructions and data that processing unit(s) 1204 need at runtime. The ROM can store static data and instructions that are needed by processing unit(s) 1204. The permanent storage device may be a non-volatile read-and-write memory device that can store instructions and data even when module 1202 is powered down. The term "storage medium" as used herein includes any medium in which data may be stored indefinitely (subject to overwriting, electrical disturbance, power loss, or the like) and does not include carrier waves and transitory electronic signals propagating wirelessly or over wired connections.

In some embodiments, local storage 1206 can store one or more software programs to be executed by processing unit(s) 1204, such as an operating system and/or programs implementing various server functions such as functions of the data processing system 105 of FIG. 1 or any other system described herein, or any other server(s) associated with the data processing system 105, or any other system described herein.

"Software" refers generally to sequences of instructions that, when executed by set of processing unit(s) 1204, cause the server system 1200 (or portions thereof) to perform various operations, thus defining one or more specific machine embodiments that execute and perform the operations of the software programs. The instructions may be stored as firmware residing in read-only memory and/or program code stored in non-volatile storage media that may be read into volatile working memory for execution by processing unit(s) 1204. Software may be implemented as a single program or a collection of separate programs or program modules that interact as desired. From local storage 1206 (or non-local storage described below), processing unit(s) 1204 can retrieve program instructions to execute and data to process in order to execute various operations described above.

In some embodiments, the server system 1200, multiple modules 1202 may be interconnected via a bus or other interconnect 1208, forming a local area network that supports communication between modules 1202 and other components of server system 1200. Interconnect 1208 may be implemented using various technologies including server racks, hubs, routers, etc.

A wide area network (WAN) interface 1210 can provide data communication capability between the local area network (interconnect 1208) and the network 1226, such as the Internet. Technologies may be used, including wired (e.g., Ethernet, IEEE 802.3 standards) and/or wireless technologies (e.g., Wi-Fi, IEEE 802.11 standards).

In some embodiments, local storage 1206 is intended to provide working memory for processing unit(s) 1204, providing fast access to programs and/or data to be processed while reducing traffic on interconnect 1208. Storage for larger quantities of data may be provided on the local area network by a set of mass storage subsystems 1212 that may be connected to interconnect 1208. The set of mass storage subsystems 1212 may be based on magnetic, optical, semiconductor, or other data storage media, and may include one or more physical devices. Direct attached storage, storage area networks, network-attached storage, and the like may be used. Any data stores or other collections of data described herein as being produced, consumed, or maintained by a service or server may be stored in the set of mass storage subsystems 1212. In some embodiments, additional data storage resources may be accessible via WAN interface 1210 (potentially with increased latency).

Server system 1200 can operate in response to requests received via WAN interface 1210. For example, one of modules 1202 can implement a supervisory function and assign discrete tasks to other modules 1202 in response to received requests. Work allocation techniques may be used. As requests are processed, results may be returned to the requester via WAN interface 1210. Such operation can generally be automated. Further, in some embodiments, WAN interface 1210 can connect server systems to each other, providing scalable systems capable of managing high volumes of activity. Techniques for managing server systems and server farms (collections of server systems that cooperate) may be used, including dynamic resource allocation and reallocation.

Server system 1200 can interact with various player-owned or player-operated devices via a wide-area network such as the Internet. An example of a player-operated device is shown in FIG. 12 as client computing system 1214. Client computing system 1214 may be implemented, for example, as a consumer device such as a smartphone, other mobile phone, tablet computer, wearable computing device (e.g., smart watch, eyeglasses), desktop computer, laptop computer, and so on.

For example, client computing system 1214 can communicate via WAN interface 1210. Client computing system 1214 can include computer components such as a set of processors 1216, storage device 1218, network interface 1220, user input device 1222, and user output device 1224. Client computing system 1214 may be a computing device implemented in a variety of form factors, such as a desktop computer, laptop computer, tablet computer, smartphone, other mobile computing device, wearable computing device, or the like.

The set of processors 1216 and storage device 1218 may be similar to processing unit(s) 1204 and local storage 1206 described above. Suitable devices may be selected based on the demands to be placed on client computing system 1214; for example, client computing system 1214 may be implemented as a "thin" client with limited processing capability or as a high-powered computing device. Client computing system 1214 may be provisioned with program code executable by the set of processors 1216 to enable various interactions with server system 1200 of a message management service such as accessing messages, performing actions on messages, and other interactions described above. In some embodiments, a client computing system can also interact with a messaging service independently of the message management service.

Network interface 1220 can provide a connection to the network 1226, such as a wide area network (e.g., the Internet) to which WAN interface 1210 of server system 1200 is also connected. In various embodiments, network interface 1220 can include a wired interface (e.g., Ethernet) and/or a wireless interface implementing various RF data communication standards such as Wi-Fi, Bluetooth, or cellular data network standards (e.g., 3G, 4G, LTE, etc.).

User input device 1222 can include any device (or devices) via which a user can provide signals to client computing system 1214; client computing system 1214 can interpret the signals as indicative of particular player requests or information. In various embodiments, user input device 1222 can include any or all of a keyboard, touch pad, touch screen, mouse or other pointing device, scroll wheel, click wheel, dial, button, switch, keypad, microphone, and so on.

User output device 1224 can include any device via which client computing system 1214 can provide information to a user. For example, user output device 1224 can include a display-to-display images generated by or delivered to client computing system 1214. The display can incorporate various image generation technologies, e.g., a liquid crystal display (LCD), light-emitting diode (LED) including organic light-emitting diodes (OLED), projection system, cathode ray tube (CRT), or the like, together with supporting electronics (e.g., digital-to-analog or analog-to-digital converters, signal processors, or the like). Some embodiments can include a device such as a touchscreen that function as both input and output device. In some embodiments, one or more other user output devices, such as the user output device 1224, may be provided in addition to or instead of a display. Examples include indicator lights, speakers, tactile "display" devices, printers, and so on.

Some embodiments include electronic components, such as microprocessors, storage and memory that store computer program instructions in a computer readable storage medium. Many of the features described in this specification may be implemented as processes that are specified as a set of program instructions encoded on a computer readable storage medium. When these program instructions are executed by one or more processing units, they cause the processing unit(s) to perform various operation indicated in the program instructions. Examples of program instructions or computer code include machine code, such as is produced by a compiler, and files including higher-level code that are executed by a computer, an electronic component, or a microprocessor using an interpreter. Through suitable programming, the processing unit(s) 1204 or the set of processors 1216 can provide various functionality for server system 1200 and client computing system 1214, including any of the functionality described herein as being performed by a server or client, or other functionality associated with message management services.

It will be appreciated that server system 1200 and client computing system 1214 are illustrative and that variations and modifications are possible. Computer systems used in connection with embodiments of the present disclosure can have other capabilities not specifically described here. Further, while server system 1200 and client computing system 1214 are described with reference to particular blocks, it is to be understood that these blocks are defined for convenience of description and are not intended to imply a particular physical arrangement of component parts. For instance, different blocks may be but need not be located in the same facility, in the same server rack, or on the same motherboard. Further, the blocks need not correspond to physically distinct components. Blocks may be configured to perform various operations, e.g., by programming a processor or providing appropriate control circuitry, and various blocks might or might not be reconfigurable depending on how the initial configuration is obtained. Embodiments of the present disclosure may be realized in a variety of apparatus including electronic devices implemented using any combination of circuitry and software.

Embodiments of the subject matter and the operations described in this specification may be implemented in digital electronic circuitry, or in computer software embodied on a tangible medium, firmware, or hardware, including the structures disclosed in this specification and their structural equivalents, or in combinations of one or more of them. Embodiments of the subject matter described in this specification may be implemented as one or more computer programs, e.g., one or more components of computer program instructions, encoded on computer storage medium for execution by, or to control the operation of, data processing apparatus. The program instructions may be encoded on an artificially generated propagated signal, e.g., a machine-generated electrical, optical, or electromagnetic signal that is generated to encode information for transmission to suitable receiver apparatus for execution by a data processing apparatus. A computer storage medium may be, or be included in, a computer-readable storage device, a computer-readable storage substrate, a random or serial access memory array or device, or a combination of these. Moreover, while a computer storage medium is not a propagated signal, a computer storage medium can include a source or destination of computer program instructions encoded in an artificially generated propagated signal. The computer storage medium can also be, or be included in, one or more separate physical components or media (e.g., multiple CDs, disks, or other storage devices).

The operations described in this specification may be implemented as operations performed by a data processing apparatus on data stored on one or more computer-readable storage devices or received from other sources.

The terms "data processing apparatus," "data processing system," "client device," "computing platform," "computing device," or "device" encompasses all kinds of apparatus, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of these. The apparatus and execution environment can realize various different computing model infrastructures, such as web services, distributed computing, and grid computing infrastructures.

A computer program (also known as a program, software, software application, script, or code) may be written in any form of programming language, including compiled or interpreted languages, declarative or procedural languages, and it may be deployed in any form, including as a standalone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows can also be performed by, and apparatuses can also be implemented as, special purpose logic circuitry, e.g., an FPGA or an ASIC.

Processors suitable for the execution of a computer program include, by way of example, both general and special purpose microprocessors, and any one or more processors of any kind of digital computer. Generally, a processor will receive instructions and data from a read-only memory or a random-access memory or both. The elements of a computer include a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), for example. Devices suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

To provide for interaction with a player, embodiments of the subject matter described in this specification may be implemented on a computer having a display device, e.g., a CRT (cathode ray tube), plasma, or LCD (liquid crystal display) monitor, for displaying information to the player and a keyboard and a pointing device, e.g., a mouse or a trackball, by which the player can provide input to the computer. Other kinds of devices may be used to provide for interaction with a player as well; for example, feedback provided to the player can include any form of sensory feedback, e.g., visual feedback, auditory feedback, or tactile feedback; and input from the player may be received in any form, including acoustic, speech, or tactile input. In addition, a computer can interact with a player by sending documents to and receiving documents from a device that is used by the player; for example, by sending web pages to a web browser on a player's client device in response to requests received from the web browser.

Embodiments of the subject matter described in this specification may be implemented in a computing system that includes a back-end component, e.g., as a data server, or that includes a middleware component, e.g., an application server, or that includes a front-end component, e.g., a client computer having a graphical user interface or a Web browser through which a player can interact with an implementation of the subject matter described in this specification, or any combination of one or more such back-end, middleware, or front-end components. The components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as the system described herein can include clients and servers. For example, the system can include one or more servers in one or more data centers or server farms. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving input from a player interacting with the client device). Data generated at the client device (e.g., a result of an interaction, computation, or any other event or computation) may be received from the client device at the server, and vice-versa.

While this specification contains many specific implementation details, these should not be construed as limitations on the scope of any inventions or of what may be claimed, but rather as descriptions of features specific to particular embodiments of the systems and methods described herein. Certain features that are described in this specification in the context of separate embodiments can also be implemented in combination in a single implementation. Conversely, various features that are described in the context of a single implementation can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In some cases, the actions recited in the claims may be performed in a different order and still achieve desirable results. In addition, the processes depicted in the accompanying figures do not necessarily require the particular order shown, or sequential order, to achieve desirable results.

In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products. For example, the system could be a single module, a logic device having one or more processing modules, one or more servers, or part of a search engine.

Having now described some illustrative embodiments, it is apparent that the foregoing is illustrative and not limiting, having been presented by way of example. In particular, although many of the examples presented herein involve specific combinations of method acts or system elements, those acts, and those elements may be combined in other ways to accomplish the same objectives. Acts, elements and features discussed only in connection with one implementation are not intended to be excluded from a similar role in other embodiments.

The phraseology and terminology used herein is for the purpose of description and should not be regarded as limiting. The use of "including," "comprising," "having," "containing," "involving," "characterized by," "characterized in that," and variations thereof herein, is meant to encompass the items listed thereafter, equivalents thereof, and additional items, as well as alternate embodiments consisting of the items listed thereafter exclusively. In one implementation, the systems and methods described herein consist of one, each combination of more than one, or all of the described elements, acts, or components.

Any references to embodiments, elements, or acts of the systems and methods herein referred to in the singular may also embrace embodiments including a plurality of these elements; and any references in plural to any implementation, element, or act herein may also embrace embodiments including only a single element. References in the singular or plural form are not intended to limit the presently disclosed systems or methods, their components, acts, or elements to single or plural configurations. References to any act or element being based on any information, act or element may include embodiments where the act or element is based at least in part on any information, act, or element.

Any implementation disclosed herein may be combined with any other implementation, and references to "an implementation," "some embodiments," "an alternate implementation," "various implementation," "one implementation," or the like are not necessarily mutually exclusive and are intended to indicate that a particular feature, structure, or characteristic described in connection with the implementation may be included in at least one implementation. Such terms as used herein are not necessarily all referring to the same implementation. Any implementation may be combined with any other implementation, inclusively or exclusively, in any manner consistent with the aspects and embodiments disclosed herein.

References to "or" may be construed as inclusive so that any terms described using "or" may indicate any of a single, more than one, and all of the described terms. Unless otherwise specified, terms combined with "or" are non-exclusive, such that the phrase "first item or second item" may refer to only the first item, only the second item, or both the first and second items.

Where technical features in the drawings, detailed description, or any claim are followed by reference signs, the reference signs have been included for the sole purpose of increasing the intelligibility of the drawings, detailed description, and claims. Accordingly, neither the reference signs nor their absence has any limiting effect on the scope of any claim elements.

The systems and methods described herein may be embodied in other specific forms without departing from the characteristics thereof. Although the examples provided may be useful for providing a system, the systems and methods described herein may be applied to other environments. The foregoing embodiments are illustrative, rather than limiting, of the described systems and methods. The scope of the systems and methods described herein may thus be indicated by the appended claims, rather than the foregoing description, and changes that come within the meaning and range of equivalency of the claims are embraced therein.

What is claimed is:

1. A system, comprising:

one or more processors coupled to non-transitory memory, the one or more processors configured to:

receive, from a client device during a communication session, a prompt identifying a request for a wager recommendation;

generate, using a machine-learning model and at least a portion of the prompt, a classification of an intent for the prompt, the classification of the intent corresponding to at least one of a request for one or more wager recommendations, a request for information relating to a live event, a request for information relating to a sports team, a request for information relating to at least one wager opportunity, a request to place a wager, or a request for information maintained by the one or more processors;

determine, based on the classification of the intent output by the machine-learning model, that the prompt is to be augmented with at least one of location information, information corresponding to one or more sports teams, information corresponding to one or more wager types, or odds information to satisfy the request for the wager recommendation;

responsive to determining that the prompt is to be augmented, retrieve, from at least one data source and based on the prompt, a set of additional contextual data to satisfy the request for the wager recommendation;

generate an input context using the prompt and the set of additional contextual data; and generate, using a language model and the input context, an output message identifying the wager recommendation.

2. The system of claim 1, wherein the one or more processors are further configured to:

determine that the prompt is to be augmented with the location information; and retrieve one or more candidate wagers corresponding to the location information for inclusion in the set of additional contextual data.

3. The system of claim 1, wherein the at least one data source comprises one or more of the client device, a player profile associated with the client device, or a database storing information relating to one or more live events.

4. The system of claim 1, wherein the client device is associated with a player profile, and wherein the one or more processors are further configured to:

determine that the prompt is to be augmented with profile information; and retrieve at least a subset of data stored in the player profile for inclusion in the set of additional contextual data.

5. The system of claim 1, wherein the one or more processors are further configured to:

determine that the prompt is to be augmented with the information corresponding to one or more sports teams; and retrieve at least a subset of data from a database storing sports information for inclusion in the set of additional contextual data.

6. The system of claim 1, wherein the one or more processors are further configured to:

determine that the prompt is to be augmented with the information corresponding to one or more wager types; and retrieve at least a subset of data from a database storing wager information of a plurality of candidate wagers for inclusion in the set of additional contextual data.

7. The system of claim 1, wherein the one or more processors are further configured to:

determine that the prompt is to be augmented with the odds information for at least one wager; and retrieve at least a subset of data from a database storing odds information of a plurality of wagers for inclusion in the set of additional contextual data.

8. The system of claim 1, wherein the one or more processors are further configured to:

receive a second prompt in response to the output message;

generate a second input context using the second prompt and a second set of additional contextual information retrieved according to the second prompt; and execute the language model using the second input context to generate a second output message in response to the second prompt.

9. A method, comprising:

receiving, by one or more processors coupled to non-transitory memory, from a client device during a communication session, a prompt identifying a request for a wager recommendation;

generating, by the one or more processors, using a machine-learning model and at least a portion of the prompt, a classification of an intent for the prompt, the classification of the intent corresponding to at least one of a request for one or more wager recommendations, a request for information relating to a live event, a request for information relating to a sports team, a request for information relating to at least one wager opportunity, a request to place a wager, or a request for information maintained by the one or more processors;

determining, by the one or more processors, based on the classification of the intent output by the machine-learning model, that the prompt is to be augmented with at least one of location information, information corresponding to one or more sports teams, information corresponding to one or more wager types, or odds information to satisfy the request for the wager recommendation;

responsive to determining that the prompt is to be augmented, retrieving, by the one or more processors, from at least one data source and based on the prompt, a set of additional contextual data to satisfy the request for the wager recommendation;

generating, by the one or more processors, an input context using the prompt and the set of additional contextual data; and generating, by the one or more processors, using a language model and the input context, an output message identifying the wager recommendation.

10. The method of claim 9, further comprising:

determining, by the one or more processors, that the prompt is to be augmented with the location information; and retrieving, by the one or more processors, one or more candidate wagers corresponding to the location information for inclusion in the set of additional contextual data.

11. The method of claim 9, wherein the at least one data source comprises one or more of the client device, a player profile associated with the client device, or a database storing information relating to one or more live events.

12. The method of claim 9, wherein the client device is associated with a player profile, and further comprising:

determining, by the one or more processors, that the prompt is to be augmented with profile information; and retrieving, by the one or more processors, at least a subset of data stored in the player profile for inclusion in the set of additional contextual data.

13. The method of claim 9, further comprising:

determining, by the one or more processors, that the prompt is to be augmented with the information corresponding to one or more sports teams; and retrieving, by the one or more processors, at least a subset of data from a database storing sports information for inclusion in the set of additional contextual data.

14. The method of claim 9, further comprising:

determining, by the one or more processors, that the prompt is to be augmented with the information corresponding to one or more wager types; and retrieving, by the one or more processors, at least a subset of data from a database storing wager information of a plurality of candidate wagers for inclusion in the set of additional contextual data.

15. The method of claim 9, further comprising:

determining, by the one or more processors, that the prompt is to be augmented with the odds information for at least one wager; and retrieving, by the one or more processors, at least a subset of data from a database storing odds information of a plurality of wagers for inclusion in the set of additional contextual data.

16. The method of claim 9, further comprising:

receiving, by the one or more processors, a second prompt in response to the output message;

generating, by the one or more processors, a second input context using the second prompt and a second set of additional contextual information retrieved according to the second prompt; and executing, by the one or more processors, the language model using the second input context to generate a second output message in response to the second prompt.

* * * * *